United States Patent
Melvin et al.

(10) Patent No.: US 9,352,665 B2
(45) Date of Patent: May 31, 2016

(54) MAGNETICALLY LIFTED VEHICLES USING HOVER ENGINES

(71) Applicant: Arx Pax, LLC, Saratoga, CA (US)

(72) Inventors: Robert William Melvin, Los Gatos, CA (US); D. Gregory Henderson, Saratoga, CA (US); Shauna Moran, Sunnyvale, CA (US); Victor Espinoza, Los Gatos, CA (US); Kyle O'Neil, Los Gatos, CA (US); Garrett Foshay, San Jose, CA (US)

(73) Assignee: Arx Pax Labs, Inc., Los Gatos, CA (US)

( * ) Notice: Subject to any disclaimer, the term of this patent is extended or adjusted under 35 U.S.C. 154(b) by 0 days.

(21) Appl. No.: 14/919,537

(22) Filed: Oct. 21, 2015

(65) Prior Publication Data
US 2016/0039310 A1      Feb. 11, 2016

Related U.S. Application Data

(63) Continuation-in-part of application No. 14/737,442, filed on Jun. 11, 2015, and a continuation-in-part of application No. 14/639,045, filed on Mar. 4, 2015, now Pat. No. 9,126,487, and a continuation-in-part of
(Continued)

(51) Int. Cl.
*B60L 13/04* (2006.01)
*H02N 15/00* (2006.01)
*H02K 7/09* (2006.01)

(52) U.S. Cl.
CPC . *B60L 13/04* (2013.01); *H02K 7/09* (2013.01); *H02N 15/00* (2013.01)

(58) Field of Classification Search
CPC .................. H02K 7/09; H02N 15/00–15/04
USPC ................ 310/90.5, 103, 104; 104/281–283; 180/180
IPC ....................................................... H02K 7/09
See application file for complete search history.

(56) References Cited

U.S. PATENT DOCUMENTS

| | | | |
|---|---|---|---|
| 3,858,521 A | 1/1975 | Atherton | |
| 4,027,597 A | 6/1977 | Lang | |
| 4,355,276 A | 10/1982 | Vittay | |
| 4,578,610 A | 3/1986 | Kliman et al. | |

(Continued)

FOREIGN PATENT DOCUMENTS

| | | |
|---|---|---|
| EP | 2371613 A1 | 10/2011 |
| JP | 06335111 A | 12/1994 |

(Continued)

OTHER PUBLICATIONS

Machine Translation, Nishimura, JP 2012019618 A, Jan. 26, 2012.*
(Continued)

*Primary Examiner* — Thomas Truong
(74) *Attorney, Agent, or Firm* — Kwan & Olynick LLP

(57) ABSTRACT

Electromechanical systems using magnetic fields to induce eddy currents and generate lift are described. Magnet configurations which can be employed in the systems are illustrated. The magnet configuration can be used to generate lift and/or thrust. Arrangements of hover engines, which can employ the magnet configurations, are described. Further, vehicles, which employ the hover engines and associated hover engines are described.

21 Claims, 33 Drawing Sheets

Related U.S. Application Data application No. 14/639,047, filed on Mar. 4, 2015, now Pat. No. 9,263,974, and a continuation-in-part of application No. 14/069,359, filed on Oct. 31, 2013, now Pat. No. 9,148,077, application No. 14/919,537, which is a continuation-in-part of application No. 14/737,444, filed on Jun. 11, 2015, now Pat. No. 9,254,759.

(60) Provisional application No. 61/977,045, filed on Apr. 8, 2014, provisional application No. 62/066,891, filed on Oct. 21, 2014, provisional application No. 62/011,011, filed on Jun. 11, 2014, provisional application No. 62/031,756, filed on Jul. 31, 2014, provisional application No. 61/977,045, filed on Apr. 8, 2014, provisional application No. 61/799,695, filed on Mar. 15, 2013.

(56) References Cited

U.S. PATENT DOCUMENTS

| | | | |
|---|---|---|---|
| 5,270,596 | A | 12/1993 | Shibuya et al. |
| 5,467,718 | A | 11/1995 | Shibata et al. |
| 5,495,221 | A | 2/1996 | Post |
| 5,705,902 | A | 1/1998 | Merritt et al. |
| 5,722,326 | A | 3/1998 | Post |
| 5,821,658 | A | 10/1998 | Boggs, III |
| 5,847,480 | A | 12/1998 | Post |
| 6,191,515 | B1 | 2/2001 | Post |
| 6,298,318 | B1 | 10/2001 | Lin |
| 6,503,318 | B2 | 1/2003 | Pye et al. |
| 6,564,882 | B2 | 5/2003 | Durmeyer et al. |
| 6,629,503 | B2 | 10/2003 | Post |
| 6,657,344 | B2 | 12/2003 | Post |
| 6,792,335 | B2 | 9/2004 | Ross |
| 6,858,962 | B2 | 2/2005 | Post et al. |
| 7,122,923 | B2 | 10/2006 | Lafontaine et al. |
| 7,559,384 | B2 | 7/2009 | Palladino |
| 7,598,646 | B2 | 10/2009 | Cleveland |
| 8,009,001 | B1 | 8/2011 | Cleveland |
| 8,294,316 | B2 | 10/2012 | Blackwelder et al. |
| 9,126,487 | B2 | 9/2015 | Henderson et al. |
| 9,148,077 | B2 | 9/2015 | Henderson |
| 2002/0084705 | A1 | 7/2002 | Kawamura |
| 2007/0166110 | A1 | 7/2007 | Kenady |
| 2007/0222304 | A1 | 9/2007 | Jajtic et al. |
| 2009/0229487 | A1 | 9/2009 | Crawford et al. |
| 2011/0272398 | A1 | 11/2011 | Berdut Teruel |
| 2013/0020895 | A1 | 1/2013 | Scalzo et al. |
| 2014/0265690 | A1 | 9/2014 | Henderson |
| 2015/0175031 | A1 | 6/2015 | Henderson et al. |
| 2015/0303768 | A1 | 10/2015 | Henderson et al. |

FOREIGN PATENT DOCUMENTS

| | | | |
|---|---|---|---|
| JP | H09261805 | A | 10/1997 |
| JP | 2004534496 | A | 11/2004 |
| JP | 2007215264 | A | 8/2007 |
| JP | 2012019618 | A * | 1/2012 |
| KR | 1020050078514 | A | 8/2005 |
| KR | 1020100045720 | A | 5/2010 |
| WO | 2009054937 | A2 | 4/2009 |
| WO | 2014149626 | A1 | 9/2014 |

OTHER PUBLICATIONS

U.S. Appl. No. 14/069,359, Advisory Action mailed Dec. 1, 2014.
"U.S. Appl. No. 14/069,359, Examiner Interview Summary mailed Jul. 1, 2014".
"U.S. Appl. No. 14/069,359, Examiner Interview Summary mailed Oct. 30, 2014".
"U.S. Appl. No. 14/069,359, Final Office Action mailed Oct. 10, 2014".
"U.S. Appl. No. 14/069,359, Non Final Office Action mailed Apr. 28, 2014".
"U.S. Appl. No. 14/069,359, Non Final Office Action mailed May 14, 2015".
"U.S. Appl. No. 14/069,359, Notice of Allowance mailed Aug. 20, 2015".
"U.S. Appl. No. 14/639,045, Notice of Allowance mailed Jul. 27, 2015".
"U.S. Appl. No. 14/639,047, Non Final Office Action mailed Aug. 18, 2015".
"U.S. Appl. No. 14/639,045, Examiner Interview Summary mailed May 1, 2015".
"U.S. Appl. No. 14/639,045, Examiner Interview Summary mailed Jun. 9, 2015".
"U.S. Appl. No. 14/639,045, Examiner Interview Summary mailed Jul. 14, 2015".
"U.S. Appl. No. 14/639,045, Non Final Office Action mailed Apr. 20, 2015".
"Int'l Application Serial No. PCT/US2014/019956, Preliminary Report on Patentability mailed Sep. 24, 2015".
"Int'l Application Serial No. PCT/US2014/019956, Search Report and Written Opinion mailed Jun. 24, 2014".
"Int'l Application Serial No. PCT/US2015/024777, Search Report mailed Jul. 14, 2015".
"Int'l Application Serial No. PCT/US2015/035442, Search Report and Written Opinion mailed Aug. 27, 2015".
"Launchpoint Technologies 6" Dual Halbach Air-core Motor", Revision 1.0, Retrieved from the Internet <http://www.launchpnt.com/Portals/53140/docs/dual-halbach-motor-data-sheet_r1.pdf>.
"The 25 Best Inventions of 2014: Hoverboards, intelligent space craft, edible food wrappers, and much much more", Time Magazine, <http://time.com/3594971/the-25-best-inventions-of-2014/>, Nov. 20, 2014.
"Video Publication", SFEnergy, Hoverboard & Hovercar maglev (magnetic levitation board & car), Oct. 9, 2011, https://www.youtube.com/watch?v=uHEQgjNcFBot., Oct. 9, 2011.
"Video Publication", SFEnergy, 작업중 Apr. 3-24, 2011, https://www.youtube.com/watch?v=2qhVjBddRr4t., Apr. 24, 2011.
Allain, Rhett, "The Physics of the Hendo Hoverboard", Wired <http://www.wired.com/2014/10/physics-hendo-hoverboard/>, Oct. 24, 2014.
Bloom, Laura B., "Skateboarding Legend Tony Hawk Test Drives the World's First Hoverboard", Yahoo <https://www.yahoo.com/travel/skateboarding-legend-tony-hawk-test-drives-the-worlds-102899995187.html>, Nov. 17, 2014.
Constine, Josh, "How It Feels to Ride a real Hoverboard", techcrunch.com <http://techcrunch.com/2014/12/07/an-elevated-experience/>, Dec. 7, 2014.
Dougherty, Conor, "Hoverboard? Still in the Future", The New York Times <http://www.bytimes.com/2014,10/21/technology/hoverboard-still-in-future.html?_r=1, Jan. 21, 2015, 4.
Eichenberg, Dennis J. et al., "Development and Testing of an Axial Halbach Magnetic Bearing", NASA, Jul. 2006.
Ham, Chan et al., "Study of a Hybrid Magnet Array for an Electrodynamic Maglev Control", Journal of Magnetics, vol. 18, No. 3., Sep. 2013, 370-374.
Hoburg, J.F. et al., "A Laminated Track for the Inductrack System: Theory and Experiment", 18th International Conference on Magnetically Levitated Systems and Linear Drives, Shanghai, China, Jan. 13, 2004.
Lavelle, Marianne, "Four 2015 Energy Ideas 'Back to the Future' Got (Almost) Right", National Geographic <http://news.nationalgeographic.com/news/energy/2014/12/141224-back-to-the-future-energy-hoverboards-flying-cars/>, Dec. 23, 2014.
Palermo, Elizabeth, "Look Ma, No Hands! Here's How This Supercool Hoverboard Works", livescience <http://www.livescience.com/49105-how-hoverboards-work.html>, Dec. 12, 2014, 4.
Paudel, N et al., "General 2-D Transient Eddy Current Force Equations For a Magnetic Source Moving Above a Conductive Plate", Progress in Electromeagnetics Research B. vol. 43, 255-277, 2012, 2012, 23 pgs.

(56) References Cited

OTHER PUBLICATIONS

Paudel, N et al., "Modeling the Dynamic Electromechanical Suspension Behavior of an Electrodynamic Eddy Current Maglev Device", Progress in Electromagnetics Research B, vol. 49, 1-30, 2013, 2013, 30 pgs.

Post, Richard F. et al., "The Design of Halbach Arrays for Inductrack Maglev Systems".

Post, Richard F., "The Inductrack: A Simpler Approach to Magnetic Levitation", IEEE Transactions on Applied Superconductivity, vol. 10, n. I, doi:IO.II09/77.828377, Lawrence Livermore National Laboratory, Livermore CA, Mar. 2000, 901-904.

Ricci, Mike, "High Efficiency, High Power Density Electric Motors", Launchpoint Technologies, Retrieved from the Internet <http://www.google.com/url?sa=t&rct=j&q=&esrc=s&source=web&cd=3&ved=0CFIQFjAC&url=http%3A%2F%2Fwww.launchpnt.com%2FPortals%2F53140%2Fdocs%2Flaunchpoint-halbach-motor-presentation-2010.ppt&ei=vJByUv2sNMTIygGLxIGIBg&usg=AFQjCNG5_F, Jul. 27, 2010, 12 pgs.

Santus, Rex, "Tony Hawk rides a hoverboard, for real this time", Mashable <http://mashable.com/2014/11/18/tony-hawk-hoverboard-real/, Nov. 18, 2014, 3.

Stuart, Emma, "Back to the Future's technology predictions", Engineering and Technology Magazine <http://eandt.theiet.org/explore/students/2015/back-to-the-future-transport-technology.cfm>, Jan. 21, 2015.

"U.S. Appl. No. 14/639,047, Notice of Allowance mailed Dec. 30, 2015", 8 pgs.

"U.S. Appl. No. 14/737,442, Non Final Office Action mailed Oct. 21, 2015", 19 pgs.

"U.S. Appl. No. 14/737,444, Notice of Allowance mailed Oct. 30, 2015", 10 pgs.

* cited by examiner

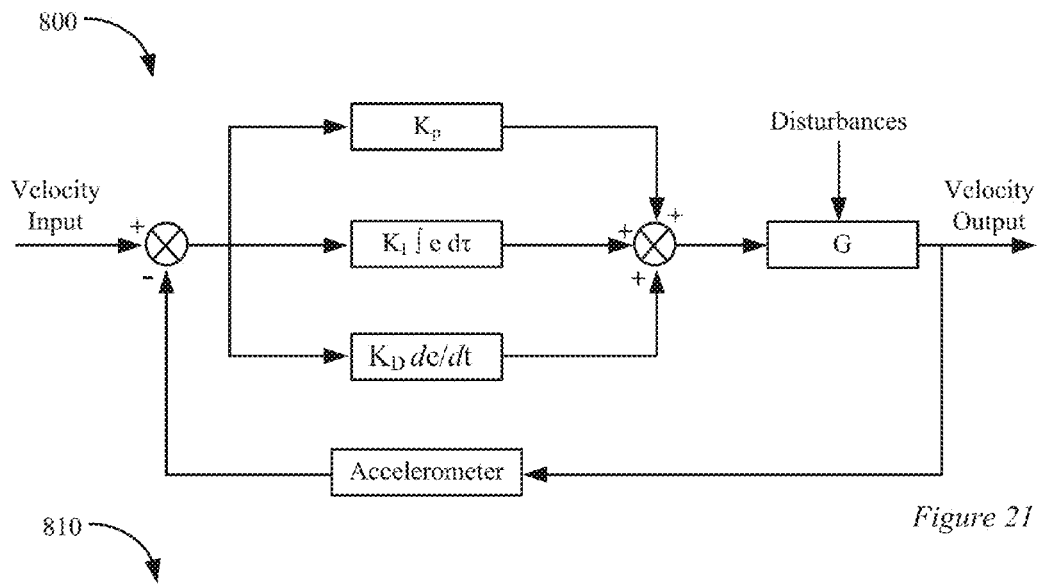
*Figure 21*
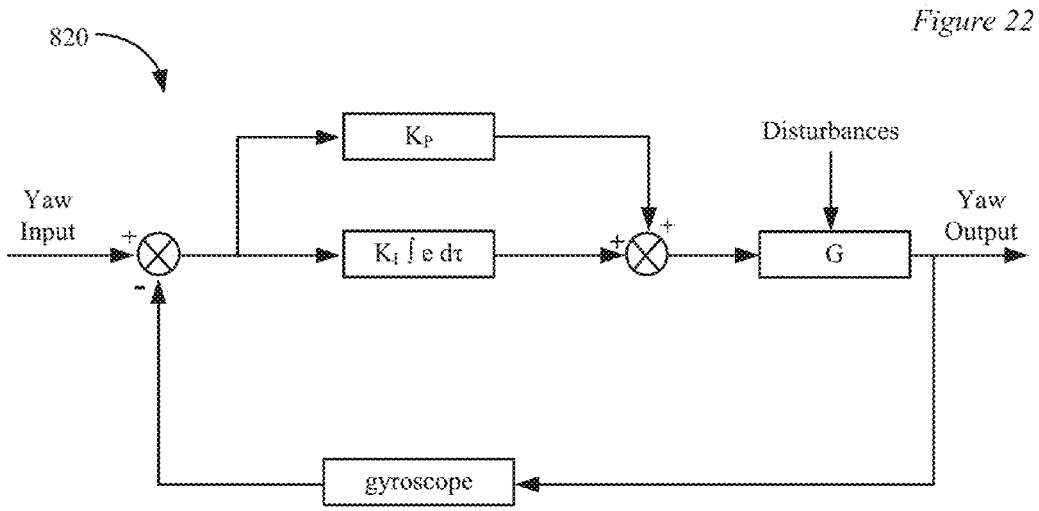
*Figure 22*
*Figure 23*

MAGNETICALLY LIFTED VEHICLES USING HOVER ENGINES

CROSS-REFERENCE TO RELATED APPLICATIONS

This application claims priority under 35 U.S.C. §120 and is a continuation-in-part of each of U.S. patent application Ser. Nos. 14/737,442 and 14/737,444, each filed Jun. 11, 2015, each by Henderson, et al, each titled, "Propulsion and Control For a Magnetically Lifted Vehicle," each of which are incorporated by reference in their entirety and for all purposes.

U.S. patent application Ser. Nos. 14/737,442 and 14/737,444 each claim priority under 35 U.S.C. §119(e) to U.S. Provisional Patent Application No. 62/066,891, filed Oct. 21, 2014, entitled "Hoverboard," by Henderson et al, which is incorporated by reference in its entirety for all purposes herein.

U.S. patent application Ser. Nos. 14/737,442 and 14/737,444 each claim priority under 35 U.S.C. §119(e) to U.S. Provisional Patent Application No. 62/011,011, filed Jun. 11, 2014, entitled "Applications of Magnet Arrangements having a One-sided Magnetic Flux Distribution," by Henderson et al, which is incorporated by reference in its entirety for all purposes herein.

U.S. patent application Ser. Nos. 14/737,442 and 14/737,444 each claim priority under 35 U.S.C. §119(e) to U.S. Provisional Patent Application No. 62/031,756, filed Jul. 31, 2014, entitled "Propulsion and Control for a Magnetically Lifted Vehicle," by Henderson et al, which is incorporated by reference in its entirety for all purposes herein.

U.S. patent application Ser. Nos. 14/737,442 and 14/737,444, each claim priority under 35 U.S.C. §120, and each are a continuation-in-part of each of U.S. patent application Ser. No. 14/639,045, issued as U.S. Pat. No. 9,126,487, titled "Hoverboard which Generates Lift to Carry a Person," and U.S. patent application Ser. No. 14/639,047, titled "Hoverboard," each filed Mar. 4, 2015, each by Henderson et al., and each of which are incorporated by references and for all purposes.

U.S. patent application Ser. Nos. 14/639,045 and 14/639,047, each claim priority to U.S. Provisional Application 61/977,045, 62/066,891, 62/011,011 and 62/031,756 and each claim priority to and are a continuations in part of U.S. patent application Ser. No. 14/069,359, entitled "Magnetic Levitation of a Stationary or Moving Object," filed Oct. 31, 2013, issued as U.S. Pat. No. 9,148,077, by Henderson, which claims priority under 35 U.S.C. §119(e) to U.S. Provisional Patent Application Ser. No. 61/799,695, entitled "Stationary Magnetic Levitation" by Henderson, filed Mar. 15, 2013 each of which are incorporated by reference in their entirety and for all purposes

FIELD OF THE INVENTION

This invention generally relates to electromagnetic levitation systems, and more particularly to devices, which employ electromagnetic levitation.

BACKGROUND

It is well known that two permanent magnets will attract or repulse one another at close distances depending on how the poles of the magnets are aligned. When aligned with the gravitational force vector, magnetic repulsion can be used to counteract gravity and lift an object. For the purposes of lifting an object and then moving it from one location to another location, magnetic repulsion is either unstable or too stable. In particular, opposing magnets can either be aligned such that the object remains in place but then can't be easily be moved to another location or the magnets can be aligned such that the object is easily moveable but won't remain in place but not both.

Another magnetic repulsion effect is associated with generating a moving magnetic field near a conductive object. When a permanent magnet is moved near a conductive object, such as a metal object, eddy currents are established in the conductive object, which generate an opposing magnetic field. For example, when a permanent magnet is dropped through a copper pipe, an opposing magnetic field is generated which significantly slows the magnet as compared to a non-magnetic object dropped through the pipe. As another example, in some types of electric motors, current is supplied to coils which interact with magnets to move the magnets. The moving magnets interact with the coils to induce eddy currents in the coils which oppose the flow of current supplied to the coils. Magnetic forces including magnetic lift are of interest in mechanical systems to potentially orientate and move objects relative to one another while limiting the physical contact between the objects. One method of generating magnetic lift involves an electromagnetic interaction between moving magnetic fields and induced eddy currents. This approach, using eddy currents, is relatively undeveloped. In view of the above, new methods and apparatus for generating magnetic lift using eddy currents are needed.

SUMMARY

Electromechanical systems using magnetic fields to induce eddy currents in a conductive substrate and generate lift are described. In particular, hover engines are described which rotate a configuration of magnets to induce eddy currents in a conductive substrate where the interaction between the magnets and the induced eddy currents are used to generate lift forces and/or propulsive forces. In one embodiment, to generate propulsive forces, mechanisms are provided which allow an orientation of the configuration of magnets relative to the conductive substrate to be changed. The mechanisms enable control of a direction and a magnitude of the propulsive forces. Vehicles using these mechanisms are described.

In another embodiment, a vehicle with a two pairs of hover engines is described. Each pair of hover engines is coupled to a hinge mechanism which rotates the pair of hover engines in unison. Each hover engine is coupled to the vehicle at fixed angle such each hover engine outputs simultaneously lifting and propulsive forces. A directional control scheme which utilizes the propulsive forces of the hover engines and the rotation capabilities of the hinge mechanisms is described.

In one embodiment, a vehicle generally characterized as including four hover engines secured to hinge mechanisms which are secured to a rider platform is described. Each of the hover engines has an electric motor including a winding, a first set of permanent magnets and a first structure which holds the first permanent magnets. An electric current is applied to the winding can cause one of the winding or the first set of permanent magnets to rotate. The hover engine also includes a second structure, configured to receive a rotational torque from the electric motor to rotate the second structure. The second structure can hold a second set of permanent magnets where the second set of permanent magnets are rotated to induce eddy currents in a substrate such that the induced eddy currents and the second set of permanent magnets interact to generate forces which cause the vehicle to hover above and/or translate from location to location along the substrate.

The vehicle can also include one or more speed controllers coupled to the hover engines and an on-board electric power source that supplies the electric current to the hover engines via the one or more speed controllers. In one embodiment, the vehicle can include four electronic speed controllers. Each of the electronic speed controllers can be configured to be coupled to one of the hover engines.

The rider platform can have a front end, a back end and an upper surface. A first hinge mechanism can be located near the front end and beneath the rider platform. The first hinge mechanism can be coupled to the rider platform, the first hover engine and the second hover engine. The first hinge mechanism can be configured to rotate the first hover engine and the second hover engine in a first direction, during flight, when a force is applied on a first portion of the upper surface, and in a second direction, opposite the first direction, when the force is applied on a second portion of the upper surface.

A second hinge mechanism can be located near the back end and beneath the rider platform. The second hinge mechanism can be coupled to the rider platform, the third hover engine and the fourth hover engine. The second hinge mechanism can be configured to rotate the third hover engine and the fourth hover engine in the first direction, during flight, when the force is applied on a third portion of the upper surface, and in the second direction, when the force is applied on a fourth portion of the upper surface.

The first hover engine, the second hover engine, the third hover engine and the fourth hover engine can each be secured to the vehicle at a fixed angle such that each of the first hover engine, the second hover engine, the third hover engine and the fourth hover engine output a translational force. When the vehicle is in a first orientation during flight, the translational forces from each of first hover engine, second hover engine, the third hover engine and the fourth hover engine can approximately cancel one another to provide a net translational force which is approximately zero. In other orientations, force imbalances can be created which cause the vehicle to move forwards, backwards and sideways. Further, the vehicle can be made to translate and turn or spin.

In one embodiment, the rider platform can be a skateboard deck. Further, the first hinge mechanism and the second hinge mechanism can each be mechanically secured to a bottom of an interface plate and the rider platform is mechanically can be secured to a top of the interface plate. Alternatively, the first hinge mechanism and the second hinge mechanism can each be mechanically coupled directly to the rider platform. Further, the first hinge mechanism or the second hinge mechanism can be adjustable to increase or decrease a magnitude of the force needed to instantiate a particular amount of rotation in the first hinge mechanism or the second hinge mechanism.

In other embodiments, the on-board electric power source can be secured in an enclosure beneath the rider platform between the first hinge mechanism and the second hinge mechanism. Also, the on-board electric power source can include a plurality of battery pouch cells. The battery pouch cells can be stacked and connected in series to generate a desired output voltage level.

In yet other embodiments, the vehicle can include a wireless transceiver configured to communicate with a remote device and the one or more speed controllers. The one or more electronic speed controllers can be configured to receive, via the wireless transceiver, a command from the remote device to shut down the first hover engine, the second hover engine, the third hover engine and the fourth hover engine and in response to the command, shutdown each of the hover engines. In one embodiment, each of the electronic speed controllers is mounted above one of the hover engines.

The rider platform includes a first side and a second side along a length of the rider platform between the front end and the back end. When the force is applied in a fifth portion on the upper surface near the first side, both the first hinge mechanism and the second hinge mechanism can rotate in opposite directions to cause the vehicle to translate sideways in a direction from the second side to the first side. The vehicle can be configured such that when the force is applied near the back end of the upper surface, the front end rises and the vehicle translates forwards and when the force is applied near the front end of the upper surface, the back end rises and the vehicle translates backwards. In embodiment, the vehicle is configured such that only the first hinge mechanism rotates, when the force is applied on the first portion of the upper surface or on the second portion of the upper surface. In response, the vehicle translates and turns when the force is applied on the first portion of the upper surface or on the second portion of the upper surface.

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to the invention by one skilled in the art without departing from the spirit and scope of the invention.

FIGS. 21 to 23 are illustrations of block diagrams and equations associated with a guidance, navigation and control system in accordance with the described embodiments.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Magnetic Lift System Overview

With respect to FIGS. 1 to 4C, some general examples and operating principles of a magnetic lift system are described. In particular, a hoverboard system configured to lift and propel a rider is discussed. The hoverboard system can include a hoverboard having hover engines and a substrate on which the hoverboard operates. The substrate can include a conductive portion in which eddy currents are induced. The electromagnetic interaction between the device which induces the eddy currents and the induced eddy currents can be used to generate electromagnetic lift and various translational and rotational control forces.

Figure 1:
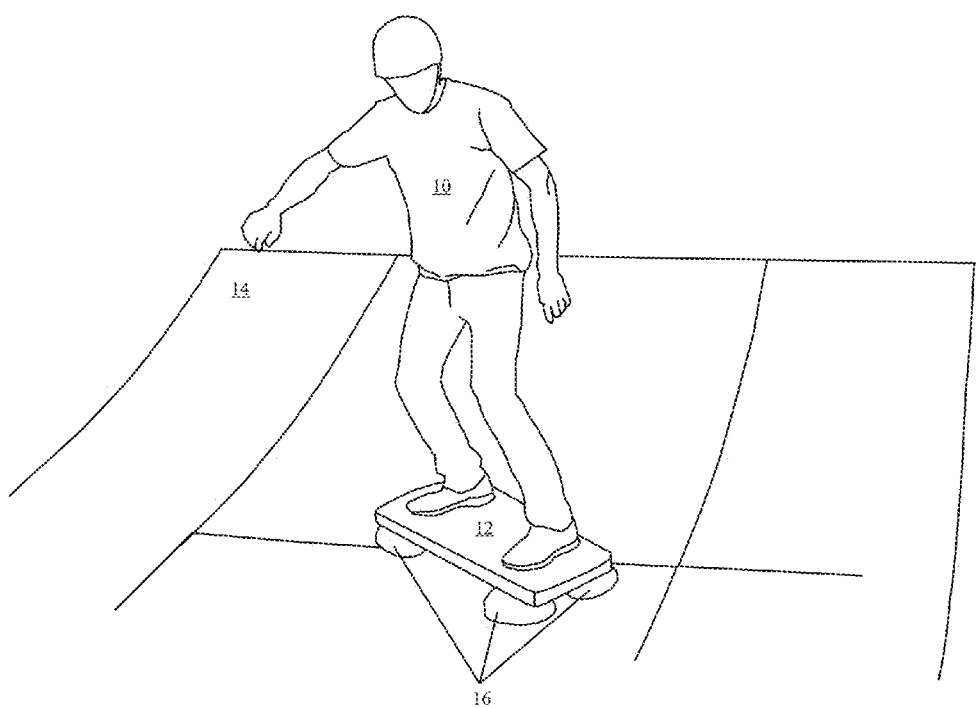
FIG. 1 is an illustration of a person riding a hoverboard in accordance with the described embodiments.

A hoverboard is one example of an electromechanical system which generates forces, such as lift, via an interaction between a moving magnetic field source (e.g., permanent magnets) and induced eddy currents. FIG. 1 is an illustration of a person 10 riding a hoverboard 12. In one embodiment, the hoverboard includes four hover engines, such as 16. The hover engines 16 generate a magnetic field which changes as function of time. The time varying magnetic field interacts with a conductive material in track 14 to form eddy currents. The eddy currents and their associated magnetic fields and the magnetic fields from the hover engine interact to generate forces, such as a lifting force or a propulsive force. Examples of eddy currents which can be generated are described with respect to FIGS. 2 and 3. Lift and drag associated with induced eddy currents is described with respect to FIGS. 4A-4C. Further details of magnet configurations, eddy current patterns, lift predictions and comparison to experimental data are described below with respect to FIGS. 24 to 41.

In FIG. 1, the track 14 is formed from copper. In particular, three one eighth inch sheets of copper layered on top of one another are used. Other conductive materials and track configuration can be used. For example, a track formed using a top sheet of copper over aluminum sheets or only aluminum sheets can be used. Thus, a track formed from copper sheets is described for the purposes of illustration only.

Curved surfaces may be formed more easily using a number of layered thin sheets. For example, a half-pipe can be formed. In FIG. 1, a portion of a half-pipe is shown. The track 14 can include various sloped and flat surfaces and the example of half-pipe is provided for illustrative purposes only.

The thickness of the conductive material which is used can depend on the material properties of the conductive material, such as its current carrying capacity and the amount of magnetic lift which is desired. A particular hover engine, depending on such factors, as the strength of the output magnetic field, the rate of movement of the magnetic field and the distance of the hover engine from the surface of a track can induce stronger or weaker eddy currents in a particular track material. Different hover engines can be configured to generate different amounts of lifts and thus, induce stronger or weaker eddy currents.

The current density associated with induced eddy currents in the material can be a maximum at the surface and then can decrease with the distance from the surface. In one embodiment, the current density which is induced at the surface can be on the order of one to ten thousand amps per centimeter squared. As the conductive material becomes thinner, it can reach a thickness where the amount of current potentially induced by the hover engine is more than the conductive material can hold. At this point, the amount of magnetic lift output from the hover engine can drop relative to the amount of lift which would be potentially generated if the conductive material was thicker. This effect is discussed in more detail with respect to FIG. 4C.

As the thickness of the material increases, the induced currents become smaller and smaller with increasing distance from the surface. After a certain thickness is reached, additional material results in very little additional lift. For the hover engines used for the hoverboard 12, simulations indicated that using ½ inch of copper would not produce much more lift relative to using ⅜ inch of copper. In general, the simulations indicated, that as the rotation rate of the hover engine is increased, more current was concentrated closer to the surface.

For the device shown in FIG. 1, simulations predicted that using only ⅛ inch sheet of copper would significantly lower the lift versus using a half inch of copper. Finite element analysis to solve Maxwell's equations was used. In particular, Ansys Maxwell (Ansys, Inc., Canonsburg, Pa.).

In various embodiments, the amount of copper which can be used varied depending on the application. For example, for a small scale model of a hoverboard configured to carry a doll, a ⅛ inch sheet of copper may be more than sufficient. As another example, a track with a thinner amount of conductive material can lead to less efficient lift generation as compared to track with a thicker amount of a more conductive material. However, the cost of the conductive material can be traded against the efficiency of lift generation.

A substrate 14 can include a portion which is configured to support induced eddy currents. In addition, it can include portions used to add mechanical support or stiffness, to provide cooling and/or to allow a track portions to be assembled. For example, pipes or fins can be provided which are configured to remove and/or move heat to a particular location. In another example, the substrate 14 can be formed as a plurality of tiles which are configured to interface with one another. In yet another example, the portion of the substrate 14 which is used to support the induced eddy currents may be relatively thin and additional materials may be added to provide structural support and stiffness.

In various embodiments, the portion of the substrate 14 used to support induced eddy currents may be relatively homogenous in that its properties are substantially homogeneous in depth and from location to location. For example, a solid sheet of metal, such as silver, copper or aluminum can be considered substantially homogenous in it's in depth properties and from location to location. As another example, a conductive composite material, such as a polymer or composite, can be used where the material properties on average are relatively homogeneous from location to location and in depth.

In other embodiments, the portion of the substrate 14 used to support the induced eddy currents can vary in depth but may be relatively homogeneous from location to location. For example, the portion of the substrate 14 which supports the eddy currents can be formed from a base material which is doped with another material. The amount of doping can vary in depth such that the material properties vary in depth.

In other embodiments, the portion of the substrate 14 which supports the eddy currents can be formed from layers of different materials. For example, an electric insulator may be used between layers of a conductive material, such as layers of copper insulated from one another. In another example, one or more layers of a ferromagnetic material can be used with one or more paramagnetic materials or diamagnetic materials.

In yet another example, the surface of the substrate 14 which supports the eddy currents can include a surface structure, such as raised or sunken dimples which effect induced eddy currents or some other material property. Thus, from location to location there may be slight variations in material properties but averaged over a particular area the material properties may be relatively homogeneous from location to location.

In one embodiment, the person can control the hoverboard 12 by shifting their weight and their position on the hoverboard. The shift in weight can change the orientation of one or more of the hover engines 16 relative to the surface of the track 14. The orientation can include a distance of each part of the hover engine from the track. The orientation of each hover engine, such as 16, relative to the surface of the track can result in forces parallel to the surface being generated.

The net force from the hover engines 16 can be used to propel the vehicle in a particular direction and control its spin. In addition, the individual may be able to lean down and push off the surface 14 to propel the hoverboard 12 in a particular direction or push and then jump onto to the hoverboard 12 to get it moving in a particular direction.

Figure 2:
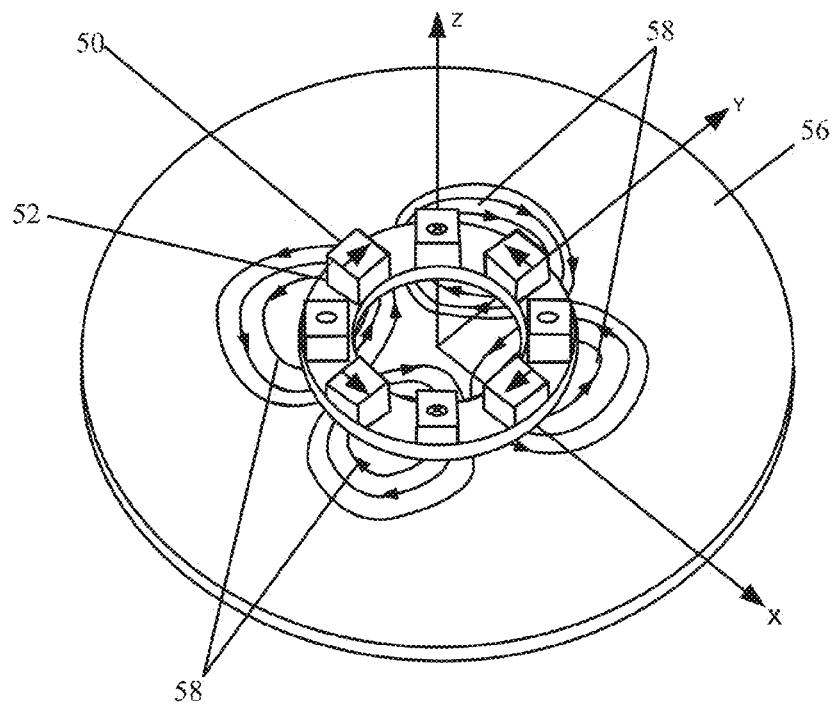
FIGS. 2 and 3 are illustrations of eddy currents generated on a conductive plate in response to arrangements of magnets rotated above the plates in accordance with the described embodiments.
Figure 3:
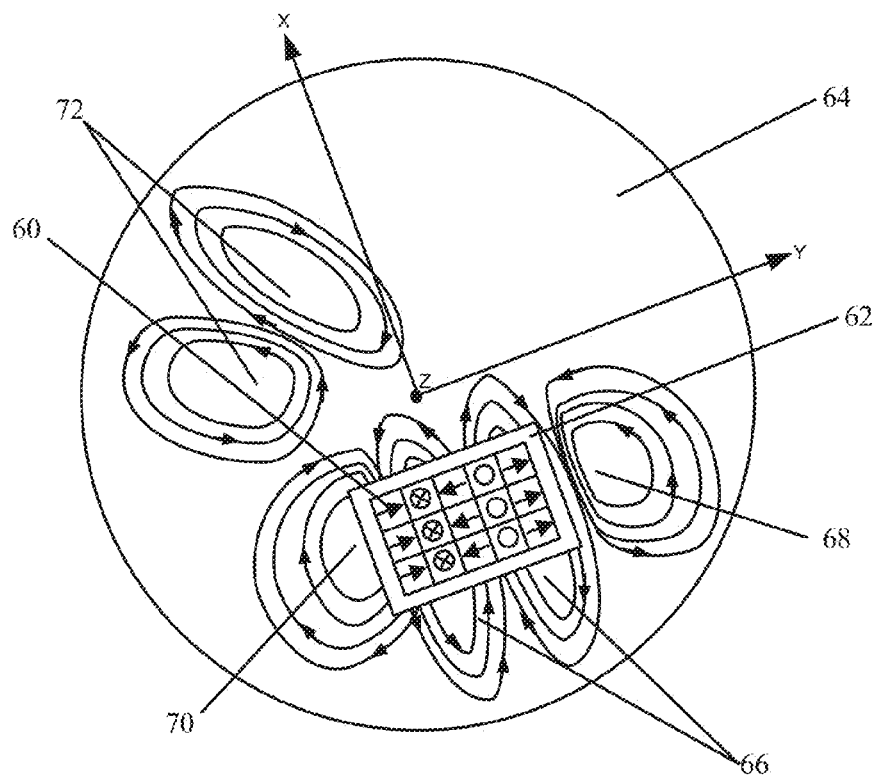

Next, a few examples of magnet arrangements, which can be used with a hover engine, are described with respect to FIGS. 2 and 3. FIGS. 2 and 3 are illustrations of eddy currents generated on a conductive plate in response to arrangements of magnets rotated above the plates. The conductive plate is the portion of the substrate which is configured to support induced eddy currents. The eddy currents and associated forces which are generated were simulated using Ansys Maxwell 3D (Canonsburg, Pa.). In each of the simulations, an arrangement of magnets is rotated at 1500 RPM at ½ inches height above copper plates 56 and 64, respectively. The copper plates are modeled as ½ inch thick. The plate is modeled as being homogeneous in depth and from location to location. The width and length of the plate is selected such that edge effects that can occur when a STARM induces eddy currents near the edge of the plate are minimal.

The magnets are one inch cube Neodymium alloy magnets of strength N50, similar magnets can be purchased via K and J magnetics (Pipersville, Pa.). The magnets weigh about 3.6 ounces each. Magnets of different sizes, shapes and materials can be utilized and this example is provided for the purpose of illustration only. For example, a design using twelve millimeter cubed shaped magnets is described with respect to FIG. 17A and a design using cylinders and cubic shaped magnets is described with respect to FIG. 17B.

In FIG. 2, eight one inched cube magnets, such as 50, are arranged with an inner edge about two inches from the z axis. The magnets are modeled as embedded in an aluminum frame 52. The arrow head indicates the north pole of the magnets. The polarities of four of the magnets are perpendicular to the z axis. The open circle indicates a north pole of a magnet and circle with an x indicates a south pole of a magnet. A polarity pattern involving four magnets is repeated twice.

In various embodiments, the polarity pattern of the magnets shown in the figure can be repeated one or more times. One or more magnets of different sizes and shapes can be used to form a volume of magnets which match a polarity direction associated with a polarity pattern. For example, two one half inch wide rectangular magnets with a total volume of one cubic inch or two triangular magnets with a total volume of one cubic inch can be aligned in the same direction to provide a polarity direction in a polarity pattern. In the polarity pattern, a magnets with a polarity direction different than an adjacent magnet may touch the adjacent magnet or may be separate from the adjacent magnet.

For a given number of magnets of a particular cubic size, the distance from the z axis of the face of the magnets can be adjusted such that the magnet's edges are touching or are a small distance apart. With this example using eight magnets, an octagon shape would be formed. A configuration of twenty one inch cube magnets arranged around a circle with the polarity pattern is described below. The inner edge of this arrangement of magnets is about 3.75 inches from the rotational axis.

When the magnets are brought together, the magnitude of the lift and drag which is generated per magnet can be increased relative to when the magnets are spaced farther apart. In one embodiment, trapezoidal shaped magnets can be utilized to allow the magnets to touch one another when arranged around a rotational axis. A different trapezoidal angle can be used to accommodate different total number of magnets, such as four magnets (90 degrees), eight magnets (45 degrees), etc.

A combination of rectangular and triangular shaped magnets can also be used for this purpose. For example, triangular magnets can be placed between the cubic magnets shown in FIG. 2. In one embodiment, the polarity pattern for groups of four trapezoidal magnets or combinations of rectangular and triangular magnets can be similar to what is shown in FIG. 2.

When the arrangement of eight magnets is rotated above the copper plate, eddy currents are induced in the copper. In the example of FIG. 2, the simulation indicates four circular eddy currents 56 are generated. The four eddy currents circle in alternating directions and are approximately centered beneath the circulating magnets.

An electromagnetic interaction occurs where the circulating eddy currents generate a magnetic field which repels the arrangement of magnets such that lifting forces and drag forces are generated. As described above, the center position of the eddy currents rotate as the magnets rotate (This rotation is different from the rotation of the circulating current which forms each eddy current). However, the eddy currents are not directly underneath the four magnets aligned with the z axis. Thus, the eddy currents can generate a magnetic field which attracts one of the poles of permanent magnets to which it is adjacent. The attractive force can act perpendicular to the lift to produce drag, which opposes a movement of the magnets. The drag can also be associated with a torque. The drag torque is overcome by an input torque supplied by a motor coupled to the arrangement of magnets.

In a simple example, a current circulating in a circular coil generates a magnetic field which looks like a magnetic field of a bar magnet where the orientation (north/south) depends on the direction of the current. The strength of the magnetic field which is generated depends on the area of the circular coil and the amount of current flowing through the coil. The coil constrains the locations where the current can flow.

In this example, there are not well defined circuits. Thus, one eddy current can interact with an adjacent eddy current. The interaction causes the magnitude of the current to increase at the interface between eddy currents such that magnitude of the current varies around circumference of each eddy current. Further, the current also varies in depth into the material with the greatest current per area occurring at the surface and then decreasing in depth in to the surface.

In addition, unlike circuits with a fixed position, the center of the eddy currents rotate as the magnets inducing the currents rotates. Unlike when a magnetic is moved linearly over a conductive material, separate eddy current forms in front of and behind the magnet. In this example, the four poles (magnets with north and south perpendicular to the surface of the plate) are close enough such that the eddy current formed in front of one pole merges with the eddy current formed behind the next adjacent pole. Thus, the number of eddy currents formed is equal to the number of poles which is four. In general, it was observed for this type of configuration that the number of eddy currents which formed was equal to the number of poles used in the magnet configuration.

Further, material interfaces can affect the induced eddy currents such that an amount of lift and drag which is generated is different near the interfaces as opposed to away from the interfaces. For example, a surface on which eddy currents are induced can have edges where the material which supports the induced eddy currents ends. Near the boundaries, when a STARM approaches an edge, the eddy currents tend to get compressed which affects the resultant lift and drag.

In another example, a surface can have interfaces through which there are discontinuities in the conductivity. For example, edges of two adjacent copper sheets used to form a surface may not touch, may partially touch or may be conductively insulated from one another. The discontinuous conductivity can lessen or prevent current from flowing across the interface which affects the lift and drag generated from the induced eddy currents.

In one embodiment, a substrate which supports induced eddy currents can be formed from a number of sheets which are stacked in layers, such ⅛ inch copper sheets stacked on top of one another. A discontinuity may be formed in one layer where two adjacent sheets meet, such as small gaps between the two sheets which reduce the current which flows from a first sheet to an adjacent second sheet. The gaps may allow for thermal expansion and simplify the assembly process. To lessen the effect of the discontinuity, adjacent edges between sheets can be staggered from layer to layer. Thus, the discontinuity at particular location may occur in one layer but not the other adjacent layers.

In some instances, a conductive paste can be used to improve the conductivity between sheets. In another embodiment, adjacent sheets can be soldered together. In yet another embodiment, flexible contacts, which can be compressed and then expand, can be used to allow current to flow between different sheets.

In FIG. 3, a three row by five column array of one inch cube magnets, such as 60, is rotated above a copper plate. The arrays could also be using a single magnet in each row. The magnets are modeled as surrounded by an aluminum frame 62. The magnets in this example are configured to touch one another. A magnet pattern for each row of five magnets is shown. In alternate embodiment, a five magnet pattern of open circle, left arrow (pointing to open circle), circle with an "x", right arrow (pointing away from circle with an x) and open circle can be used. This compares to the left arrow, circle with an "x", left arrow, open circle and right arrow pattern shown in the Figure.

The magnet pattern is the same for each row and the magnet polarity is the same for each column. In various embodiments, a magnet array can include one or more rows. For example, a magnet array including only one row of the pattern shown in FIG. 3 can be used.

Multiple arrays with one or more rows can be arranged on a rotating body, such that the rotating body is balanced. For example, magnet arrays of two, three, four, etc. arrays of the same number of magnets can be arranged on a rotating body. In another embodiment, two or more pairs of magnet arrays with a first number of magnets and two or more pairs of magnets arrays with a second number of magnets can be arranged opposite one another on a rotating body.

In the example of FIG. 3, two eddy currents, 66, are generated under the magnet array and two eddy currents 70 and 68 are formed ahead and behind the array. These eddy currents move with the array as the array rotates around the plate. As the array is moved over the plate 64, eddy currents, such as 72 spin off. The eddy currents 66, 68 and 70 generate magnetic fields which can cause magnetic lift and drag on the array. When two of these types of arrays placed close to one another, the simulations indicated that the eddy current induced from one array could merge with the eddy current induced from the other array. This effect diminished as the arrays were spaced farther apart.

In the examples of FIGS. 2 and 3, the simulations indicated that more lift force was generated per magnet in the configuration of FIG. 3 as compared to FIG. 2. Part of this result is attributed to the fact that a portion of the magnets in FIG. 3 is at a greater radius than the magnets in FIG. 2. For a constant RPM, a greater radius results in a greater speed of the magnet relative to the conductive plate which can result in more lift.

The lift per magnet can be total lift divided by the total magnet volume in cubic inches. For one inch cube magnets, the volume is one cubic inch. Thus, the total number of magnets is equal to the volume in cubic inches. Hence, the use of lift force per magnet in the previous paragraph. The use of total lift divided by the magnet volume of a magnet arrangement provides one means of comparing the lift efficiency of different magnet arrangements. However, as noted above, the speed of the magnet relative to the substrate, which is a function of radius and RPM, effects lift and hence may be important to consider when comparing magnet configurations.

In FIGS. 2 and 3, a portion of the magnet poles in the magnet polarity pattern are aligned such that the poles are parallel to an axis of rotation of the STARM (The poles labeled with "x" or "o" in the Figures). When the bottom of a STARM is parallel to a surface which supports the induced eddy currents, the portion of the magnet poles and the axis of rotation are approximately perpendicular to the surface.

In this configuration, to interact with a surface, a STARM can be rotated on its side, like a tire riding on a road, where the axis of rotation is approximately parallel to the surface. In particular embodiments, a mechanism, such as an actuator, can be provided which can dynamically rotates one or more of the magnet poles (again, "x" and "o" labeled magnets) during operation. For example, the magnet poles shown in FIGS. 2 and 3 may be rotatable such that they can be moved from an orientation where they are perpendicular to the surface as shown in FIGS. 2 and 3 to an orientation where they are parallel to the surface and back again. When the magnets are turned in this manner, the amount of lift and drag which are generated can be reduced. In additional embodiments, fixed magnet configurations can be utilized where the magnet poles shown in FIGS. 2 and 3 are rotated by some angle between zero and ninety degrees relative to their orientation in the FIGS. 2 and 3.

Figure 4A:
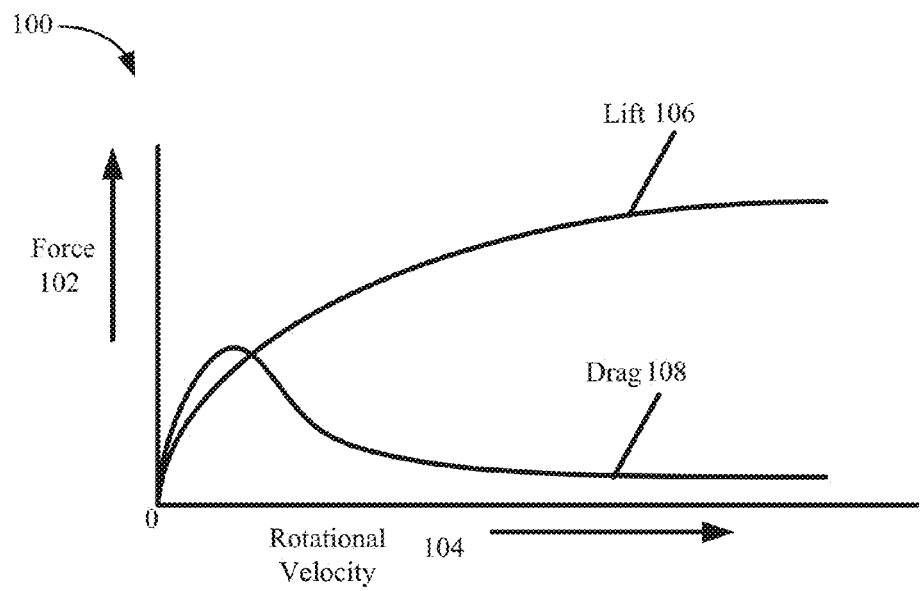
FIG. 4A is a plot of lift and drag curves associated with an arrangement of rotating magnets in accordance with the described embodiments.

FIG. 4A includes a plot 100 of lift 106 and drag 108 curves associated with an arrangement of rotating magnets in accordance with the described embodiments. The curves are force 102 versus rotational velocity 104. The curves can be determined via experimental measurements and/or simulations. It is noted the magnetic lift and drag is separate from any aerodynamic lift and drag which may be associated with the rotation of magnet arrangement associated with hover engine.

Although not shown, an amount of torque can be determined and plotted. As shown in FIG. 2, an array of magnets can be radially symmetric. In some instances, such as when a radially symmetric array is parallel to the conductive substrate, the net drag force may be zero. Nevertheless, a torque which opposes the rotation of the array is generated. The rotational input from a motor can be used to overcome the torque.

As shown in FIG. 4A, the magnetic drag increases as velocity increases, reaches a peak and then starts to decrease with velocity. Whereas, the magnetic lift increases with velocity. The velocity can be the velocity of the magnets relative to the surface which induces the eddy. When the magnets are rotating, this velocity is product of a distance from the axis of rotation times the angular velocity. The velocity can vary across a face of a magnet as distance from the axis of rotation varies across the face of the magnet.

In various simulations of a magnet configuration shown in FIG. 3, the most drag was observed to occur between 250 and 350 RPM. However, the amount of drag including its peak can depends on such variables as the size and the shape of the magnets, a distance of the magnets from the substrate in which the eddy currents are induced, a speed of the magnets relative to the substrate which changes as a function of radius and a thickness of the substrate and a strength of the magnets. Also, for an arrangement of a plurality of magnets, the arrangement of their poles and spacing relative to one another can affect both the lift and drag, which is generated. Thus, the value range is provided for the purposes of illustration only.

Figure 4B:
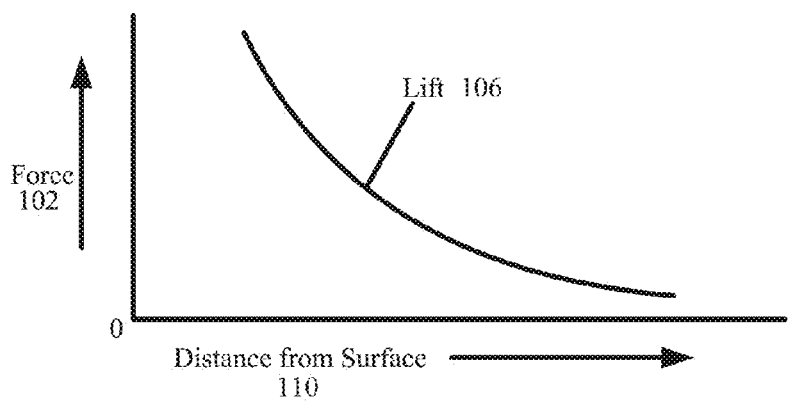
FIG. 4B is a plot of lift associated with an arrangement of rotating magnets as a function of distance from a conductive substrate in accordance with the described embodiments.

FIG. 4B is a plot of force 102 associated with an arrangement of rotating magnets as a function of distance 110 from a conductive substrate. In this example, a configuration of magnets similar to shown in FIG. 3 was simulated. The plot is based upon a number of simulations at a constant RPM. The lift appears to follow an exponential decay curve as the distance from the surface 110 increases.

Figure 4C:
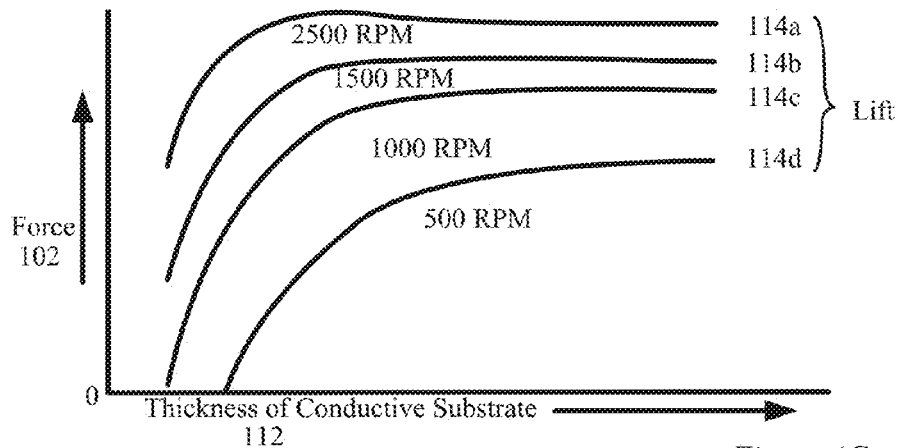
FIG. 4C is a plot of lift curves associated with an arrangement of rotating magnets as a function a thickness of a conductive substrate and RPM in accordance with the described embodiments.

FIG. 4C is a plot of lift curves associated with an arrangement of rotating magnets as a function a thickness of a conductive substrate and RPM. In this example, a configuration similar to what is shown in FIG. 3 was used. The conductive substrate is copper and thickness of the copper is varied between 0.05 and 0.5 inches in the simulation.

The simulations predicted that the amount of generated lift begins to decrease after a certain threshold thickness of copper is reached and is relatively constant above the threshold. The location of the threshold varies as a function of RPM. It may also vary according to the magnet configuration. In one simulation, negative lift was predicted, i.e., an attractive force was generated when the thickness was thin enough.

Magnetic Propulsion

In this section, configurations of STARMs, which generate propulsive and lift forces, are described. In particular embodiments, an orientation of one or more STARMs relative to a substrate can be used to generate propulsive and/or control forces. Other mechanisms of propulsion are possible, alone or in combination with controlling the STARM orientation to generate propulsive and directional control forces. Thus, these examples are provided for the purpose of illustration only and are not meant to be limiting. For example, the rotation rate of one or more STARM can be varied to provide yaw control.

Figure 5A:
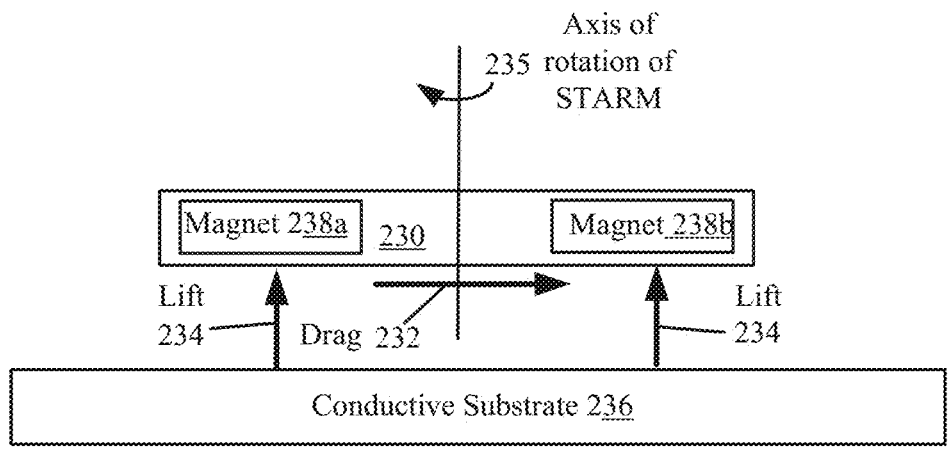
FIGS. 5A, 5B, 6 and 7 are illustrations of STARMs tilted relative to a conductive substrate and associated forces which are generated in accordance with the described embodiments.

In FIG. 5A, a STARM 230 is shown in a neutral position. The STARM includes magnets, such as 238a and 238b. In the neutral position, the lifting forces 234 on average over time are equal across the bottom surface of the STARM 230. Further, the net drag forces 232 acting on the STARM 230 are balanced (While rotating, the STARM generates a magnetic field which is moved through the conductive substrate 236. The eddy currents formed in the substrate as a result of the moving magnetic field resist this movement, which can act as a drag force 232 on the STARM 230). With imbalances due to lift and drag balanced, the STARM 230 will substantially remain in place of over the conductive substrate.

Small imbalances may exist, which cause the STARM to move in one direction or another. For example, local variations in material properties in the conductive substrate 236 can cause small force imbalances. As another example, the dynamic vibration of the STARM 230, such as from adding or removing loads can cause small force imbalances. However, unless the small force imbalances are biased in a particular direction, the STARM will remain relatively in the same location (i.e., it might move around a particular location in some manner).

If the rotational momentum is not balanced, the STARM may rotate in place. A vehicle can include multiple STARMs which are counter rotating to balance the rotational forces. Further, as will be described below in more detail, the orientation of a STARM can be controlled to generate a moment around a center of mass of a vehicle, which allows the rotation of a vehicle to be controlled.

Figure 5B:
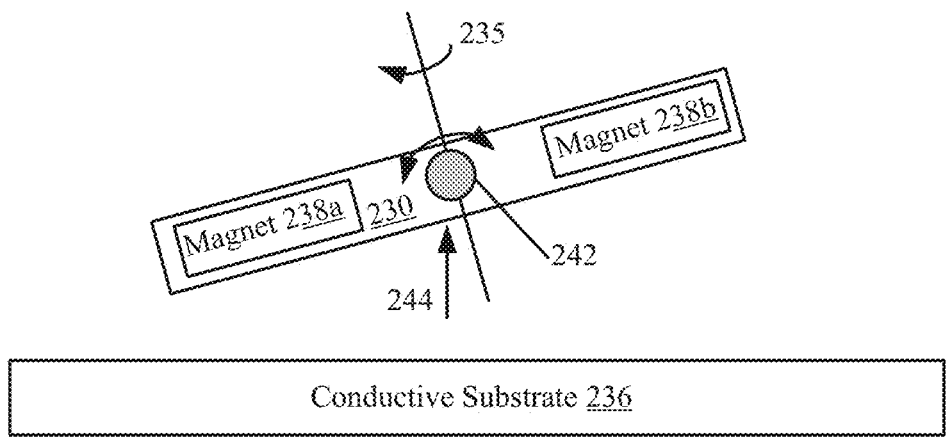

FIG. 5B shows the STARM 230 in a tilted position. The STARM 230 has been rotated around an axis 242 which is perpendicular to the axis of rotation 235 of the STARM 230. When the STARM 230 is tilted, more drag is generated on the side of the STARM 230 closest to the substrate 236. As is described in more detail below, the drag typically increases when the magnets are brought closer to the substrate. The drag imbalance on the different sides of the STARM causes a thrust to be generated mostly in the direction of the tilt axis 242, i.e., into or out of the page. For some magnet and system configurations, the lift 244 can remain relatively constant or even increase as a function of tilt angle, i.e., lift 244 can be greater than lift 234. The amount of thrust may increase when the tilt angle is first increased. The amount of tilt which is possible can be limited to prevent the STARM 230 form hitting the substrate 236.

Figure 6:
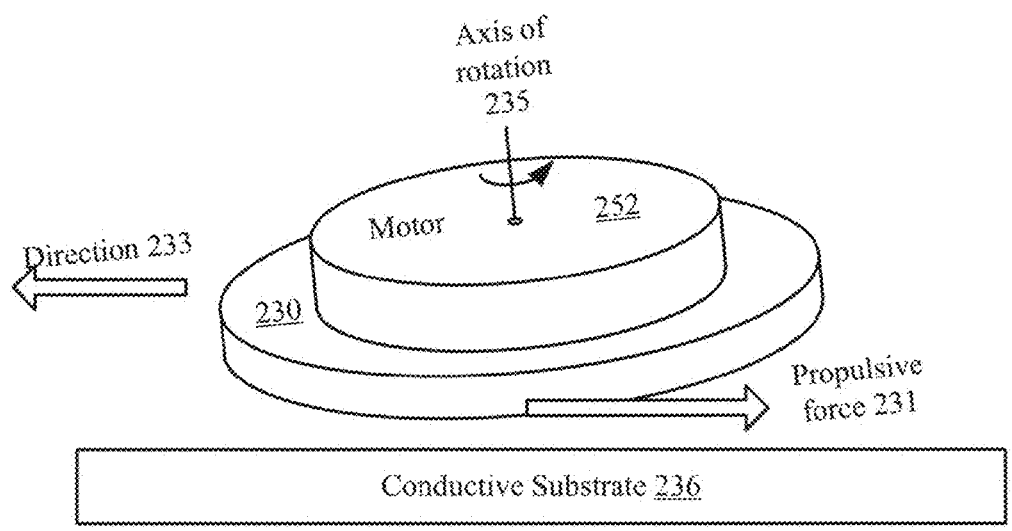

FIG. 6 shows an example of a hover engine including a STARM 230 and motor 252 climbing an inclined substrate 236. The hover engine is tilted to generate a propulsive force 231 which moves the hover engine in direction 233 up the included surface. In one embodiment, the magnitude of the propulsive force 231 can be sufficient for a hover engine to lift a payload in a vertical direction. For example, the conductive substrate 236 can be aligned vertically and the hover engine can be configured to climb vertically and carry its weight and a payload up the wall.

Figure 7:
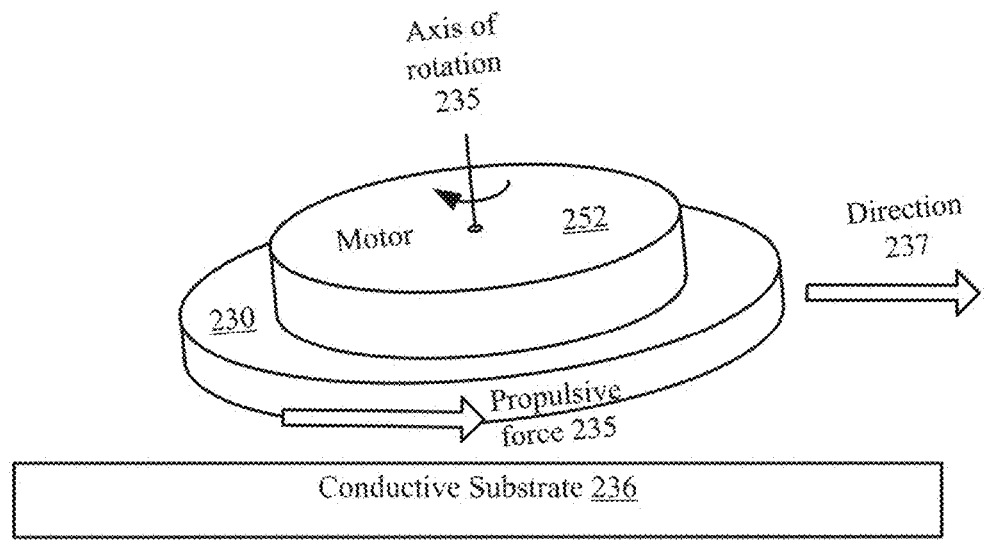

FIG. 7 shows an example of a hover engine braking as it descends down an incline. In FIG. 7, the hover engine, which includes motor 252 and STARM 230, is moving down a sloped substrate in direction 237. The hover engine is outputting a propulsive force 235 which is pushing the hover engine up the incline opposite the direction of movement 237. The braking force slows the descent of the hover engine down the inclined substrate. In a particular embodiment, a hover engine can be configured to output a sufficient force to allow it to hold its position on an inclined surface, i.e., the force output from the hover engine balances the gravitational forces. In general, hover engines can be configured to output forces in a direction of movement for propulsion or opposite the direction of movement for braking.

Figure 8A:
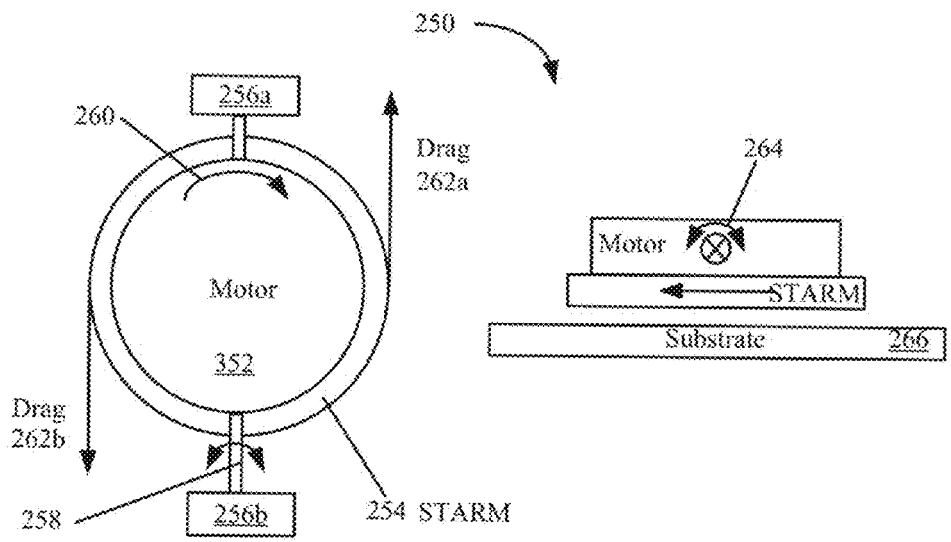
FIGS. 8A to 8C are illustrations force imbalances resulting from tilting a hover engine in accordance with the described embodiments.
Figure 8B:
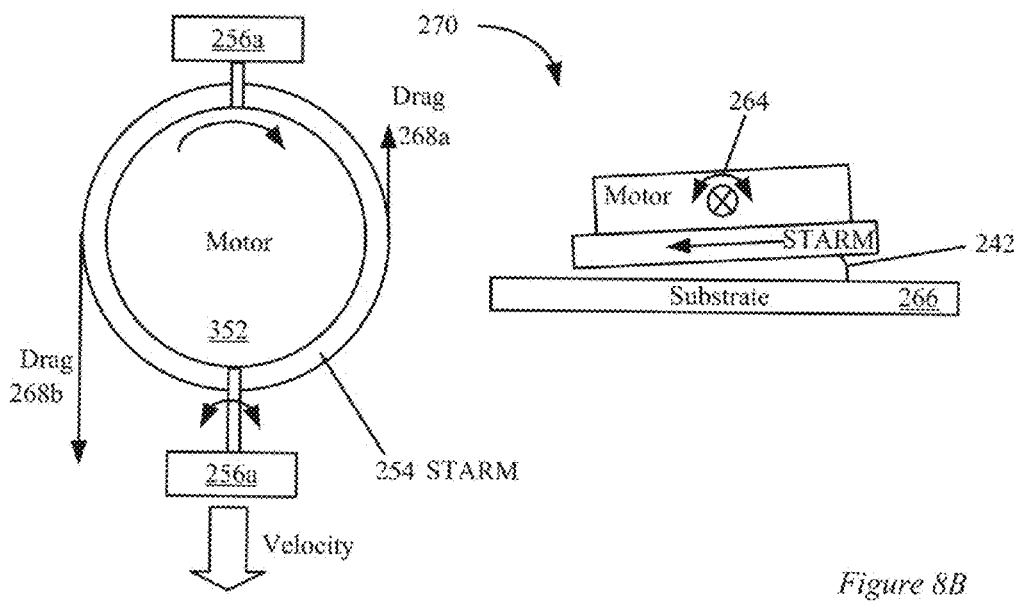
Figure 8C:
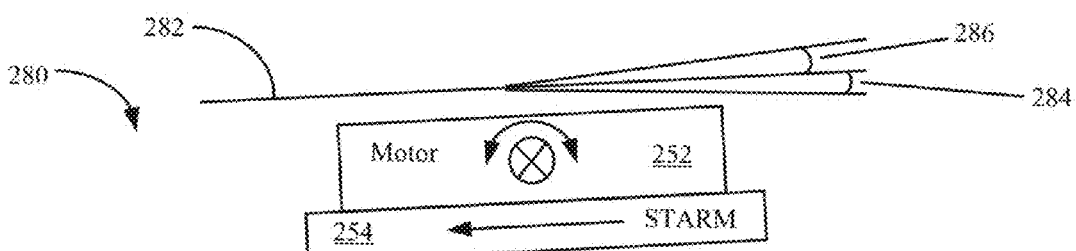

FIGS. 8A, 8B and 8C are block diagrams which are used to discuss more details associated with hovering and propulsive effects from rotating arrangements of magnets used in a hover engine. In FIG. 8A, a hover engine includes a motor 252 is coupled to a STARM 254. The STARM 254 is coupled to the motor 252 and the motor 252 is coupled to a rotatable member 258. The rotatable member 258 is coupled to anchors 256a and 256b. The combination of the rotatable member 258 and the anchors 256a and 256b can be configured to constrain a range of rotation of the rotatable member. For example, the rotatable member 258 may be allowed to rotate through some angle range 264 around its axis.

The rotatable member 258 can be configured to receive and input torque from some mechanism. For example, in one embodiment, a mechanical linkage can be provided which allows a user to supply a force. The force can be converted into torque which causes the rotatable member 258 and hence the motor 252 and the STARM 254 to rotate.

In another embodiment, an actuator can be used to supply the torque to rotate rotatable member 258. An actuation of the actuator can cause the motor 252 and STARM 254 to tilt relative to the substrate 266. The actuator can include a servo motor which receives control commands from a controller. In one embodiment, the actuator can include its own controller which receives control commands from a separate processor, which is part of the control system.

In yet another embodiment, a hover engine can be configured to receive an input force from a user and can include an actuator. The actuator can be used to change a position of the STARM, such as returning it to a designated position after a user has tilted it. In another operation mode, the actuator can be used to provide automatic control around some tilt position initiated by user via an input force.

It yet another embodiment, the actuator can be used to provide automatic controls which may be used to correct a control input from a user. For example, if the control system detects the magnetically lifted device is an unstable position as a result of a user input, the control system can control one or more STARMs to prevent this event from happening. A magnetic lifting device, such as hoverboard, can include one or more on-board sensors used to make these corrections.

A magnetically lifted device may also include one or more weight sensors for determining a weight distribution of a payload. The weight distribution associated with the device and payload can affect the response of the device in response a command to change an orientation of the device via some mechanism, such as a tiltable hover engine. For example, the weight distribution associated with a payload can affect the magnitude of rotational moments. Thus, knowledge of the weight distribution may be used to more finely tune the commands used to control the orientation of the STARM, such as selecting which STARM to actuate and an amount to actuate it.

When the STARM 254 and motor 252 are rotating, a rotation of the rotatable member 258 changes the angular momentum of the STARM and the motor. It can also change the magnetic forces acting on the STARM 254 as the magnetic forces vary with the distance of the magnets in the STARM 254 from the substrate 266. Therefore, the amount of torque needed to rotate the member 258 can depend on the moment of inertia associated with the STARM 254 and motor 252, how fast the STARM 254 and motor 262 are spinning and the height of the STARM 254 above the substrate 266. The height of the STARM above the substrate can depend on 1) its rotational velocity, which affects how much lift is generated, and 2) a payload weight and 3) how the payload weight is distributed on the device. The height of the STARM above the substrate can vary for different portions of the STARM and from STARM to STARM when a device includes multiple STARMs.

In the example of FIG. 8A, the STARM 254 is approximately parallel to the substrate 266. The magnetic drag, such as 262a and 262b, opposes the rotation of the STARM 254. The motor 252 is configured to rotate in the clockwise direction 260. Thus, the drag torque is in the counter clockwise direction. Power is supplied to the motor 252 to overcome the drag torque.

When the STARM is parallel to the substrate 266, the magnetic drag is balanced on all sides of the STARM 254. Thus, there is no net translational force resulting from the magnetic drag. As is described with respect to FIG. 25B, a net translational force is generated when the STARM 254 and its associated magnets is tilted relative to the substrate.

In FIG. 8B, the STARM 254 is in a titled position 270. Thus, one side of the side of STARM 254 is closer to the substrate 266 and one side of the STARM 254 is farther away from the substrate 266. The magnetic interaction between the magnets in the STARM 254 and substrate decreases as a distance between the magnets in the STARM and substrate 266 increases (As shown in the Figures below, the magnitude of the interactions vary non-linearly with the distance from the substrate.) Thus, in tilted position 270, the drag force 268b is increased on one side of the STARM 254 and the drag force 268a is reduced on the opposite side of the STARM 254 as shown in FIG. 8B. The drag force imbalance creates traction, which causes a translational force to be generated approximately in the direction of the axis of rotation of the rotational member 258.

When the STARM 254 is initially tilted, the translational force can result in an acceleration of the STARM 124 in the indicated direction and hence change in velocity in the indicated direction. In particular embodiments, with one or more STARMs configured to generate translational forces, a device can be configured to climb. In another embodiment, the device may be configured to maintain its position on a slope while hovering such that the gravitational forces acting on the device are balanced by the translational forces generated by the device and its associated hover engines.

A configuration and operational mode where a position of a device, such as a hoverboard, is maintained on a sloped substrate may be used as part of a virtual reality system where a user wears a virtual reality headset. Via the headset, the user may only see images generated by the headset or may see images generated by the headset in conjunction with the local surrounding visible to the user. A virtual reality headset may be used to generate images of a user moving through some terrain, likes a snowy slope, while the hovering device on which the user is riding moves side to side and forward and back on the sloped substrate. The sloped substrate may provide the user with the feeling of moving on a tilted slope while the virtual reality images may provide the visual imagery associated with movement. Fans may be used to add an additional sensation of movement (e.g., the feeling of wind on the user's skin).

The device can have sufficient propulsive ability to allow it to hold its position on the slope against the force of gravity. For example, the device can be moved side to side while it maintains its position on the slope. Further, the device may be able to move downwards on the slope and then climb upwards on the slope against gravity. In some instance, the climbing can be done while the device's orientation remains relatively unchanged, i.e., the device doesn't have to be turned around to climb. This maneuver can be accomplished by changing an orientation of the hover engines relative to the substrate which supports the induced eddy currents. These control functions will be discussed in more detail as follows.

Returning to FIGS. 8A and 8B the amount of tilt in a particular direction can affect the amount of force imbalance and hence the magnitude of the acceleration. Because the magnetic drag is function of the distance of the magnets from the substrate, the magnetic drag increases on the side closer to substrate and decreases on the side father away from the substrate. As the magnetic forces vary non-linearly with the distance of the magnets from the surface, the amount of translational forces which are generated may vary non-linearly with the tilt position of the STARM.

After a STARM 254 (or both the STARM 254 and motor 252) has been rotated via member 258 in a counter clockwise direction and the STARM has started translating in a first direction, an input torque can be provided which tilts the STARM in a clockwise direction to reduce the amount of translational force which is generated by the STARM. When the STARM is tilted past the horizontal in the clockwise direction, the STARM may generate a translational force which is in an opposite direction of the first direction. The translational force opposing the direction of motion can slow the STARM and bring it to rest. If desired, the translational force can be applied such that the hoverboard stops and then the STARM can begin to translate in an opposite direction.

FIG. 8C is a side view of a hover engine 280 coupled to a tilt mechanism in a tilt position. The hover engine includes a motor 252 and a STARM 254 which can be positioned over the substrate 266 as shown in FIGS. 25B and 25C. In one embodiment, the mechanism can include a minimum tilt off set angle 284. The minimum tilt off set angle 284 in this example is between the horizontal and line 282. The tilt range angle 286 is the angle amount through which the hover engine may rotate starting at the minimum tilt off set angle 284. The tilt mechanism can include one or more structures which constrain the motion of the tilt mechanism to the tilt angle range.

When the minimum tilt off set angle 284 is zero and the STARM 254 is parallel to the substrate 266, the STARM 254 may not generate a net translation force. A device to which a STARM is coupled can be tilted. Therefore, the angle of the STARM relative to the substrate can depend on the orientation of the STARM relative to some reference system associated with the device and the orientation of the device relative to the substrate where both orientations can change as a function of time. Thus, in some instances, a translation force can be generated even when the minimum tilt off-set is zero. When the minimum tilt off set angle is greater than zero, the STARM may generate a net translational force at its minimum position in a particular direction. When the minimum tilt off set angle is less than zero, then during the tilt angle range the magnitude of the force may be go to zero and the direction of the force which is generated can also change.

In some embodiments, the net minimum force generated by one hover engine can be balanced in some manner via translational forces associated with other hover engines. For example, as shown, two hover engines can be tilted to generate forces in opposite directions to cancel one another. Thus, although the net force for a single hover engine may be greater than zero at its minimum tilt off set angle position, it can be balanced by forces generated from another STARM such that the net force acting on the device is zero.

The forces which are generated from a tilted STARM can vary non-linearly with angle of the hover engine relative to the substrate. Thus, the change in force which is generated as a function of a change in angle can vary non-linearly. By utilizing, a minimum tilt angle offset, the hover engine can be configured to output more or less force in response to a change in a tilt angle over a selected tilt angle range. In this manner, the control characteristics of the device can be adjusted.

In one embodiment, the tilt mechanisms can include an adjustable tilt off set mechanism that allows the minimum tilt off set angle to be manually set. For example, a rotatable member with a protuberance can be provided where the protuberance is configured to impinge on a screw at one end of its range of rotation. As the screw is unscrewed, the range of rotation of the rotatable member can be decreased and the minimum tilt off set angle can be increased and vice versa. Using the adjustable tilt off set mechanism, a user or operator may be able to manually adjust the handling characteristics of the device.

Figure 9A:
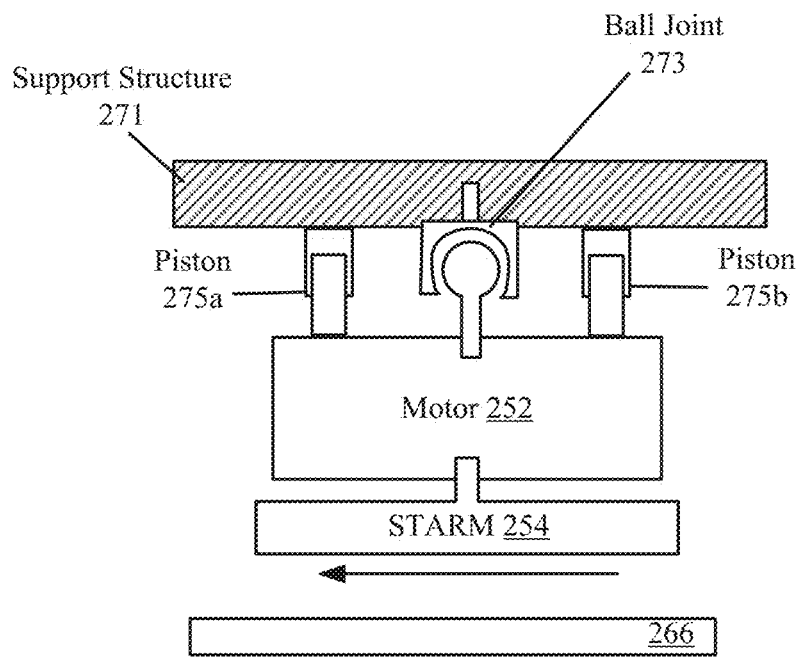
FIGS. 9A to 9B are illustrations of two orientation control mechanisms for a hover engine in accordance with the described embodiments.

Next, another example of a STARM which can be tilted through multiple degrees of freedom is described. In FIG. 9A, hover engine including a STARM 254 coupled to a motor 252 is shown. The hover engine is coupled to a support structure 271 via a ball joint 273. Two pistons, 275a and 275b, are shown which are coupled to the hover engine and the support structure 271. The pistons, 275a and 275b, can be used to push the hover engine downward and change a tilt angle of the STARM 254 relative to a substrate 266. A plurality of different pistons can be used to tilt the motor in a plurality of different directions. Other types of actuators can be used which generate a downward force on the hover engine to tilt the STARM 254 and the example of a piston for the purposes of illustration only.

Figure 9B:
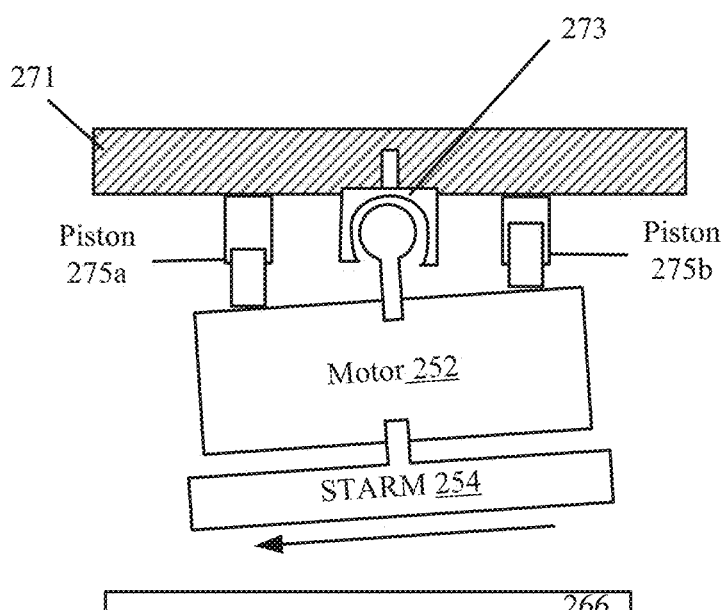

In FIG. 9B, a first piston 275A is shown extended downwards, which tilts the motor 252 and STARM 255 downwards on one side. To bring the motor 252 back to a horizontal position, the second piston 275b can be extended downwards which causes the first piston to shorten 275a. To tilt the motor 252 and STARM 254 in the opposite direction, the second piston 275b can be extended a greater amount, which forces the first piston to shorten 275a. In various embodiments, multiple pairs of pistons can be used to tilt the motor in different directions and change a direction in which a force is generated as a result of tilting the STARM. The pistons can be coupled to the motor and/or the support structure via an appropriate joining mechanism which may possess some rotational degrees of freedom.

Vehicles Including Flight Data

Figure 10A:
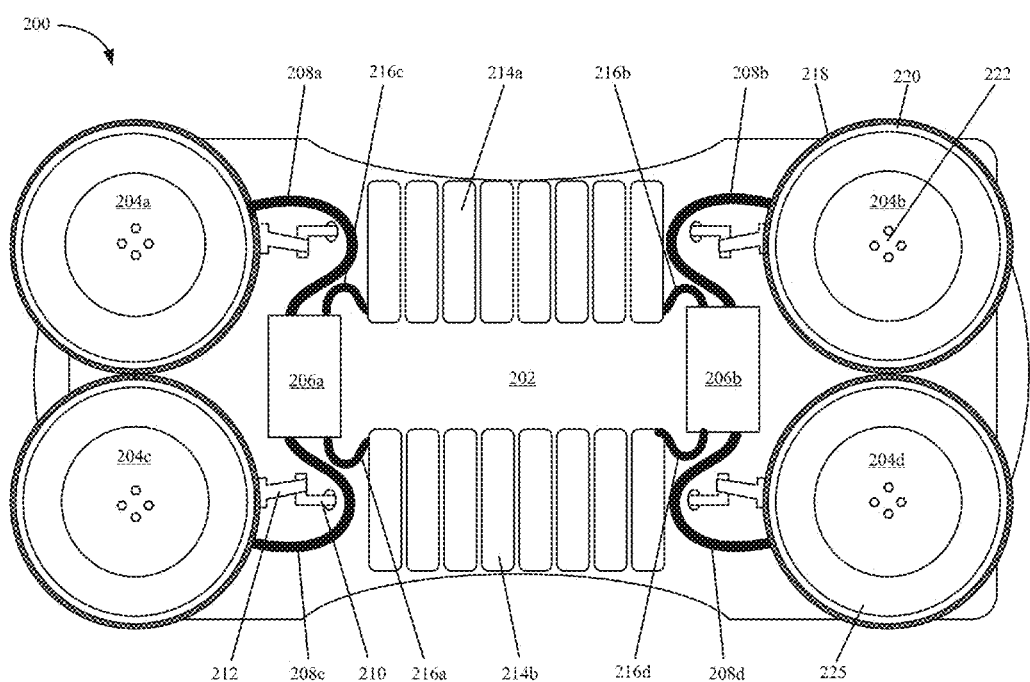
FIGS. 10A, 10B and 10C are a bottom, top and side view of a battery powered hoverboard in accordance with the described embodiments.

In this section, flight data including performance from two vehicles is presented. First, a description of the vehicles is presented then the test results are shown. FIG. 10A is a bottom view of vehicle 200. In FIG. 10A, the vehicle 200 includes four hover engines, 204a, 204b, 204c and 204d. The hover engines are of equal size and use similar components, i.e., similar motor, number of magnets, STARM diameter, etc. The dimensions of the vehicle 200 are about 37.5 inches long by 4.5 inches high by 18.5 inches wide. The weight of the vehicle unloaded is about 96.2 pounds.

Each hover engine includes a STARM, such as 225, with a motor (not shown) and engine shroud 218 with a gap between the shroud 218 and STARM 225 to allow for rotation. The STARM 225 is mechanically connected to the motor via fasteners 222. The motor, which mount below the STARMs in the drawing, provides the input torque which rotates the STARM. In alternate embodiments, a single motor can be configured to drive more than one STARM.

The STARMs, such as 225 are 8.5 inches in diameter. The STARMs are configured to receive sixteen one inch cube magnets. Thus, the total volume of the magnets on the vehicle is sixty four cubic inches. As will be described below, other STARM designs with different dimensions carrying different magnet volumes can be used.

Figure 24:
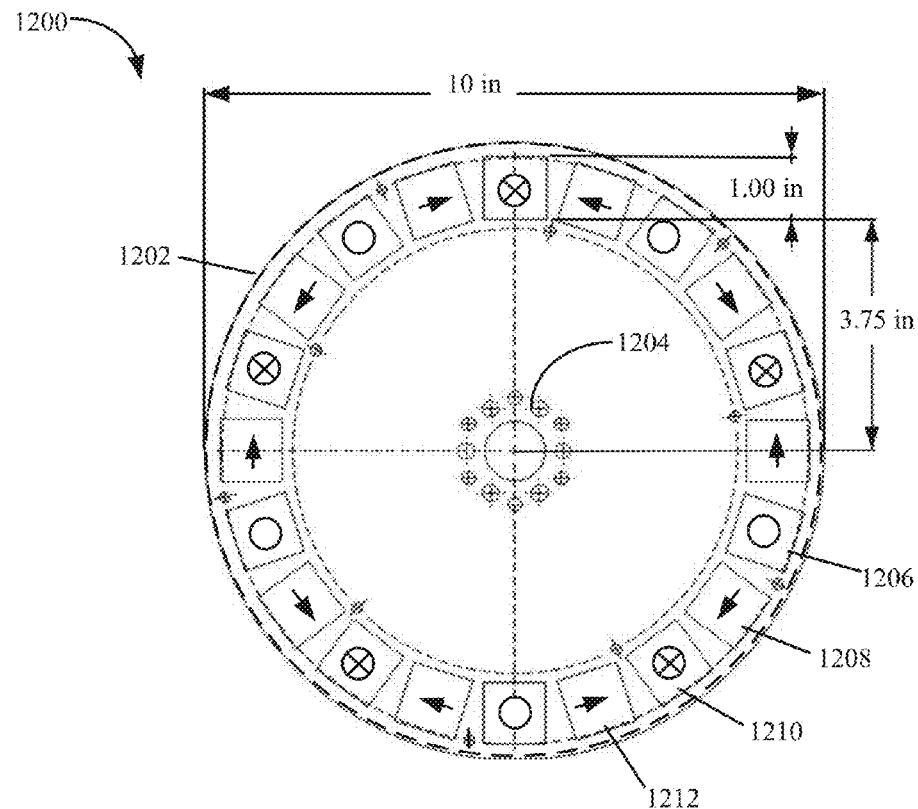
FIGS. 24 and 25 are top and perspective views of a STARM including cubic magnets arranged in a circular pattern in accordance with the described embodiments.

The sixteen magnets on each STARM were arranged in a circular pattern similar to what is shown in FIG. 24. The polarity arrangement pattern is similar to what is shown in FIG. 24 except the pattern including two guide magnets and two pole magnets is repeated one less time. As described below, other polarity arrangement patterns are possible and this example is provided for the purposes of illustration only.

Neodymium N50 strength magnets are used. The magnets each weigh about 3.6 ounces (force). Therefore, the total magnet weight for one hover engine is about 3.6 pounds (force). Other magnet types and strengths can be used and N50 magnets are provided for the purposes of illustration only.

In one embodiment, the motors can be a q150 DC brushless motor from Hacker Motor (Ergolding, Germany). The motor has a nominal voltage of 50 Volts and a no load current of 2 Amps. The weight is about 1995 grams. The speed constant is about 52.7/min. The RPM on eta max is about 2540. The torque on eta max is about 973.3 N-cm. The current on eta max is about 53.76 Amps.

The hover engines each have a shroud, such as 218. The shroud 218 partially encloses the STARM, such that a bottom of the STARM is exposed. In other embodiment, the shroud can enclose a bottom of the STARM. A tilt mechanism 212 is coupled to the shroud 218 of each hover engine. The tilt mechanism 212 is coupled to a pivot arm 210. The hover engines 204a, 204b, 204c and 204d are suspended beneath a support structure 202. The pivot arms, such as 210, extend through an aperture in the support structure.

The motors in each hover engine can be battery powered. In one embodiment, sixteen battery packs are used. The batteries are VENOM 50C 4S 5000 MAH 14.8 Volt lithium polymer battery packs (Atomik RC, Rathdrum, Id.). Each battery weighs about 19.25 ounces. The dimensions of the batteries are 5.71 inches by 1.77 inches by 1.46 inches. The minimum voltage is 12 V and the maximum voltage is 16.8 V.

The sixteen batteries are wired together in four groups of four batteries and each coupled to motor electronic speed controllers, such as 206a and 206b via connectors 216a and 216b to four adjacent battery packs. The four batteries in each group are wired in series in this example to provide up to about 60 V to the electronic speed controllers. Connectors 216c and 216d each connect to four batteries and an electronic speed controller. Two electronic speed controllers are stacked behind 206a and 206b. Thus, four brushless electronic speed controllers, one for each motor, are used. In one embodiment, the electronic speed controllers are Jeti Spin Pro 300 Opto brushless Electronic Speed Controllers (Jeti USA, Palm Bay, Fla.).

Figure 10B:
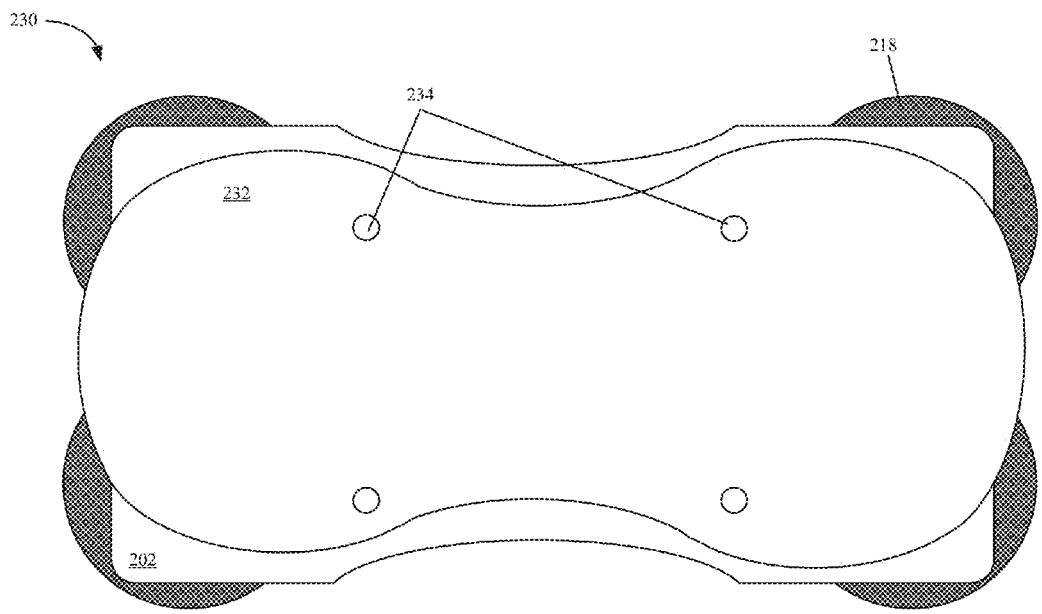

FIG. 10B is a top view 230 of the hoverboard. The hover engines are suspended beneath the central support structure 202 as described above with respect to FIG. 10A. The shrouds, such as 218, of the hover engines extend slightly beyond an edge of the support structure 202. The shrouds can be made strong enough to support a weight of a person without impinging any underlying parts, such as a rotating STARM.

A rider platform 232 is mounted above the support structure. The top of the rider platform 232 may substantially flat, i.e., a minimal amount of protuberances. The protuberances may be minimized to allow a rider to move around the rider platform without tripping. Although, as described below, the rider platform may be configured to bend and flex and hence may be curved. In one embodiment, the rider platform may include foot straps for securing a rider's feet in place.

Some examples of materials which may be used to form support structure 202, shroud 218 and rider platform 232 include but are not limited to wood, plywood, plastic, reinforced plastic, polymers, glass filled nylon, fiber glass, reinforced composites, metals (e.g., aluminum), metal alloys, metal composite materials (e.g., an aluminum composite material), a hemp composite, composites with a honeycomb core or other inner structure, composites with a balsa core, expanded metal, etc.

The pivot arms 210, which are attached to each of the hover engine shrouds, such as 218, are coupled to the rider platform 232 at connection points 234. The rider platform can be formed from a flexible material. When a rider stands on the platform and shifts their weight from quadrant to quadrant, the rider platform can flex. The flex can cause the pivot arm coupled to each of connection points 234 to move downwards which causes the hover engine coupled to each pivot arm to tilt. As described above, when the hover engine is tilted, a force can be generated which is approximately aligned with the tilt axis.

The rider can shift their weight and the amount of weight distributed to each pivot arm by changing their foot position on the rider platform 232 and the amount of weight distributed to each foot. Thus, the amount of force distributed to each pivot arm can be controlled and hence the amount of tilt to each hover engine can be varied. By varying the tilt, an amount of translational force output by each hover engine in a particular direction can be controlled. As described above, these forces can be used to control spin, such as starting or stopping a spin and controlling a rate of spin. The forces can also be used to steer the hoverboard.

Figure 10C:
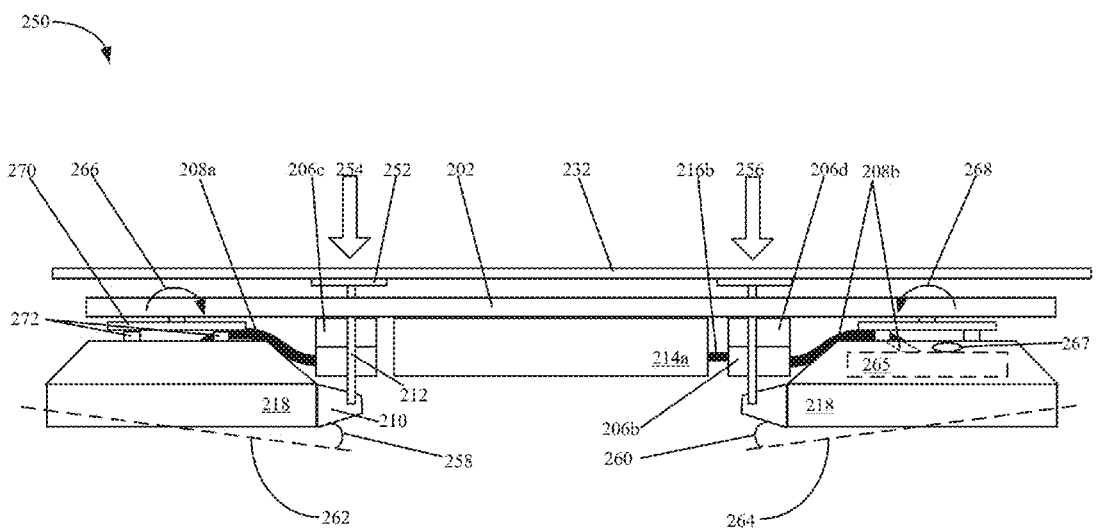

FIG. 10C is a side view 250 of a hoverboard. As can be seen in the FIG. 10C all of the components need to operate the hover engines, such as the batteries and speed controls are suspended from the bottom of support structure 302 and packaged below a height of the bottom of the hover engine. As described above, the height of the hoverboard from the bottom of the hover engine to the top of the rider platform is about 4.5 inches Thinner designs are possible and this example is provided for the purposes of illustration only.

In this embodiment, the rider platform 232 is supported at the ends and coupled to the structure 202 via members 274a and 274b. This configuration allows the rider platform 232 to bend in the middle, such as when weight is applied at location 254 and 256 above the pivot arms, such as 210. In an alternate embodiment, the rider platform may be supported by a member, which bisects it lengthwise. Then, the rider platform 232 may be bent on either side of this central member when weight is applied.

In yet another embodiment, the rider platform 232 may be sectioned to allow portions to move independently of one another. The individual sections can be coupled to the hoverboard such that they may be flexed to actuate one of the tilt mechanisms. In another embodiment, the individual portions may be coupled to the hoverboard via a hinge mechanism. The individual portions can then be rotated about the hinge.

When a hinge mechanism is used, a stiffer material may be utilized for the individual section. However, a repositioning mechanism, such as one or more springs or flexible foam, may be used to return the individual portion to an original position after a force is removed. The repositioning mechanism, such as springs, can also be used to affect the amount of force required to move the individual section.

The hover engine shrouds are coupled to a hinge mechanism 272. The hinge mechanism 272 hangs from the support structure 202. The hinge mechanism provides for rotation about one axis. Some examples of hinge mechanisms which may be utilized include but are not limited to a butt hinge, a barrel hinge, a flush hinge, a continuous hinge, a pivot hinge, a coiled spring pin hinge and self-closing hinges. A gap is provided beneath the hinge mechanism, the gap allows wires 208b from the speed controller 206b to reach the motor 265 encircled by the shroud 218. The electronic speed controllers, such as 206b, are each connected via connectors, such as 216b, to four adjacent battery packs (see FIG. 10A). In alternate embodiments, the shroud 218 can include one or more apertures (e.g., 267) which allow wires to be passed to the motor 265.

In this example, the hinges allow each hover engine to rotate through some angle, such as 266 and 269, about one rotational axis. As described above with respect to FIGS. 9A and 9B, joints which allow for more rotational degrees of freedom are possible and this example is provided for the purposes of illustration only. The bottom of the shrouds, such as 218, when tilted is illustrated by the dashed line 262 and 264. The tilt angles 258 and 260 are defined as the angle between the shrouds are horizontal and the bottom of the shrouds when tilted as indicated by lines 262 and 264.

In one embodiment, the hover engines can be configured to tilt up to ten degrees in one direction. In operation, when the weight is removed from locations 254 and 256, the rider platform 232 may unbend and the shrouds may return to a first position. When weight is added, the rider platform may flex by some amount at each location and the shrouds may each tilt by some amount.

As described above, the amount of tilt associated with each hover engine may be constrained. Further, the amount of tilt doesn't have to be same for each hover engine. For example, one hover engine can be allowed to rotate up to ten degrees while a second hover engine can be allowed to rotate up to only five degrees. In particular embodiments, a hover engine can be configured to rotate through up to 10 degrees, up to 20 degrees or up to 30 degrees of total rotation. The rotation directions 266 and 268 are shown for each hover engine. In one embodiment, each hover engine is allowed to rotate in only one direction. In another embodiment, a hover engine may be allowed to rotate in two directions, such as angles of plus or minus ten degrees past the horizontal.

Next, some flight data is described for two vehicles. The first vehicle is similar in design to the vehicle described with respect to FIGS. 10A, 10B and 10C. During the test, a data logger was connected to one of the motors, such as 265. The data logger was used to record amps, voltage and RPM of the motor. The data logger is an elogger v4 (Eagle Tree Systems, LLC, Bellevue, Wash.). The data recorded during the test is presented below in Table 1.

For the test, the unloaded weight of vehicle #1 at the time of zero seconds is 96.2 pounds. As described above, the vehicle includes four hover engines and is similar in configuration to vehicle 200. The voltage, amps and RPM are measurements from one of the hover engines. The height is measured from the bottom of the magnets on a STARM in one of the hover engines to the surface of the copper test track. The copper test track is formed from three, ⅛ inch thick, sheets of copper.

TABLE 1

Flight test data for vehicle #1
Test Vehicle #1

| Time (sec) | Total weight (lbs) | Power (Watts) | Voltage (Volts) | Current (Amps) | RPM | Hover Height (mm) |
|---|---|---|---|---|---|---|
| 0 | 96.2 | 855 | 64.64 | 13.22 | 3195 | 24.4 |
| 19.6 | 184 | 1479 | 62.93 | 23.50 | 3020 | 19.9 |
| 33.8 | 273.2 | 2141 | 61.22 | 34.97 | 2848 | 15.5 |
| 46.9 | 362.4 | 2836 | 59.62 | 47.58 | 2689 | 14.2 |
| 57.7 | 450.4 | 3381 | 58.22 | 58.07 | 2549 | 11.9 |
| 69.2 | 499.6 | 3665 | 57.42 | 63.82 | 2486 | 10.7 |
| 83.3 | 550 | 4092 | 56.46 | 72.48 | 2394 | 11 |
| 95.5 | 579.6 | 4316 | 55.92 | 77.18 | 2361 | 8.2 |
| 103.3 | 609.2 | 4418 | 55.60 | 79.47 | 2329 | 7.5 |
| 110.7 | 629.4 | 4250 | 55.71 | 76.30 | 2355 | 7.9 |
| 118.7 | 649.7 | 4363 | 55.27 | 78.95 | 2314 | 7.3 |

In a second vehicle (not shown), a chassis was formed from plywood. The vehicle dimensions were 46 inches by 15.5 inches by 5 inches. The vehicle weighed seventy seven pounds unloaded. Two hover engines with STARMs of fourteen inches in diameter were used. The hover engines were secured in place and a mechanism, which allowed the hover engines to be tilted, was not provided.

Each STARM included thirty two cubic inch magnets arranged in a circular pattern similar to what is shown in FIG. 24. The polarity arrangement pattern is similar to FIG. 24 as well. However, the polarity arrangement pattern including the two guide magnets and two pole magnets is repeated more times as compared to FIG. 24.

Two Hacker motors are used (one for each STARM). Hacker motor model no. QST-150-45-6-48 with a $K_v$ of 48 is used to power each STARM. The motor dimensions are 150 mm by 45 mm and the number of windings in the motor is 6. Each hacker motor is coupled to one of the STARMs and an electronic speed controller.

For this vehicle, Jeti Spin Pro 200 Opto brushless Electronic Speed Controllers (Jeti USA, Palm Bay, Fla.) are used. The same battery type as described above for the first test vehicle was used. However, only eight batteries were used for the second vehicle as compared to the first test vehicle. The batteries are two divided into two groups of four and wired in series to provide a nominal voltage of about sixty Volts to each motor.

A test was conducted where the second vehicle was allowed to hover in free flight unloaded and then plate weights were added to the vehicle. The plates were weighed before the test began. The vehicle was operated over three –⅛ inch thick pieces of copper.

The current, voltage and RPM, for one of the motors, were measured in flight using the Eagle system data logger. The distance of the bottom of the magnets to the copper, referred to as the hover height, was measured by hand. Test results for the flight are shown in Table 2 as follows.

TABLE 2

Flight test data for vehicle #2
Test Vehicle #2

| Time (sec) | Total weight (lbs) | Power (Watts) | Voltage (Volts) | Current (Amps) | RPM | Hover Height (mm) |
|---|---|---|---|---|---|---|
| 0 | 77 | 1853 | 61.3 | 30.2 | 2942 | 26.9 |
| 10 | 165 | 3333 | 58.8 | 56.7 | 2820 | 22.3 |
| 17.1 | 254 | 4700 | 56 | 84 | 2686 | 18.3 |
| 23.1 | 343 | 5944 | 52.6 | 113 | 2525 | 14.6 |

A Second Hover Vehicle Example

Figure 11A:
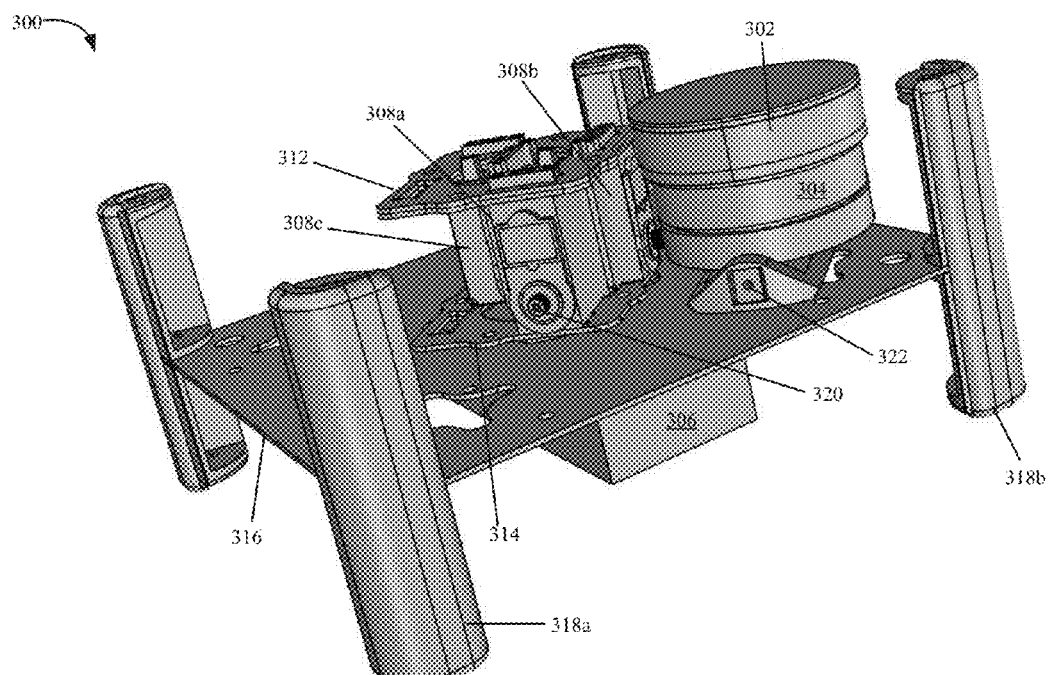
FIGS. 11A-11C are perspective, top and bottom views of a magnetically lifted device in accordance with the described embodiments.
Figures 11B, 11C:
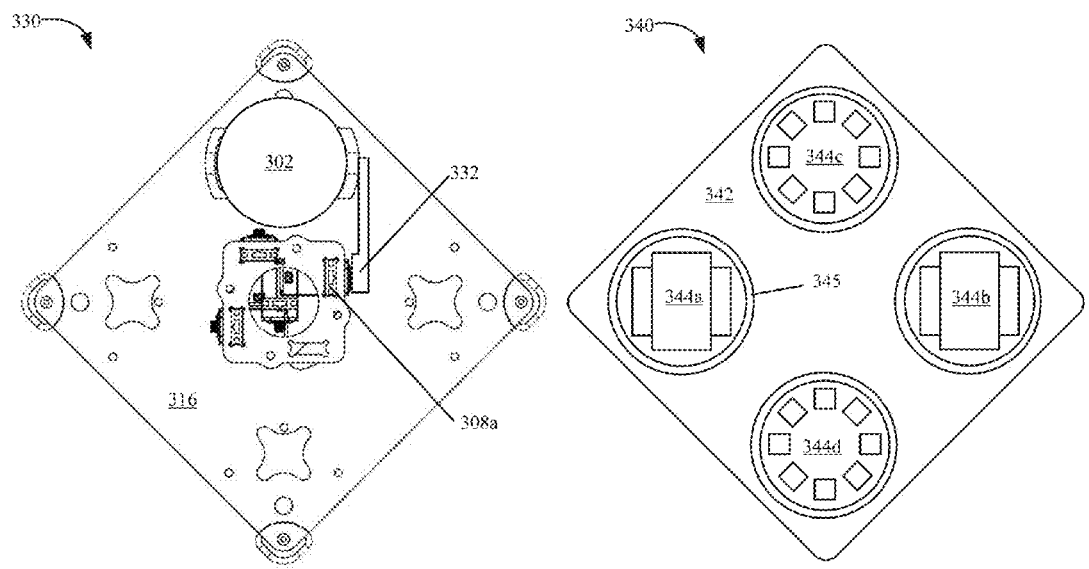

A second hover vehicle is described with respect to FIGS. 11A to 11C. The second hover vehicle includes four actuatable STARMs. The STARMs can be actuated to move the hover vehicle from position to position. Details of a Navigation, Guidance and Control (NGC) system, which can be utilized with the vehicle, are described below with respect to FIGS. 18 to 23.

FIGS. 11A-11C are perspective, top and bottom views of the second hover vehicle 300, which is a magnetically lifted device. In FIG. 11A, the perspective view is provided with the outer housing of the device 300 removed. In addition, the perspective view shows a bottom of the vehicle 300. In operation, the vehicle 300 would be flipped over such that the STARM 302 faces a conductive substrate.

With the outer housing removed, a frame including 1) four posts, such as 318a and 318b, and an interior plate 316, is exposed. The four posts, such as 318a and 318b are each attached to the interior plate 316. For example the four posts can be secured to the interior plate 316 using a bonding agent or a fastener, such as screw. The outer housing may be formed from six rectangular panels which are each attached to the four posts, such as 318a and 318b. In one embodiment, the device 300 can be about 25 cm by 25 cm by 12 cm and weight about 4.5 to 5.5 kg unloaded. In another embodiment, the device 300 can be about 21 cm by 21 cm by 10.16 cm and weigh about 2.2 to 3.5 kg unloaded. Each device can be configured to carry a payload of about 2.27 kg. Depending on the power storage capacity of the vehicle, the vehicle weight and the payload weight, the flight time can be between about four to fifteen minutes on a single battery charge.

In FIG. 11A, a single motor 304, a single STARM 302 and three actuators 308a, 308b and 308c are shown. A fully assembled vehicle can include i) four motors, such as 304, which each rotate a STARM, such as 302, ii) four STARMs, such as 302, which are configured to generate magnetic lift and propulsion, when spun over a conductive substrate, such as but not limited to a metal plate, iii) four servo-motors, such as 308a, 308b and 308c, iv) control circuitry, which controls a rotation rate of the motors, moves the servos from position to position and communicates wirelessly with a remote device, such as a smart phone or a wireless controller and a v) battery 306, which provides power to the motors, the servo-motors and the control circuitry. In this example, the battery 306 is secured to the interior plate 316. In one embodiment, the device 300 can communicate wirelessly using Bluetooth.

In one embodiment, the control circuitry can include a single Q Brain 4× 20 Amp Brushless electronic speed controller (Hobbyking.com). The device is configured to receive power from a battery, such as a lithium polymer (LiPo) battery, with a voltage of approximately 7.4 volts or 14.8 V. For example, a 2S LiPo battery includes two cells connected in series and outputs about 7.4 Volts. Whereas, a 4S LiPo battery includes four cells connected in series and outputs about 14.8 Volts. In particular embodiment, the battery 306 can be a Venom 25c 2s 5000 mAh 7.4 Volt LIPO battery or a Venom 35C 4s 5000 mAh 14.8 LIPO battery (Atomik RC, Rathdrum, Id.). These batteries weigh about 320 g and 527 g, respectively.

The single unit (not shown), which provides speed controller functions, can output power to each of the four motors, such as 302, where the amount of power to each motor can be controlled to control a rotation rate of each motor. Thus, the single unit can split power from the battery 306 to each of the four motors. In one embodiment, the amount of power output to each motor can be controlled to allow each motor to have a different rotation rate. The different rotation rates can be used to provide some control functionality, such as yaw control. In this example, the weight of the speed controller is about 112 grams. In alternate embodiments, the speed control functions can be provided a single unit or via multiple units, such as a separate speed controller for each motor.

In one embodiment, the control circuitry can include a flight control board (not shown), such as a HobbyKing KK2.1.5 Multi-Rotor control (HobbyKing.com). The flight control board can receive sensor information from an accelerometers, gyros and compasses on board the device. For example, sensors can include a 3-axis accelerometer, a 3-axis gyroscope, a 3-axis compass and combinations thereof.

A processor on the flight control board can receive sensor data from the sensors and then generate control signals which are sent to electronic speed controller (or controllers) and servo-motors, such as 308a, 308b and 308c. The flight control board can also be configured to receive control signals from a remote device, such as a smart phone or other type of radio controller and in response generate control signals to control the motors, such as 302, the servo-motors or combinations thereof. In one embodiment, the device 300 can include a Bluetooth receiver configured to communicate with the flight control board. In various embodiments, controlled flight generated using the flight control board and/or control signals from a remote device can include one or more of up, down, backwards, forwards, left, right, yaw and pitch movements. These movements can be instantiated via independent control of each of 1) a tilt angle of a STARM, which is coupled to the motor, a 2) rotation rate of the STARM and combinations thereof.

In device 300, four servo-motors can be clustered together in a center of the device between the four motors. The four servo-motors can be held together using frame components 312 and 314. The cluster of four servo-motors can be coupled to the interior plate 316. In one embodiment, the servo-motors can each be Hitec HS-5485HB servos (Hitec RCD USA, Inc., Poway, Calif.). The servos can be configured to receive 4.8 V or 6.0V. The weight of each servo is about 45 grams. The torque output, depending on the voltage input, for each servo is about 5.2 or 6.4 kg/cm. For vehicles using larger STARMs and/or larger motors, servos with a greater torque output can be used.

Each motor 304 and 302 STARM can be configured to rotate about an axis 322 through some angle range. A mechanical linkage (see FIG. 11B) can be provided from the servo output 320, which causes the motor about the axis 322. The tilt axis 322 is located near a top of the motor 304 (As described above, the vehicle is shown in an upside down orientation in FIG. 11A). In other embodiments, the tilt axis 322 can be located closer to the bottom of the motor 304 and the rotatable STARM 302.

In various embodiments, the mechanical linkage can be configured to convert an output angle of rotation from the servomotors to an input angle of rotation about axis 322 according to some ratio. For example, when the ratio is one to one, an output angle of rotation from the servo of one degree in a particular direction can cause an input angle of rotation of the motor 304 and STARM 302 of one degree in the particular direction. In another example, when the ratio is five to one, an output angle of rotation from the servo of five degrees in a particular direction can cause an input angle rotation of the motor 304 and STARM 302 of one degree in the particular direction. The ratio can be selected based upon a needed accuracy of the tilt control of the STARM and a needed transit speed to move the STARM from a first position to a second position in a control scheme. Thus, ratios between one to one and five to one or greater than five to one can be utilized and the example above is provided for the purposes of illustration only.

In FIG. 11B, a top view 330 of the device 300 shown in FIG. 11A is illustrated. In FIG. 11B, the axis of rotation of servo 308a and the tilt axis of rotation for STARM 302 are aligned approximately parallel to another. This configuration allows for a relatively straight mechanical linkage 332 between the servo 308a and STARM/motor combination. In other embodiments, the axis of rotation of servo 308a and the tilt axis of rotation for STARM 302 may be angled relative to one another. In this instance, a more complex, multi-part mechanical linkage can be provided, such as a two part mechanical linkage hinged together in some manner. For example, a two part mechanical linkage can be coupled to one another using a flexible material.

In FIG. 11B, when fully assembled, four servos can be coupled to four motors. As shown for servo 308a and STARM 302, the rotation axis through which the torque is output from the servo 308a, is approximate parallel to the tilt axis of the STARM 302 and motor. In various embodiments, the rotation axis through which the torque is output from a servo and the tilt axis of a STARM and motor to which it is coupled don't have to parallel to one another.

When assembled, the rotation axis through which the torque is output from each of the servos, 308b and 308c, which are adjacent to servo 308a, are rotated approximately ninety degrees relative to the rotation axis through which torque is output from servo 308a. In further embodiments, less than four or more than four motor, STARM and servo combinations can be used. Thus, the angle between the axis through which torque is output from a servo and the axes from which torque is output from the adjacent servos can be greater than ninety degrees or less than ninety degrees. For example, a vehicle can include three STARM, servo and motor combinations and can have servos with axes through which the torque is output that are approximately one hundred twenty degrees orientated relative to one another. In yet other embodiments, a first portion of the STARM and motor combinations can be provided without a servo while a second portion of the STARM and motor combinations can be provided with a servo. When the STARM and motor is non-tiltable, the orientation of the STARM and motor can be fixed at an angle of zero or greater relative to the interior plate 316.

FIG. 11C shows a bottom view 340 of the device 300 of FIG. 11 C. In one embodiment, a bottom portion 342 of the housing can include four apertures, where a bottom of the each STARM, such as 344a, 344b, 344c and 344d is approximately parallel to an outer surface of bottom portion 342 or extends beyond the outer surface of bottom portion 342. The apertures are sized to provide some gap, such as 345, between a side of the STARM 344a and an inner surface of the aperture. In another embodiment, the 342 bottom of surface can be formed without apertures and the STARMs can be enclosed within an interior of the vehicle 300. In this embodiment, a non-conductive material and non-ferromagnetic material may be used beneath the STARMs.

In FIG. 11C, two magnet configurations are shown. STARMs 344a and 344b use a first magnet configuration and STARMs 344c and 344d include a second magnet configuration. The magnet polarity arrangement for STARMs 344a and 344b can be similar to pattern 1292 in FIG. 28. The magnet polarity arrangement for STARMs 344c and 344d can be similar to the pattern shown in FIG. 2. In various embodiments, all the STARMs may use the same magnet polarity pattern and magnet configuration (geometric arrangement of each magnet relative to one another) and may use the same volume of magnets. In other embodiments, the magnet polarity arrangement, the magnet configuration and the volume of magnets can vary from STARM to STARM on a vehicle.

In one embodiment, four STARMs, such as 344c, can be used. The STARMs can be approximately three inches in diameter. In one embodiment, the portion of the STARM, which holds the magnets, can be formed from an injection molded plastic. The eight magnets on each STARM can be N52 strength, 12 mm cubes. The motors can be Himax (Max Products, LLC, Lake Zuric, Ill.) brushless out runner motors (HC6320-250). The motor weighs 450 g. The max power and max RPM are 1700 Watts and 10,000 RPM, respectively. The diameter of the motor is 63 mm, the Length of the motor 51 mm and the shaft diameter is 8 mm. The $K_v$ for the motor is 250 RPM/Volt. Other motors with varying power outputs and dimensions and other STARMs with different diameters, magnet volumes, magnet configurations and magnet strengths can be used and these examples are provided for illustrative purposes only.

A Third Hover Vehicle Example

Figure 12A:
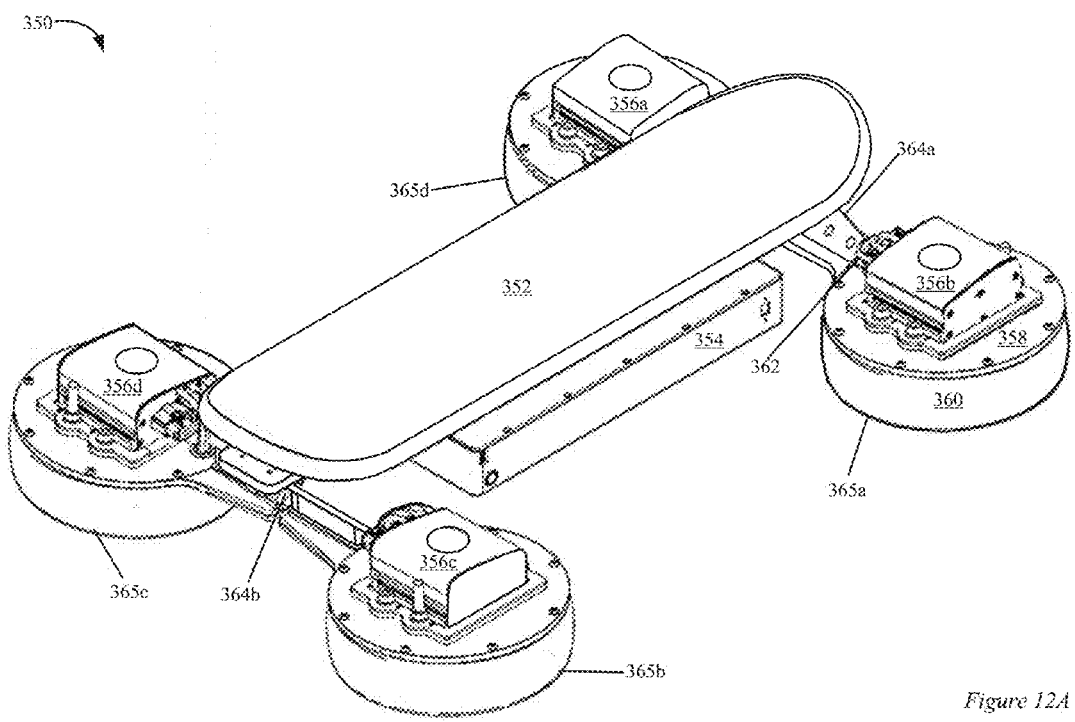
FIGS. 12A-13 are perspective, front and top views of a magnetically lifted vehicle and perspective views of an attachment components associated with the vehicle in accordance with the described embodiments.
Figure 12B:
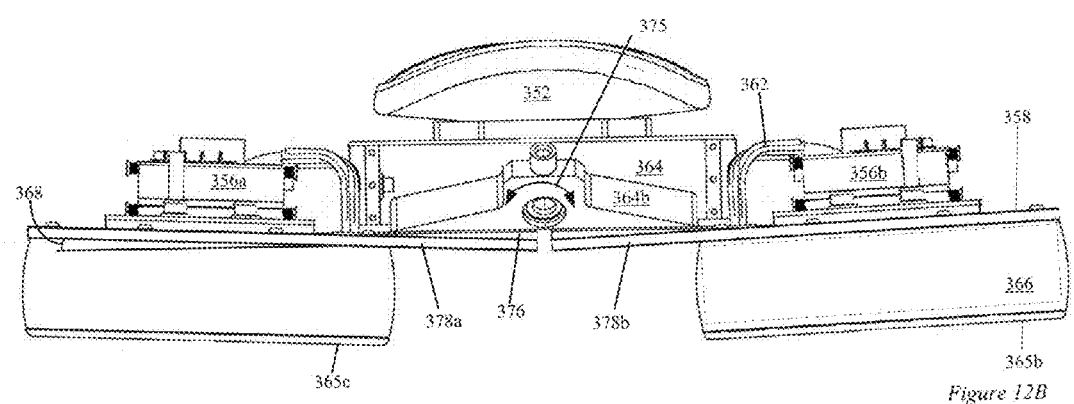
Figure 12C:
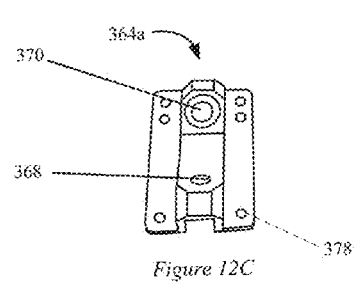
Figure 12D:
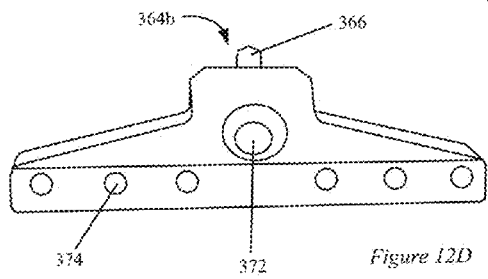
Figure 13:
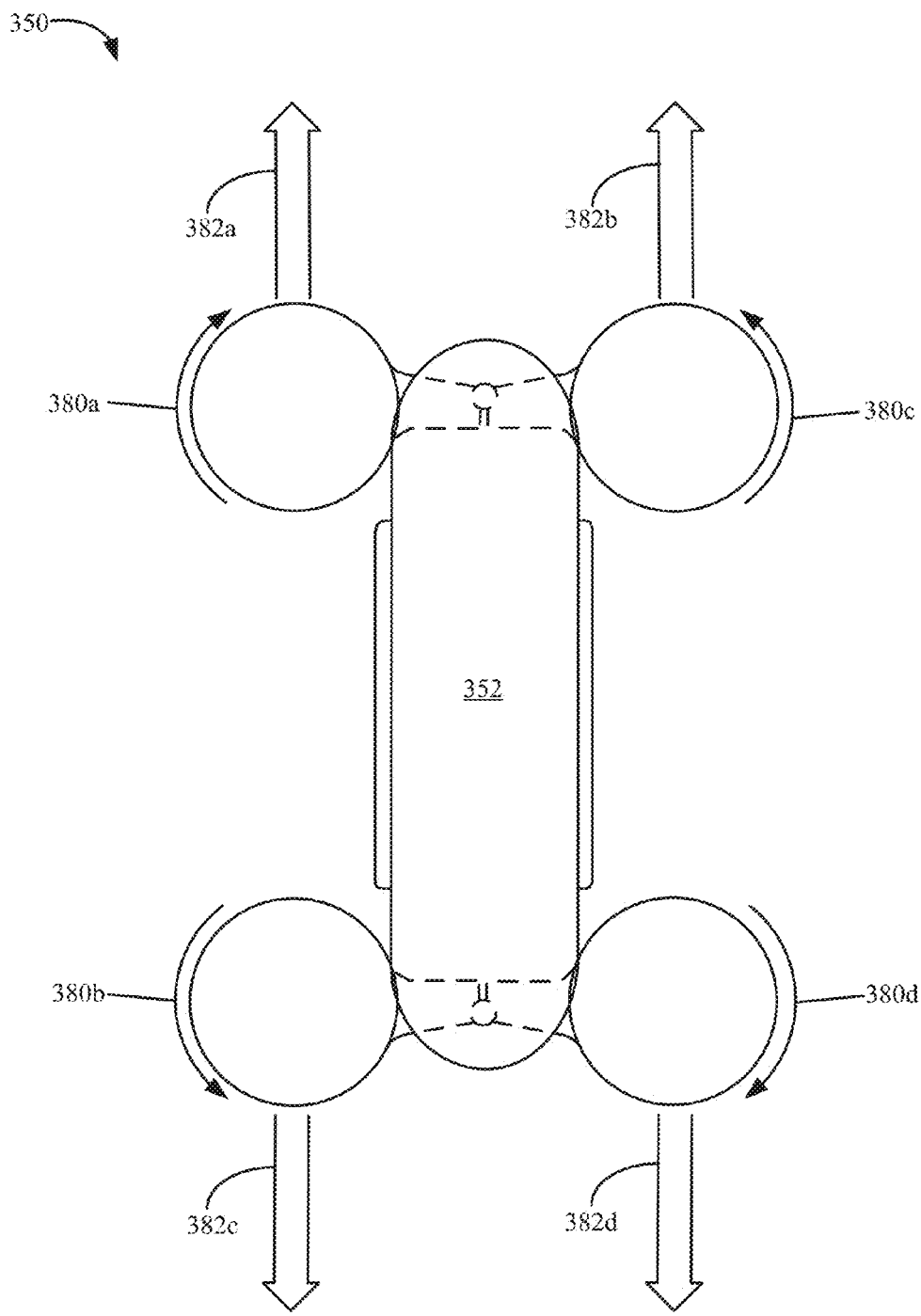
Figure 14:
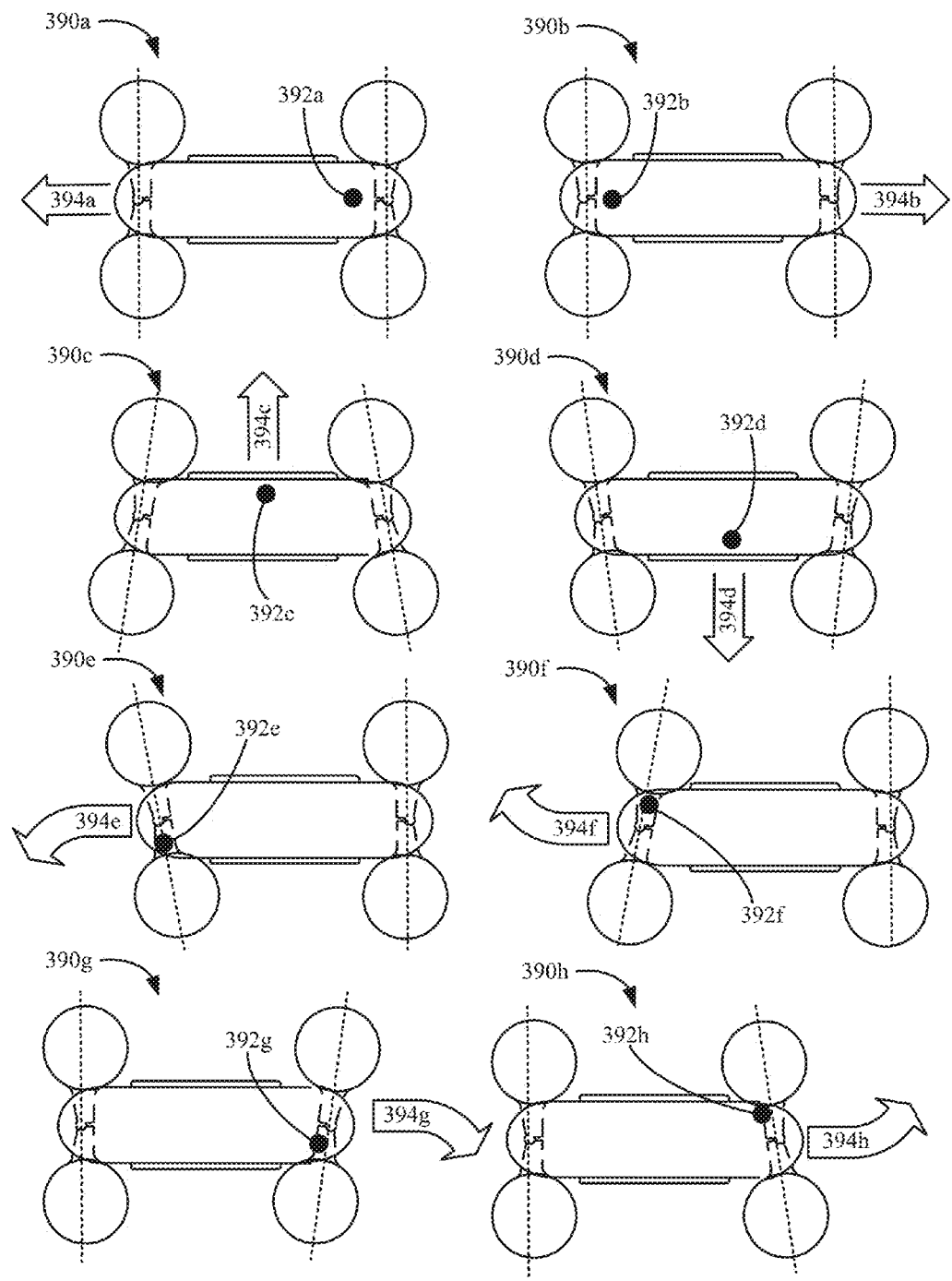
FIG. 14 illustrates a directional control scheme for the vehicle shown in FIGS. 12A to 13 in accordance with the described embodiments.

Next, an alternate design of a vehicle capable of carrying a person is described with respect to FIGS. 12A-14. FIGS. 12A, 12B and 13 are perspective, front and top views of the vehicle. FIGS. 12C and 12D illustrate a hinge mechanism which couples the hover engines to a rider platform. FIG. 14 illustrates the relationship between applying a force on a particular location on the rider platform during vehicle flight and a direction of movement of the vehicle in response.

FIG. 12A is a perspective view of vehicle 350. The vehicle 350 includes four hover engines, such as 365a, 365b, 365c and 365d, four electronic speed controllers, each coupled to a motor and STARM (not shown), such as 356a, 356c, 356d and 356d, a rider platform 352 and a battery compartment 354 mounted beneath the rider platform. Hover engines pairs, (365a and 365d) and (365b and 365c), are each coupled to rider platform 352 via a hinge mechanism, such as 364a and 364b, respectively.

The hinge mechanisms, 364a and 364b, are configured to rotate relative to rider platform 352. The rotation of a hinge mechanism causes the pair of hover engines coupled to the hinge mechanism to rotate relative to the rider platform in various directions. In one embodiment, a rotation through the hinge mechanism cause one of the hover engines in a hover engine pair to move closer to the rider platform and a second hover engine in the pair to move away from the rider platform.

Hinge mechanisms 364a and 364b can be rotated individually or in combination with one another, which, during flight, can alter a direction of travel of the vehicle 350. The rotation of each hinge mechanism, 364a and 364b, including a direction of rotation, can be initiated, in response to a rider applying forces at different locations on the rider platform 352, which are transferred through the hinge mechanism or hinge mechanisms to induce a rotations. A directional control scheme using these rotations is described in more detail with respect to FIG. 14.

In one embodiment, the rider platform can be a skateboard deck or can have the form factor of a skateboard deck. For example, a rider may be able to remove the deck from an actual skateboard and couple it to vehicle 350 as a rider platform. Vehicle 350 can include a mounting plate, such as a metal plate, which allows a skateboard deck to be attached to the vehicle.

Skateboard decks are typically curved on each end. The curvature provides leverage, when a force is applied, for a rider to raise one end of the deck relative to the other end, if desired. Skateboard decks are typically seven to ten and one half inches wide and twenty eight to thirty three inches long. The weight of a skateboard deck formed from wood is about 1.8 to 2.3 Kg. However, rider platforms can be formed from other materials to decrease or increase this weight if necessary.

A battery box 354 is suspended beneath the rider platform 352. In one embodiment, the battery box is about twelve inches wide by seventeen inches long. The battery box can include two stacks of relatively flat battery packs where each stack includes some number of the flat battery packs. In one embodiment, nine flat battery packs are included in each stack where eight of the batteries are connected in series and one pack is connected in parallel. The number of battery packs connected in series can be selected to meet a certain desired output voltage range, such as a voltage range compatible with an electronic speed controller which is couple to a motor. In alternate embodiments, more or less battery packs can be used in each stack.

In a particular embodiment, each flat battery pack is a lithium ion rechargeable pouch cell, IMP06160230P25A, from Farisis Energy, Inc. (Hayward, Calif.) where the pouch cell includes a nickel-manganese-cobalt cathode. Each pouch cell can have nominal capacity of 25 Ah, a nominal voltage of 3.65 V and a cycle life of at least 1000 cycles. Each battery pouch is approximately 161 mm wide by 6 mm thick. The height of each pouch can be about 230-240 mm. The weight of each cell is approximately 485 g.

The motor and STARMs of a hover engine, such as 365a, can be enclosed within a housing. In this embodiment, the housing includes a top portion 358 which is secured to a lower portion 360. In one embodiment, the diameter of the top portion is about 8 inches and the height can be about 2.5 to 3 inches.

One example of a motor which can be used within the housing is a hacker 150-25-12-43 (Hacker Motor, GmbH, Ergolding, Germany). The motor dimensions are 150 mm by 25 mm and includes 12 windings. The motor speed constant is 43 $K_v$ per min.$^{-1}$ The nominal voltage is 50 V. The weight of the motor is approximately 2 kg. An example location 366 of a motor and STARM within the hover engines is shown in FIG. 12B.

Some example magnet configurations and polarity alignment patterns, which can be used with a STARM coupled to the motor, are described with respect to FIGS. 17A, 17B and 24-31. As shown in the Figures, the magnets can be arranged in various configurations with various polarity alignments. For N50 strength neodymium magnets, the magnet volume on each STARM can be between 10 to 30 cubic inches. For example, the STARM design in FIG. 17A can include about 17 cubic inches of N50 magnets. As another example, the STARM design n FIG. 17B can include about 18 cubic inches of N50 magnets. In yet other example, the design in FIG. 24 can utilize about twenty cubic inches of N50 magnets.

An electronic speed controller, such as 356a, 356b, 356c and 356d, is mounted above each motor. Wire bundles, such as 362, couple the speed controllers to the batteries within battery box 354. Thus, power can flow from the batteries to electronic speed controllers and into the motor. In one embodiment, the electronic speed controllers (ESC) can be BAC 2000-48-70 by Accelerated Systems, Inc. (Waterloo Ontario, Canada). The ESC can be configured to receive a nominal input voltage between 24 and 48 Volts. The input power is software configurable. The peak motor current can be up to one hundred amps with a continuous rating of twenty five amps.

In one embodiment, the vehicle can include a wireless receiver which allows the vehicle to communicate with a remote device. For example, via the receiver, a command can be sent to the vehicle to shut down the engines, i.e., to provide a remote kill switch for the vehicle. The shutdown command can be implemented via the electronic speed controllers coupled to each engine. In another embodiment, a user may be able to hold a kill switch in their hand while riding the device, which communicates wirelessly, with the vehicle. The kill switch when activated by the user causes the engines to shutdown. For example, a user may wish to shutdown the vehicle if they fall off the vehicle. As described above, an individual not riding the vehicle could also initiate this shutdown.

FIG. 12B shows a front view of vehicle 350. The hinge mechanism 364 is mechanically coupled to the rider platform 352 and structures 378a and 378b, which support hover engines, 365c and 365b. The hinge mechanism 364 is attached to the hover engines such that the hover engines 365b and 365c rotate as a unit. A similar configuration can be used on the other end of the vehicle 350.

In one embodiment, the structures 378a and 378b are integrally formed with the top cover of the hover engine. For example, components 358 and 378b are integrally formed. The integral structure provides an attachment point to the hinge mechanism 364, an attachment point for hover engine 365b, an attachment point for the electronic speed controller, i.e., 356b, and also forms a portion of the housing of the hover engines.

The hover engines, 365b and 365c, are each tilted outward through a tilt angle 368. The outward tilt can help the vehicle operate better on a curved surface, such as within a half-pipe. However, in an alternate embodiment, the hover engines can be tilted inwards.

In one embodiment, the tilt angle 368 can be up to 15 degrees. In the example, in FIG. 12B, the tilt angle is about 5 degrees. In a particular embodiment, a mechanism can be provided which allows the tilt angle to be manually adjusted prior to operation. For example, inserts, such as 376, which are wedge-shaped, can be formed with different angles. The inserts can be installed to set each hover engine at a particular tilt angle. As an example, a first set of wedges with an angle of five degrees can be replaced with a second set of wedges with an angle of seven degrees to adjust the tilt angle from five degrees to seven degrees for hover engines 365b and 365c. The tilt angles of the front and back pair of hover engines can be the same. However, in some embodiments, the tilt angles of the pairs can be different.

When the bottom of surface of the rider platform 352 is approximate parallel to a conductive substrate, the outward tilt can cause the hover engine to generate both lifting forces and translational forces. As will be described in more detail below, the translational forces can be used to translate the vehicle from a first location above the conductive substrate to a second location above the substrate. Further, the translational forces can be used to turn the vehicle.

Figure 39:
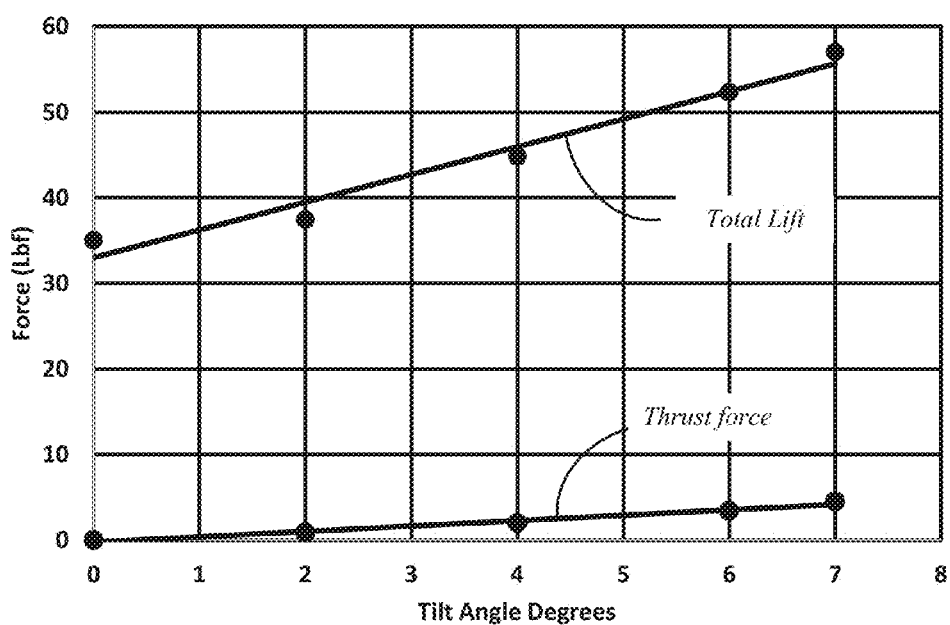
FIG. 39 is a plot of numerical predictions of lift and thrust versus height as a function of tilt angle for a circularly arranged magnet configuration.
Figure 40:
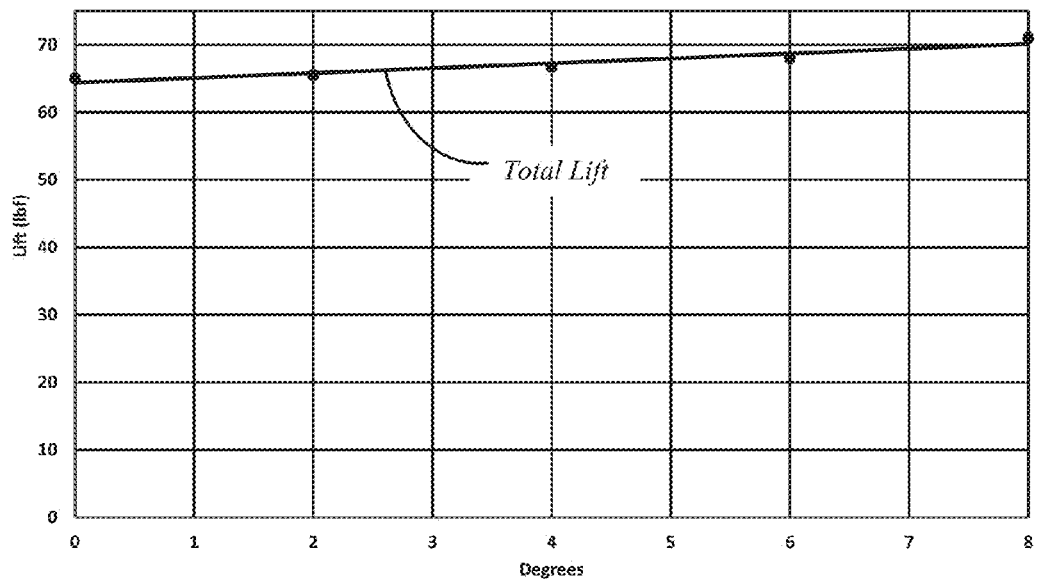
FIGS. 40 and 41 are plots of numerical predictions of lift and thrust force as a function of tilt angle for the magnet configuration 1290 in FIG. 28.
Figure 41:
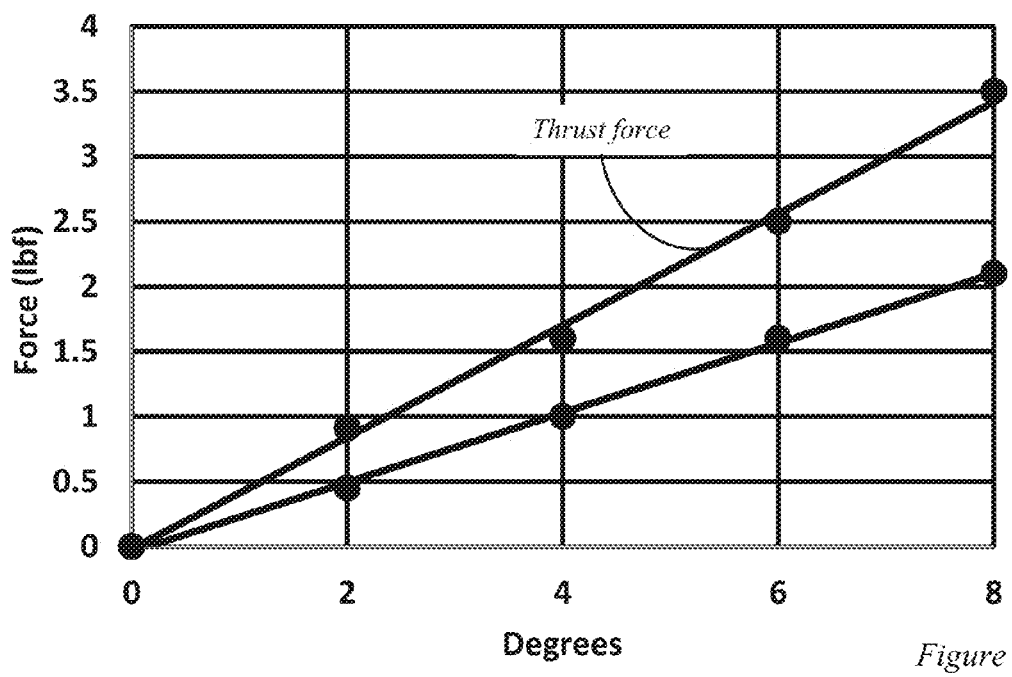

The tilt angle can affect a magnitude of the translational forces which are generated from the hover engines (e.g., see FIGS. 39, 40 and 41). Typically, the translational forces, which are output from the hover engines, increase with the tilt angle. Thus, the tilt angle can affect the magnitude of the translational forces and hence, how fast a vehicle accelerates and turns.

Different riders may prefer different handling characteristics. For example, a beginner may prefer a hover board which accelerates more slowly. Thus, a lower tilt angle can be employed. Whereas, an advanced rider may prefer a hover board, which accelerates faster and hence a higher tilt angle can be used.

Returning to FIG. 12B, the hinge mechanism 364 between the rider platform 352 and the hover engine platform 376 can operate in a manner similar to a skateboard truck. In a skateboard truck, a force applied on one side of the rider platform, when the wheels are touching the ground, causes a rotation in a first direction and a force applied in a second direction causes a rotation in a second direction opposite the first direction. Unlike a skateboard, the hinge mechanism 364 operates while the hover engines are in flight and not touching the ground. For the hinge mechanism 364, the directions of rotations are indicated by the arrows 375.

The hinge mechanism 364 can be configured such that when a force that caused the rotation is reduced or removed, the hinge mechanism rotates in the opposite direction. The rider may be able to adjust to the applied force and/or the location where the force is applied to control an amount of rotation in a particular direction. When the force applied is below a threshold value, the hinge mechanism can be configured to return to a neutral position, i.e., no rotation.

The hinge mechanism 364 can be adjustable to change amount of force needed to cause a certain amount of rotation. For example, the hinge mechanism can be adjusted so that a greater force is needed to cause a rotation. Different riders with different weights may prefer a different stiffness levels. Light the tilt angle, the stiffness level can affect a controllability of a vehicle making it easier or harder to turn.

FIGS. 12C and 12D provide additional details of two components, 364a and 364b, associated with the hinge mechanism 364. The bottom of part 364b includes apertures, such as 374, which allow the part to be secured to support structures, such as 378a and 378b. As an example, fasteners, such as bolts, can be threaded through the apertures and secured with a nut.

The component 364a can be rotated 180 degrees and fit over the top of component 364b. The post 366 can go through aperture 370 in component 364a. Then, a pin can be inserted through aperture 368 and 372. In a skateboard truck, this pin is referred to as a king pin. Via apertures, such as 378, component 364a can be mounted directly to the rider platform 352 or can be secured to a receiving plate. The receiving plate can be configured to receive a rider platform 352, such as but not limited to a skateboard truck. In one embodiment, the receiving plate can allow different skateboard decks to be easily removed and secured to the vehicle.

FIG. 13 shows a top view of vehicle 350. A rotational direction, such as 380a, 380b, 380c and 380d, of each hover engine is shown. As described with respect to FIG. 12B, the hover engines are canted to generate a tilt angle. The canted hover engines can generate a translation forces when the vehicle is operated over horizontal substrate. The direction of the translational force output from each hover engine is shown via arrows, 382a, 382b, 382c and 382d. In one embodiment, the engines can be operated (e.g., an RPM rate of the motors can be selected), such that the translational forces output from each hover engine cancel one another. When the forces balance, a non-translating hover board can remain stationary over a conductive substrate. As will be described in more detail below, with respect to FIG. 14, force imbalances can be intentionally created which cause the vehicle to move in various directions.

In FIG. 13, forces 382a and 382c are parallel to one another and forces 382b and 382d are parallel to one another. In alternate embodiments, the forces 382a and 382b and the forces 382b and 382d can be angled relative to one another and still output forces which cancel one another. An example of a vehicle where translational forces output from a hover engines are angled relative to another is described with respect to FIG. 18.

FIG. 14 illustrates one example of a directional control scheme for the vehicle shown in FIGS. 12A to 13. In 390a, a force can be applied at 392a. For example, a rider can shift their weight over this stop such that it causes the opposite end of the rider platform to rise relative to the end where the force is being applied. In this position, the forces from the opposite sides of the rider platform are no longer balanced and the board can move in direction 394. The force is applied near the pivot point of the hinge mechanism. Hence, the vehicle hinge mechanism doesn't rotate. In 390b, a force can be applied at location 392b on the opposite side of the rider platform and the vehicle can move in direction 394b.

In 390c, a force can be near the center on one side of the rider platform at location 392c. At this location, the force applied through the hinge mechanism can cause two pairs of hover engines to each rotate inwards an equal amount. When the forces output from each pair of hover engines connected via a hinge mechanism are equal, the vehicle translates in direction 394c. In 390d, a force is applied on the rider platform at location 392d. A force applied at this location causes the two pair of hover engines to rotate inwards in the opposite direction to cause movement in direction 394d. On a skateboard touching the ground, these types of movements are not possible, i.e., a direct sideways motion, because the friction of the wheels with the ground prevent a skateboard from moving in this manner.

In 390c and 390d, when a force is positioned such that each pair of hover engines are not rotated inwardly by an equal amount, such as via moving position 392c or 392d to the left or right, then the vehicle may move and rotate in directions 394c or 394d. The direction of rotation depends on the whether the force is applied to the left or right of position 392c or 392d.

In 390e, a force is applied on one side of the vehicle, near the front end. In this position, only one of the hinge mechanisms is rotated. In response to the rotation the vehicle moves in direction 394e, i.e., a turn is executed. In 390f, a force is placed on the opposite side of the board from location 392e, at location 392f. In response, the pair of hover engines rotates in the other direction and the vehicle turns in direction 394f. In 390g and 390h, a force is applied at similar locations to 390e and 390f but on the opposite end of the vehicle at locations 392g and 392h. This placement causes the pair of hover engines to rotate in opposite directions to provide movements 394g and 394h.

In 390e, 390f, 390g and 390h, it may be possible to control a turn radius by controlling the amount of rotation through the hinge mechanism. For example, more force can be applied on the rider platform at a particular location to increase the amount of rotation. The increased rotation can results in a tighter turn.

It may be possible, to place simultaneously, forces at locations proximate to 392e and 392h. This position can cause both the front and back pair of hover engines to rotate counterclockwise to induce a counter clockwise spin. Similarly, it may be possible, to place simultaneously, forces at location 392f and 392g. This position can cause each pair of hover engines to rotate clockwise to induce a clockwise spin of the vehicle.

Hover Engine Examples

Next, with respect to FIGS. 15A-17B, two hover engine configurations, a hinge mechanism, which can be used with a hover engine, and two magnet configurations, which can be used with a hover engine, are described. A first example hover engine is described with respect to FIGS. 15A-15C. A second example hover engine and an associated hinge mechanism is described with respect to FIGS. 16A-16C. Finally, two magnet configurations are described with described with respect to FIGS. 17A and 17B.

Figure 15A:
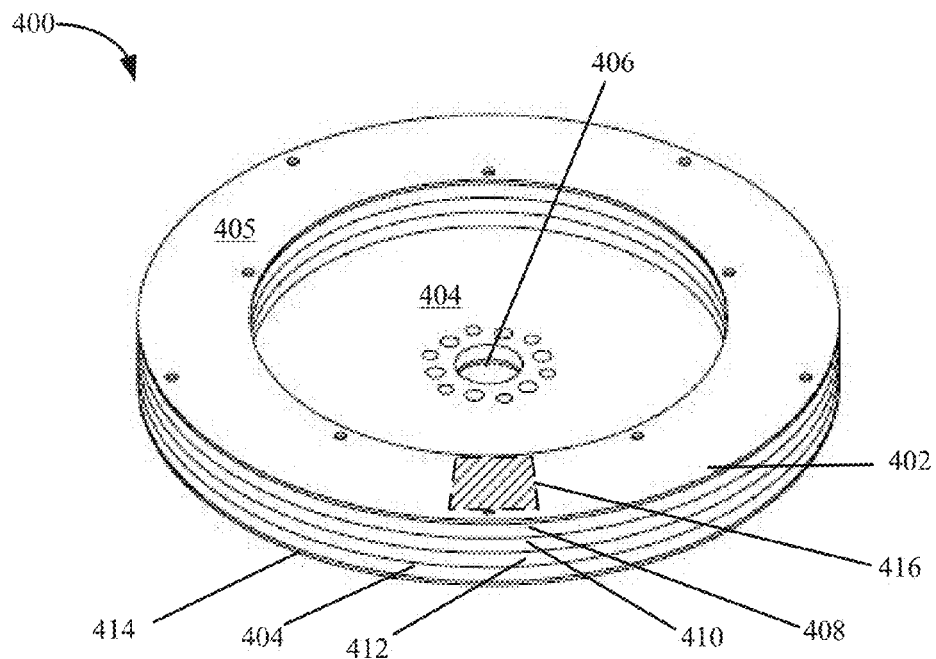
FIGS. 15A to 15C are illustrations of a hover engine in accordance with the described embodiments.
Figure 15B:
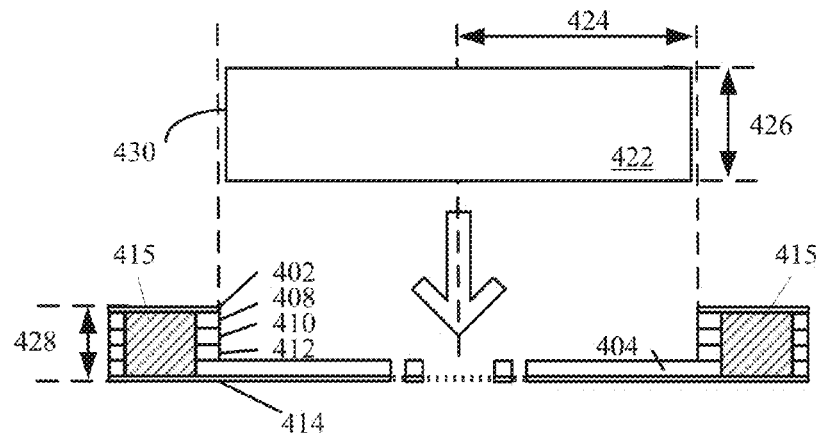

FIG. 15A is a perspective view of a STARM 400. The STARM 400 is 10 inches in diameter. In various embodiments, the STARMs used on a device, such as a hoverboard, can be between four and fourteen inches in diameter. However, for other devices, larger or smaller diameter STARMs may be used.

Generally, the size of the STARM will depend on the volume of magnets to be accommodated and the arrangement of magnets used. As will be described in more detail below different magnet configurations allow for and require different packaging schemes. The total volume of magnets which are used will depend on a desired maximum payload weight to be lifted and an operating height. Once, the total volume of magnets is determined, it can be distributed among one or more hover engines in selected configurations. Based upon the volume of magnets used in a hover engine and a selected magnet configuration, i.e., the distribution of the magnet volume on the STARM and polarity directions utilized, appropriate motors needed to rotate the STARM can be selected where a motor may turn one or more STARMs. As an example, the volume of magnets on a hoverboard, which can be distributed among one or more STARMS, can be between thirty and eighty cubic inches.

In general, various ratios of motors to STARMs can be utilized in a hover engine. For example, a hover engine can include one motor which turns one STARM. As another example, a hover engine can include one motor which drives two or more STARMs. In another example, a hover engine can include two motors which drive one STARM. In general, one or more motors can be paired with one or more STARMs where the number of motors can be less than equal to or greater than the number of STARMs. Thus, the example of a hover engine including one motor and one STARM is provide for the purposes of illustration only and is not meant to be limiting.

Returning to FIG. 15A, the STARM includes a raised outer ring 405. A distance from a bottom of the STARM 400 to a top of the outer ring is about 1.13 inches. This height allows one inch cubed magnets to be accommodated. In one embodiment, twenty one inch cube magnets are arranged within the outer ring. To accommodate more cubic magnets arranged in a circle, such as four more magnets to provide an additional repetition of the polarity pattern, a larger outer ring can be used. Using less cubic magnets, a smaller radius may be employed. Different shaped magnets and different polarity patterns can allow for different packaging schemes. Thus, this example, where the magnets are arranged in a ring is provided for the purposes of illustration only and is not meant to be limiting.

In one embodiment, the STARM 400 including the outer ring 405 can be formed from a number of layers, 402, 408, 410, 412, 404 and 414, from top to bottom, respectively. Layers 402 and 414 form a cover over the top and bottom portions of the magnets in the outer ring. In one embodiment, layers 402 and 408 are about 0.065 of an inch thick. In alternate embodiment, one or both of layers 402 and 408 can be eliminated. In one embodiment, the top and bottom layers can be formed from a material such as aluminum. In another embodiment, the top layer 402 can be formed from a material with magnetic properties, such as mu-metal, iron or nickel.

Layers 408, 410, 412, 404 each include twenty apertures to accommodate twenty magnets. More or less magnets and hence more or less apertures can be utilized and this example is provided for illustrative purposes only. The total thickness of the layers is one inch and each layer is 0.25 inch thick. In one embodiment, two layers are formed from polycarbonate plastic and two layers are formed from aluminum. The polycarbonate plastic can reduce weight. In various embodiments, the thickness of each layer, the material used for each layer and the number of layers can be varied. For example, different metals or types of plastics can be used. As another example, a single material can be used for each of the layers.

When the layers are aligned, the one inch cube magnets can be inserted through the layers. For different shaped or different size magnets, such as rectangular shaped magnets, trapezoidal shaped magnets or 1.5 cubic inch magnets, a different aperture shape or size can be used. In one embodiment, an adhesive can be used to secure the magnets in place, such as super glue. When secured, the bottoms of the magnets are approximately flush with the bottom of layer 404. This feature can maximize the height between the bottom of the magnets and the substrate when a vehicle using the STARM design 400 is hovering.

One or more layers can include apertures, such as 416, that allow fasteners to be inserted. The fasteners can secure the layers together. In another embodiment, an adhesive can be used to secure one or more of the layers to one another. In alternate embodiment, the layers 404, 408, 410 and 412 can be formed as a single piece.

Figure 17A:
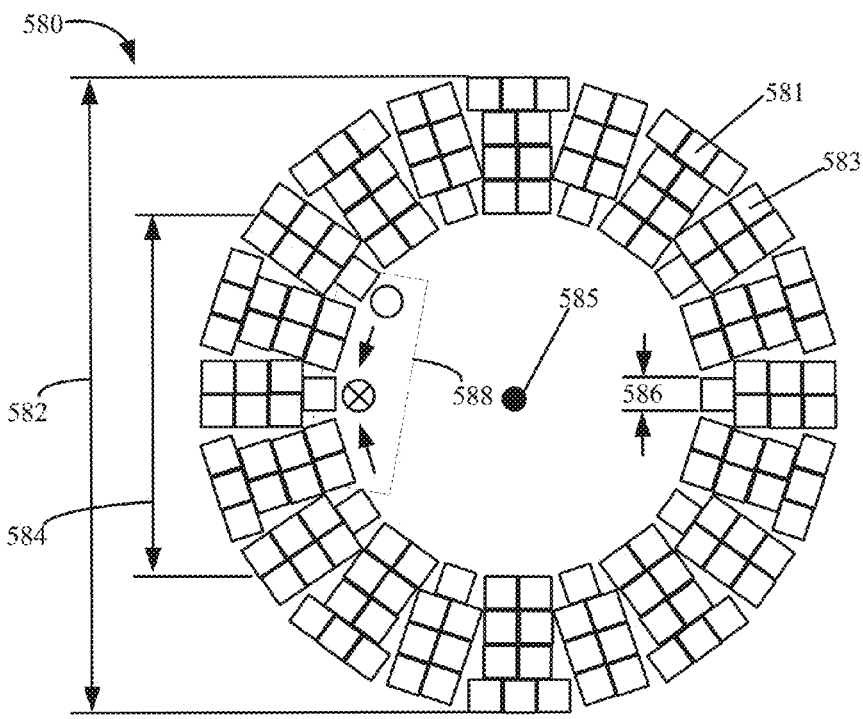
FIGS. 17A and 17B are top views of two magnet configurations and associated polarity alignment patterns where the magnets are arranged circularly in accordance with the described embodiments.
Figure 17B:
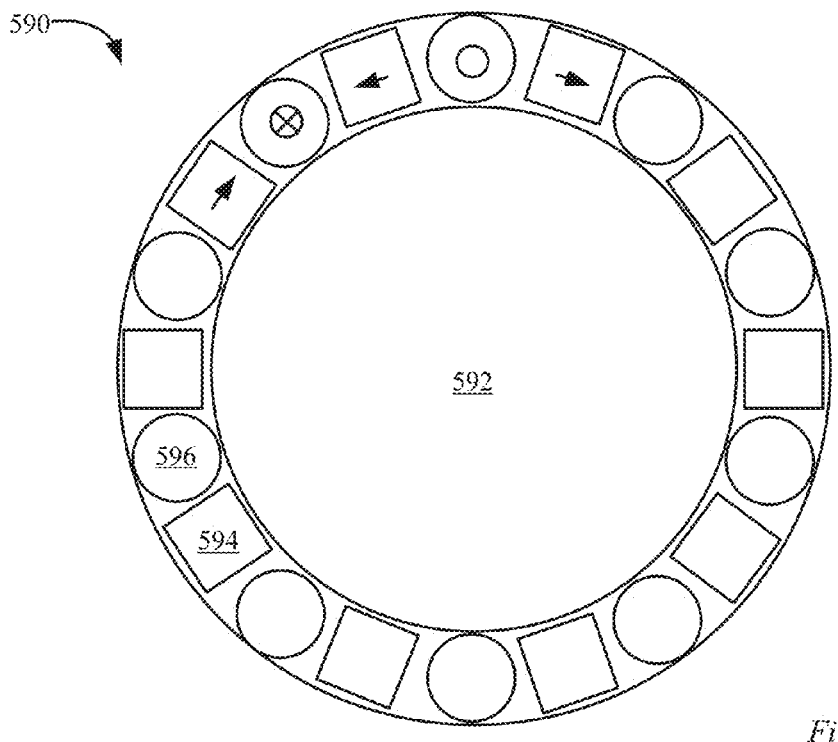

FIG. 17B is a side view of STARM 420 with an embedded motor 422. The cross sections of two magnets, 415, are shown within the outer ring 405. The top of the magnets is flush with the outer top of layer 408 and the bottom of the magnets is flush with the bottom of layer 404. In various embodiments, the STARM 420 can be configured to receive magnets between 0.5 and 2.5 inches of height.

In one embodiment, the top of the magnets may extend above the top of the 408. Thus, the outer ring 405 may only extend partially up the sides of each magnet. This feature may allow the magnets to be secured in place while reducing weight.

In alternate embodiments, using different magnet configurations, the magnets may be positioned beneath the motor. Further, the motor doesn't necessarily have to be direction above the STARM 420. For example, a belt, gearing or some other torque transmission mechanism may be used to place the motor to the side of the STARM 420. Further, in some embodiments, a motor may drive multiple STARMs. In addition, the motor rotational axis and the axis of rotation of the STARM don't have to be parallel to one another. For example, the motor rotational access can be angled to the axis of rotation of the STARM, such as perpendicular to the axis of rotation. Then, a belt and/or gearing system can be used to transfer and change the direction of the torque output from the motor.

The inner radius 424 of the outer ring 405 is greater than a radius of the motor 422. Thus, the motor can be inserted within the outer ring and secured to layer 404 such that the STARM 420 can be rotated when the motor is operated. Thus, the outer ring extends along the side 430 of the motor. An advantage of mounting the motor in this manner is that the overall height profile of the hover engine may be reduced as compared to mounting the motor 422 at a height above the top of the outer ring.

In various embodiments, the height 428 height of the outer ring may be less than the height of the motor 426, such that the outer ring extends partially up the side 430 of the motor 422. In another embodiment, the height 428 of the outer ring 405 and the height of the motor can be approximately equal. In yet another embodiment, the height 428 of the outer ring can be greater than the height of the motor.

It may be desirable to increase the height 428 to accommodate taller magnets. Taller magnets may be used to increase the amount of magnetic lift which is generated when the magnets, such as 415 are at a greater distance from a substrate. The volume of a magnet including its height can affect the strength of the magnetic field at a particular distance which extends from a magnet.

In various embodiment, a trade-off can be made between the distributing the magnets over a greater height range or over a greater area on the bottom of the STARM. For given volume of magnets, the foot print on the bottom of the STARM can be reduced by using taller magnets. Reducing the foot print may allow a smaller radius STARM to be used. However, a height of the hover engine may be increased.

Alternatively, the volume of magnets can be spread out over a larger area to provide a larger foot print of magnets on the bottom of the STARM. The larger foot print allows the maximum height of the magnets to be reduced and possible the maximum height of the hover engine to be reduced. However, a larger foot print may require a STARM with a larger radius.

The motor, such as 422, used to rotate a STARM can be electric or combustion based. In general, any type of motor which outputs a suitable amount of torque can be used. An electric motor requires a power source, such as battery or a fuel cell, to supply electricity. A combustion motor requires a fuel which is combusted to operate the motor. Battery types include but are not limited to batteries with a lithium or zinc anode, such as lithium ion, lithium polymer or a zinc-air system.

An electric motor can be configured to output torque about a rotational axis. The electric motor can include a configuration of wire windings and a configuration of permanent magnets. Current is provided through the windings to generate a magnetic field which varies as a function of time. The magnetic field from the windings interacts with magnetic field from the permanent magnets to generate a rotational torque. AC or DC motors can be utilized, such as an induction motor or a DC brushless motor.

In various embodiments, the windings can be configured to rotate while the magnets remain stationary or the magnets can be configured to rotate while the windings remain stationary. An interface, such as a shaft, can be provided which couples the rotating portion of the motor to the STARM 400. In FIG. 26A, the STARM 400 is configured to interface with the motor at 406.

The non-rotating portion of the motor 422 can be integrated into a motor housing which surrounds the magnets and the windings. The motor housing can include an interface which enables it to be attached to one more structures associated with a device. In another embodiment, non-rotating portion of the motor can include an interface which allows it to be directly attached to one or more structures associated with the magnetically lifted device.

In a particular embodiment, the core of the motor 422 can be stationary where both the magnets associated with the motor and the magnets associated with the STARM rotate around the stationary core. One non-rotating support structure can extend from the core which allows the motor and STARM to be coupled to the device. A second non-rotating support structure can extend from the core which provides support to a portion of a shroud which is interposed between a bottom of STARM and the substrate which supports the induced eddy currents (e.g., see FIG. 16A).

The arrangement of magnets in the motor 422 can include poles which are substantially perpendicular to the axis of rotation of the motor (often referred to as a concentric electric motor) or can include poles which are substantially parallel to the axis of rotation of the motor (often referred to as an axial electric motor). In one embodiment, a winding configuration, such as the winding configuration associated with an axial motor, can be used to induce eddy currents in a substrate. In these embodiments, there are no rotating parts and the STARM and the magnets associated with an electric motor are eliminated. As part of a hover engine, the windings can be tilted relative to a device to generate control forces in a manner previously described above.

In yet another embodiment, the magnets associated with the motor 422 can be removed and a motor winding can be designed which interacts directly with the magnets in the STARM. For example, a winding can be placed above magnets 415 to interact with the magnetic flux above the magnets or a winding can be placed around the outside of magnets 415 or around the inside of magnets 415. A current applied to the winding to cause the STARM to rotate. As described above, rotation of the STARM can cause eddy currents to be induced in a portion of a substrate.

As an example, the motor 422 can include an outer ring configured to rotate. The STARM 400 can mounted be to the outer ring of the motor 422 instead of to a shaft extending from the center of the motor. This type of motor design can be referred to as an outboard design. This feature may allow the portion of layers 404 and 412 within the inner radius 424 of the outer ring 405 to be removed such that the bottom of the motor is closer to the bottom of the outer ring 405. One advantage of this approach is that the overall height of the STARM 420 and motor 422 may be reduced.

In a particular embodiment, the outer ring 430 of the motor and the outer ring 405 of the STARM may be formed as an integrated unit. For example, the outer ring of the motor 422 can have a layer extending outwards from the side 430. The layer extending from the side 430 can include a number of apertures through which magnets can be inserted. Optionally, one or more layers with apertures, such as 408, 410 and 412, can be placed over the magnets.

In general, in a hover engine, the support structures associated with the STARM, the stator of the motor, the shroud and housing can be integrated with one another. For example, an enclosure for the motor and STARM can include an integrated shroud. In another example, the structure forming the rotor for the motor can be integrated with the structure for the STARM. In another example, all or a portion of the structure forming the stator of the motor can be integrated with a housing and/or shroud associated with the hover engine.

Figure 15C:
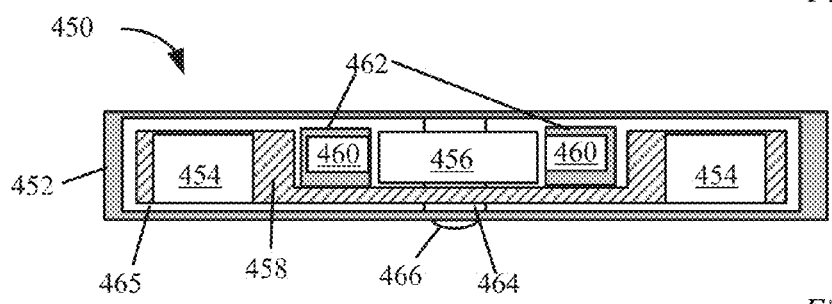

FIG. 15C is a side view of a hover engine 450 having a STARM 465 integrated with a motor in accordance. The hover engine 450 includes a stationary core 456 with windings configured to interact with magnets 460 to rotate the magnets. The core is attached to the support structure 464. The support structure 464 can provide a first interface to attach the hover engine to a hover board. In addition, the support structure 464 can be coupled to a housing 452 which surrounds both motor and the STARM 465. The support structure 464 may be used to help maintain a gap between the bottom of the STARM 465 and the housing 452.

In one embodiment, a small protuberance 466 may be provided at the end of support structure 464. The small protuberance 466 can be formed from a metal or a material with a low friction coating, such as a Teflon coated material. The small protuberance can provide a small stand-off distance when the hover engine is near the ground, such as during take-off and landing. It can help prevent the STARM 465 from impinging the ground. In particular embodiments, the protuberance 466 can be coupled to a portion of the hover engine which rotates or a portion which remains static during operation.

The STARM 465 includes a structure 458 surrounds the magnets 454. As described above, the structure 462 surrounding magnets 460 and the structure 458 surrounding magnets 454 can be formed as a single piece. The magnets 454 and 460 may be shaped differently and have different sizes relative to one another.

In various embodiments, bearings (not shown) can be provided between the support structure 464 and the structure 458 to allow the STARM 465 to rotate about the stationary core. In lieu of or in addition to bearings between the STARM structure 458 and the support structure 464, bearings can be provided at one or more locations between the housing 452 and the structure 458. For example, bearings may be placed between the bottom of the STARM 465 and the housing 452 to help maintain the spacing between the housing 452 and the STARM 465 on the bottom of the STARM. In another example, a bearing may be placed between the side of the STARM and the side of the housing 452 to maintain the spacing between the inner side of the housing 452 and the side of the STARM.

In one embodiment, the height of the hover engine can be less than three inches. In another embodiment, the height of the hover engine can be less than two inches. In yet another embodiment, the height of the hover engine can be less than one inch. The magnets are packaged between a top and a bottom height of the hover engine. Thus, in each of these examples, the maximum height of the magnets will be at most the same as the height of the hover engine. Typically, the maximum height of the magnets will be less than the height of the hover engine.

Figure 16A:
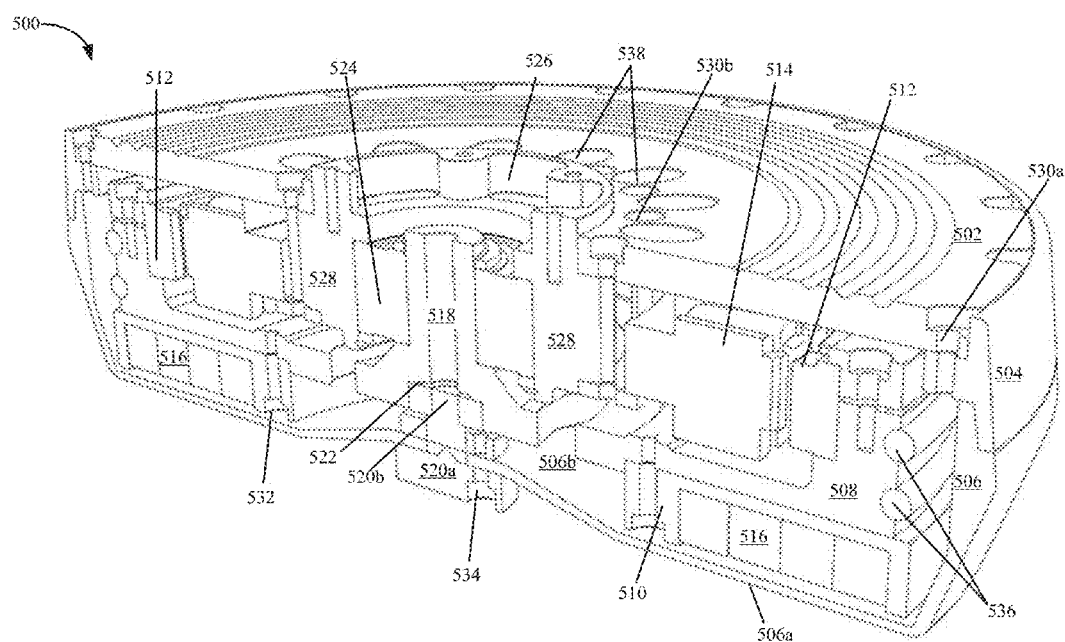
FIG. 16A is a perspective cross section of a hover engine in accordance with the described embodiments.

FIG. 16A is a perspective cross section of a hover engine 500. The hover engine 500 includes component which remain stationary during operation and components which rotate during operation. In this example, components 502, 504 and 506, which form an outer housing for the hover engine, component 528 and component 520 remain stationary during operation.

Component 528 extends from the top cover 502. It provides support for motor windings 514 and a bearing 524 which supports a rotating shaft 518. The motor windings 514 are opposite magnets 512, which extend circumferentially around the device 500. When current is supplied to the windings 514, the windings interact with the magnets 512 to induce a rotational torque. The rotational torque can cause component 508 to rotate. Rotatable component 508 includes the rotatable shaft portion 518 which extends through the core of the hover engine.

The motor includes the stator portion with windings 515 and a rotor component 508 with a first set of magnets 512. In one embodiment, the motor can be an UTO out-runner motor kit by Applimotion, Inc. (Loomis, Calif.). For various motor configurations, the stator outer diameter can vary from 0.6 to 6.7 inches. The stator includes windings 514. The stator length can vary from 0.7 to 2.3 inches. The rotor inner diameter can vary from 0.6 to 6.9 inches. The rotor includes a first set of magnets 514 formed into a ring. Torque output from the motors can vary from 1.1 to 744.2 oz-inches. The current associated with the motor can be between 1.3 and 20.7 amps.

In the embodiment, the motor is a UTO-200, which has a stator outer diameter of 6.7 inches and the rotor inner diameter is approximately 7 inches. For this motor, the stator length can be varied between 1, 1.2 and 1.4 inches to provide a torque output of 650.5, 573.8 and 744.2 oz-inches. The motors utilize 30, 30 and 40 magnet poles respectively. The radial dimensions of 500 allow one of these motor configurations to be accommodated. The height the hover engine 500 can be adjusted to accommodate motors with different stator lengths.

In one embodiment, the rotor 508 can include grooves around an outer diameter. The grooves can be used to support the two rings 536. In one embodiment, the two rings 536 can be used to provide vibrational damping. In alternate embodiments, rings 536 may not be utilized.

A carrier component 510, which holds a second set of magnets 516, is secured beneath component 508 and hence rotates as component 508 rotates. The second set of magnets can cause lift and propulsive forces to be generated when the second set of magnets rotates above a conductive substrate as described above with respect to FIGS. 1 to 4C. In this example, a first portion of the second set of magnets is beneath the stator component of the motor. A second portion of the second set of magnets is beneath the motor magnets 512.

In particular, the motor magnets 512 are positioned between an inner radius of the second set of magnets 516 and an outer radius of the second set of magnets 516. For some magnet configurations, it may be advantageous to have a larger bottom surface area of the magnets, which face the conductive substrate, and a lower magnet height as compared to a smaller bottom surface area of the magnets and a greater magnet height. This configuration which extends both the stator and rotor components of the motion can allow the bottom surface area of the second set of magnets 516 to be increased.

Cross sections of four magnets are shown on each side of the cross section. In one embodiment, these four magnets can represent a cross section of the magnet pattern shown in FIG. 17A which includes four radially disposed rows of magnets. In one embodiment, each of the magnets is a cube with a 12 mm side length. However, other magnet configurations and magnets sizes are possible and the example of four rows of 12 mm$^3$ magnets is provided for illustrative purposes only.

In one embodiment, the outer housing can be formed from three components, 502, 504 and 506. Component 502 is secured to component 504 via fasteners inserted through apertures such as 530a and 530b. When secured together, components 502 and 504 form an upper and side portion of the housing for motor 500. Component 502 can include apertures, such as 538, to provide air flow within the hover engine for cooling purposes. Other aperture locations are possible, such as on components 502, 504 or 506, and these aperture locations are provided for illustrative purposes only.

The component 502 includes a ring portion 526 with apertures for fasteners, which extends into the interior of hover engine. Component 528, which supports the bearing 524 and stator portion of the motor, is the portion of component 526, which extends into the interior of the hover engine. The apertures can be used to attach the hover engine 500 to a vehicle support structure in a fixed orientation or to a hinge mechanism which allows the hover engine to be tilted. An example of a hinge mechanism, which can be coupled to the hover engine 500, via ring structure 526, is described below with respect to FIGS. 16B and 16C.

The lower portion of the housing 506 includes a first portion 506a, which extends beneath the second set of magnets 516, and a second portion 506b. The portion 506b is at a different height than portion 506a, as it extends into an inner core of the hover engine. The interior of carrier 510, which holds the second set of magnets 516, is hollow, and as described above, suspended from component 508. The hollow portion provides room for portion 506b to extend upwards.

At the axis of rotation of the motor, which is through shaft 518, a stationary structure with two pieces, 520a and 520b, is located on either side of the housing portion 506b. The two pieces are secured together via fastener through apertures 534. In one embodiment, piece 520b can be integrally formed with a lower portion of the housing 506. A bearing 522 is placed above component 520b. The shaft portion 518 rests on bearing 522 and the bearing 522 rests on component 520b, which is stationary. The bearing allows shaft to rotate relative to the stationary portion 522b.

When not in flight, the hover engine can rest on component 520a and the weight of a vehicle and payload can be supported on this component. In one embodiment, the payload can be a person. The weight of the vehicle and payload can be transferred through portion 520a, 520b, bearing 522 and shaft 518. The shaft exerts force on bearing 524 which is secured within the extended portion 528 of the top cover 502. Thus, the force is transferred from the bearing t to the cover 502.

An advantage of this approach is the bottom portion of housing 506a can be made thinner, which reduces the minimum distance between the bottom of magnets 516, and the conductive substrate. Structure 506a can be made thinner because it doesn't have to support the weight of the vehicle and payload when it is resting or a greater weight if the vehicle strikes the ground. If components 520 and 520b were not present and structure 506a extended across a bottom of the hover engine 500, structure 506a would have to be made much thicker to support a weight of the vehicle and the payload, such that it doesn't bend and impinge into the rotating components. By extending the structure 520a into the interior portion between the magnets 516, the structure 520a may extend only slightly below the bottom of the housing 506a, which again helps to maintain the minimum distance between the bottom of magnets 516 and the conductive substrate.

Figure 16B:
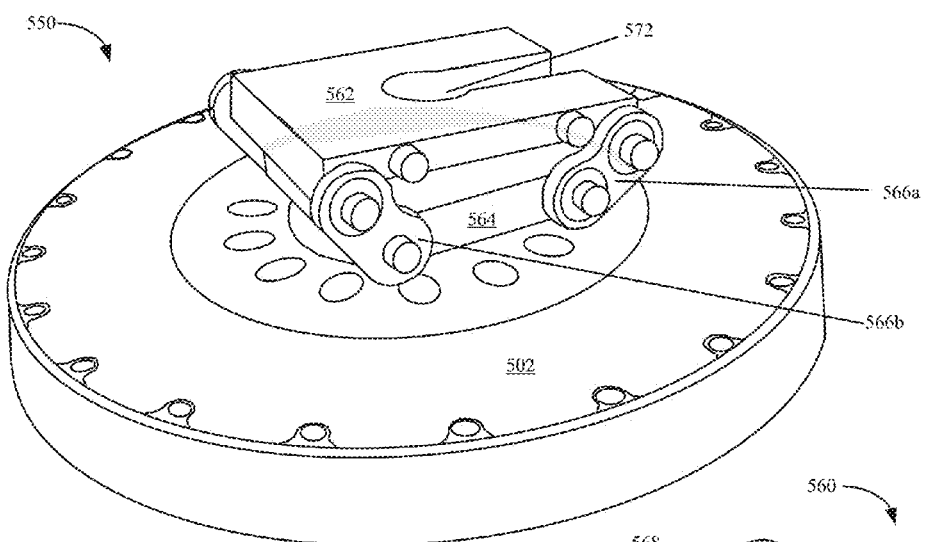
FIG. 16B is an outside perspective view of the hover engine shown in FIG. 16A which includes an attached hinge mechanism in accordance with the described embodiments.
Figure 16C:
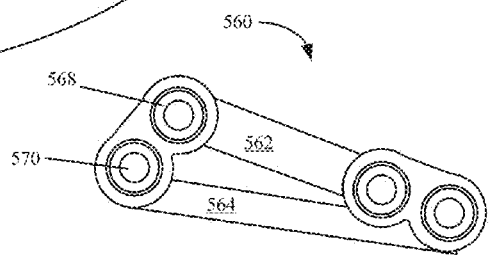
FIG. 16C is a side view of the hinge mechanism shown in FIG. 16B.

FIG. 16B is an outside perspective view 550 of the hover engine 500 shown in FIG. 16A. FIG. 16C is a side view of the hinge mechanism shown in FIG. 16B. In this embodiment, a hinge mechanism 560 is coupled to the top cover 502 of the hover engine housing. As described above, the hover engine can be coupled to a support structure in a fixed orientation such that the hover engine is non-tiltable.

The hinge mechanism 560 includes a top portion 562 and a bottom portion 564. An aperture 572 in top portion 562 provides a path for wires which provide current to the motor to extend into the hover engine. When a battery is used, the current can pass through an electronic speed controller and then into the motor. Four links, such as 566a and 566b, couple the top portion 562 and the bottom portion 564. Each link rotates around two axes. In one embodiment, bearings, such as 568 and 570, can allow each link to rotate about each of its two axes. Using multiple rotation axes in the hinge mechanism allows the weight of the hover engine to be distributed. This approach can generate less wear and stress on the hinge mechanism 560 as compared to when a single rotational axis is used in the hinge mechanism. Although not shown, a force can be applied to the hover engine from an actuator or from a user to cause a tilt of the device.

FIGS. 17A and 17B are top views of two magnet configurations and associated polarity alignment patterns where the magnets are arranged circularly. In FIG. 17, the magnet polarity pattern 588 is used for the magnet configuration 580. The magnet polarity pattern is repeated five times. In other embodiments, this pattern can be repeated less than or more than five times.

The magnet configuration 580 can be configured to rotate about a rotational axis 585, which extends perpendicularly from the page. The circles in the polarity pattern 588 refer to magnets whose north and south poles are generally parallel to the axis of rotation 585. The arrows refer to magnets where the north and south poles are aligned with the direction of the arrows where the arrow points in the north direction. The direction of these arrows, and hence the north and south poles of these magnets, is generally perpendicular to the axis of rotation 585.

The magnet configuration 500 includes two shapes, 581 and 583, which are alternately repeated. Shape 581 is formed from nine cubic magnets and shape 583 is formed from seven cubic magnets. In alternate embodiments, single magnets with these shapes and polarities can be formed or some other combination of magnets can be used to form the shapes. For example, shape 581 can be formed from a first six by two magnet and a second one by three magnet.

In this example, shape 581 is always associated with polarities which are generally perpendicular to the axis of rotation. Shape 583 is always is associated with polarities which are generally parallel to the axis of rotation 585. Because the volumes of shapes 581 and 583 are different, the volume of magnets assigned to each type polarity is different (e.g., parallel or perpendicular to the axis of rotation). In contrast, in FIGS. 2 and 24, the volume of magnets assigned to each type of polarity is the same. It was found, via simulation, that making the volume of magnets associated with each type of polarity (e.g., parallel to the axis of rotation versus perpendicular to the axis of rotation) can increase the lift performance when the magnet configuration is used in a hover engine as compared to designs where the volume of each type of polarity is the same.

In one embodiment, cubic magnets with a twelve mm side can be used. Thus, dimension 586 is twelve mm. Dimension 582 is 223.53 mm and dimension 584 is 127.53 mm. If different sized magnets are used, then these dimensions will change to accommodate shapes 581 and 583 packed together in this manner.

In FIG. 17B, magnet configuration 590 is shown. The magnets in the configuration are secured to the rotatable component. The magnet polarity pattern is the same as in FIG. 17A. However, shape 594, which is a cube, and shape 596, which is a cylinder is used. In one embodiment, the side length of the cube is one inch and the diameter of the circle is one inch, i.e., the diameter and side lengths are equal. Thus, the volume of the cubes is greater than the cylinders. Other designs where side length and diameter are equal but the side length is greater than one inch or less than one inch can be used. One advantage of using the cylinders is it allows additional room for fasteners when the magnets are packed together in this configuration.

When twelve millimeter cubes are used in FIG. 17A, the total volume of the magnets is about seventeen cubic inches. When a one inch side length of the cube and a diameter of the cylinder are used, the volume of the magnets is about eighteen cubic inches. It was found that the lifting performance of these two configurations is similar to the lifting performance determined for the magnet configuration shown in FIG. 24, which uses twenty cubic inches of magnets formed from one inch cubes and utilizes a similar magnetic polarity pattern.

Vehicle Configurations and Navigation, Guidance and Control (NGC)

Next, various configurations of magnetically lifted devices including multiple hover engines are described with respect to FIGS. 18-23. In particular, arrangements of hover engines and then their actuation to provide movement are described. In addition, Navigation, Guidance and Control (NGC) functions, which can be applied to magnetically lifted devices, are discussed.

Figure 18:
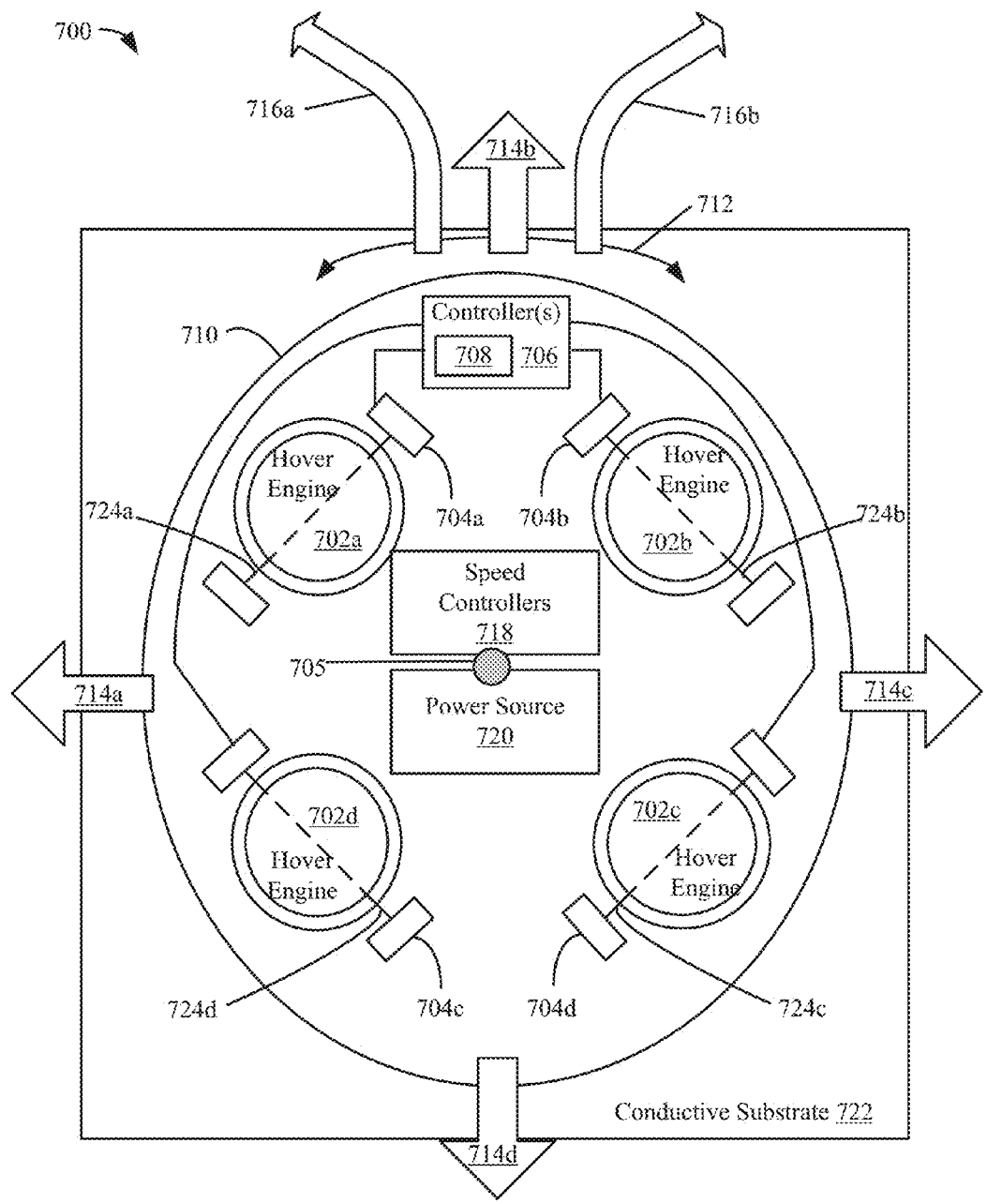
FIG. 18 is an illustration of a magnetically lifted device with four tiltable STARMs in accordance with the described embodiments.

FIG. 18 shows a top view of a vehicle 700 configured to operate over a conductive substrate 722. The vehicle 700 includes four hover engines, 702a, 702b, 702c and 702d. Each hover engine includes a STARM and a motor and a mechanism which enables a propulsive force to be output from each hover engine. In one embodiment, each of the hover engines 702a, 702b, 702c and 702b can be tilted around an axis, such as 724a, 724b, 724c, 724d, via control of an actuator. In particular embodiments, the hover engines can each be individually actuated so that the direction and amount of the tilt angle as a function of time can be individually changed for each of the four engines.

In alternate embodiments, two or more hover engines can be controlled as a unit. For example, two or more hover engines can be mechanically coupled to a single actuator. The single actuator can move both hover engines simultaneously. In another example, the two or more hover engines can be digitally coupled such that the two or more hover engines are always moved together simultaneously, i.e., a movement of one hover engine specifies some specific movement of another hover engine, such as both being tilted in the same manner. When independently controlled, the movement of one hover engine can affect the movements of other engines, such as to implement GNC functions. However, a second hover engine may not be always constrained to a specific control movement in response to the movement a first hover engine as in the case when two hover engines are controlled digitally and/or mechanically controlled as unit.

The actuators associated with each hover engine can be coupled to one or more controllers 706 and an IMU 708 (Inertial Measurement Unit). The actuators can each also have a separate controller which responds to commands from the controller 706. The controller 706 can also be coupled to a power source 720 and one or more speed controllers 718. The one or more speed controllers 718 can be mechanical speed controller or electronic speed controllers. The power source can be on-board or off-board. The hover engines are secured via a housing and associated support structure 710.

The center of mass of the vehicle is indicated by the circle 705. The center of mass affects the moments generated when each of the four hover engines are actuated. In particular embodiments, the vehicle can include a mechanism which allows the center of mass to be adjusted in flight, such as a mechanism for moving a mass from one location to another. For example, in an airplane, fuel can be moved from one tank to another to affect the center of mass characteristics.

An IMU 708 works by detecting the current rate of acceleration using one or more accelerometers, and detects changes in rotational attributes like pitch, roll and yaw using one or more gyroscopes. It may also include a magnetometer, to assist calibrate against orientation drift. Inertial navigation systems can contain IMUs which have angular and linear accelerometers (for changes in position). Some IMUs can include a gyroscopic element (for maintaining an absolute angular reference).

Angular accelerometers can measure how the vehicle is rotating in space. Generally, there is at least one sensor for each of the three axes: pitch (nose up and down), yaw (nose left and right) and roll (clockwise or counter-clockwise from the cockpit). Linear accelerometers can measure non-gravitational accelerations of the vehicle. Since the can move in three axes (up & down, left & right, forward & back), there can be a linear accelerometer for each axis.

A processor can continually calculate the vehicle's current position. First, for each of the six degrees of freedom (x, y, z and θx, θy and θz), the sensed acceleration can be integrated over time, together with an estimate of gravity, to calculate the current velocity. Then, the velocity can be integrated to calculate the current position. These quantities can be utilized in the GNC system.

Returning to FIG. 18, as described above, the forces generated from changing a tilt of a rotating STARM relative to the substrate 722 are directed primarily along the tilt axes when the vehicle is parallel to the substrate 722. For example, a tilt of hover engine 702a can generate a force which is primarily parallel to axis 724a.

With the tilt axes arranged at an angle to one another as shown in FIG. 18, a combination of STARMs can be actuated to generate a net linear force in any desired direction. Further, the STARMs can be actuated in combination to cancel moments or if desired induce a desired rotation in a particular direction. In addition, different combinations of STARMs can be actuated as a function of time to generate a curved path in a desired direction(s) as a function of time. Yet further, a combination of STARMs can be actuated so that the vehicle moves along linear or curved path and rotates around an axis while moving along the path.

The tilt control can be used alone or in combination with rotational velocity control of each hover engine. The translational and lifting forces which are generated can vary as a function of the rotational velocity and a hover height. A rotational speed of a hover engine can be varied relative to other hover engines or in combination with other hover engines to change the magnitude of lifting and drag forces which are output from the one or more hover engines. For example, the rotational velocity control may be used to counter imbalances in forces, such as resulting from a shifting center of mass. For an electric motor, the one or more controllers 706 can control the speed controllers 718 to change the rotational velocity of a hover engine.

In the example of FIG. 18, angles can be defined relative to the tilt axes. For example, the angle between tilt axis 724a and 724b is approximately ninety degrees. The angle between tilt axis 724a and 724c is approximately ninety degrees and the angle between tilt axis 724a and tilt axis 724c is 180 degrees.

In one embodiment, the tilt axes of the hover engines opposite one another can be parallel to one another, i.e., an angle of one hundred eighty degrees. However, the angle between the tilt axes of the hover engines adjacent to one another don't have to be equal. In particular, the angle between tilt axes 724a and 724b can be a first angle and the angle between tilt axes 724a and 724c can be one hundred eighty degrees minus the first angle where the first angle is between zero and one hundred eighty degrees. For example, the angle between tilt axes 724a and 724b can be ten degrees and the angle between tilt axes 724a and 724c can be one hundred seventy degrees. In general, the angles between all of the tilt axes, 724a, 724b, 724c and 724d can be different from one another.

In FIG. 18, the hover engines can be tilted to generate various movements, such as left, 714a, right 714b, forward 714b and back 714b. Further, the hover engines can be tilted as a function of time to cause the vehicle 700 to follow a curved path, such as 716a and 716b. In addition, the hover engines can be tilted to cause the vehicle 700 to rotate in place in a clockwise or counterclockwise rotation 712. For example, without rotating, the vehicle 700 can be controlled to move in a first straight line for a first distance, and then move in a second straight line perpendicular to the first straight line for a second distance. Then, the vehicle 700 can rotate in place.

A vehicle with a configuration similar to vehicle 700 was constructed. The vehicle cylindrically shaped with a diameter of 14.5 inches and a height of 2.125 inches. The vehicle weighed 12.84 pounds unloaded. Tests were performed where the vehicle carried more than twenty five pounds of payload beyond its unloaded weight.

Four hover engines are used. Each hover engine includes a STARM which is 4.25 inches in diameter. Sixteen ½ inch cube magnets are arranged in each STARM in a circular pattern. The arrangement is similar to the configuration shown in FIG. 24 which employs twenty magnets. N52 strength Neodymium magnets are used.

One motor is used to turn each STARM. The motors were Himax 6310-0250 out runners. The motors each weigh 235 grams. The optimum working range for the motors is 20 to 35 Amps with a max current of 48 Amps. The motors are cylindrically shaped with a length of 32 mm and a diameter of about 63 mm. The motor power is about 600 Watts and the motor constant, $K_v$, is about 250.

Electronic speed controllers were used for each motor. In particular, Phoenix Edge electronic speed controller (Edge Lite 50, Castle Creations, Inc. Olathe, Kans.) were used. The speed controllers are coupled to batteries. In this embodiment, two VENOM 50C 4S 5000 MAH 14.8 Volt lithium polymer battery packs are used (Atomik RC, Rathdrum, Id.)

Four Hitec servos were used (HS-645MG Ultra Torque, Hitec RCD USA, Inc. Poway, Calif.) as actuators. The servos put out a maximum torque of 133 oz-in and operate between 4.8 and 6V. Depending on the size of the hover engine which is actuated, different servos with varying torque output capabilities may be used and this example is provided for illustrative purposes only.

In addition, one actuator is shown per motor. In alternate embodiments, a single actuator can be used to tilt more than one hover engine. In yet other embodiments, a plurality of actuators can be used to change an orientation of a STARM and/or motor. In further, embodiments, one or more actuators in combination with an input force provided from a user can be used to change an orientation of a STARM and/or motor.

The servos are used to tilt a motor and a STARM in unison. The control system is configured to independently tilt each hover engine including the motor and STARM. In a particular embodiment, the motor and STARM are configured to tilt through a range of −10 to 10 degrees. Ranges, which are greater or small than this interval can be used and this example is provided for the purposes of illustration only.

In one embodiment, the same tilt range can be implemented for each hover engine. In other embodiments, the tilt range can vary from hover engine to hover engine. For example, a first hover engine can be tilted between a range of −15 to −15 degrees and a second hover engine can be tilted between −5 and 10 degrees.

A Hobbyking KK2.1.5 Multi-rotor LCD Flight Control Board with 6050 MPU and an Atmel 644PA was used for control purposes. The board is 50 mm×50 mm×12 mm and weighs 21 grams. The input voltage is 4.8-6V. The gyro/accelerometer is a 6050 MPU InvenSense, Inc. (San Jose, Calif.). It has a MEMS 3-axis gyroscope and a 3-axis accelerometer on the same silicon die together with an onboard Digital Motion Processor™ (DMP™) capable of processing complex 9-axis Motion/Fusion algorithms.

The vehicle was able to climb up sloped surfaces. In a test on a flat track, an acceleration of 5.4 ft/sec² was measured, which is about 0.17 g's. The acceleration depends on the thrust force which is output, the overall weight of the vehicle, the tilt angle of the STARMs and the STARM magnet configuration. Thus, this example is provided for the purposes of illustration only.

In particular embodiments, a vehicle can be controlled via a mobile control unit. The mobile control unit can be coupled to a vehicle via a wireless or wired communication link. The mobile control unit can include one or more input mechanisms, such as control sticks, a touch screen, sliders, etc.

The mobile control can receive inputs from the input mechanisms and then send information, such as commands, to the vehicle. A command could be move right, move in some direction or rotate in place. The GNC system on the vehicle can receive the command, interpret it and then in response generate one or more additional commands involving controlling the actuators and/or hover engines to implement the commands. For examples, one or more of the actuators on the vehicle can be controlled to implement a received movement or rotation command.

In one embodiment, the mobile control unit can be a smart phone, with a touch screen interface. An application executed on the smart phone can generate an interface on the touch screen which is used to input control commands. In addition, the application can be configured to output information about the vehicle's performance to a display, such as speed, orientation, motor RPM, flight time remaining, etc. The smart phone can be configured to communicate with the vehicle via a wireless communication interface, such as but not limited to Bluetooth.

In another embodiment, a hand-held control unit, such as one used to control a quad copter or radio controlled car can be used. Hand-held control units can include multiple channels, a channel switch, a digital display, an antenna, control sticks, trims and an on/off switch. One example is a Spektrum DX6i DSMX 6-Channel transmitter (Horizon Hobby, Inc., Champaign, Ill.). Next, some details of tilting a STARM to control a vehicle are described.

Figure 19A:
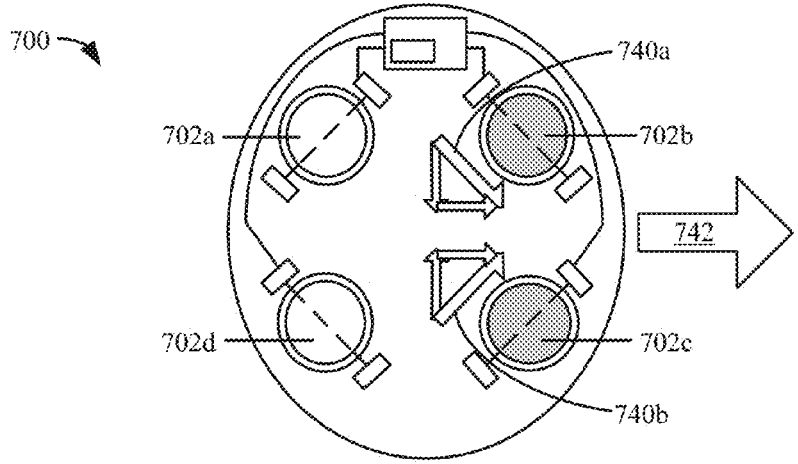
FIGS. 19A to 19C are illustrations of a magnetically lifted device with four tiltable STARMs tilted in various configurations in accordance with the described embodiments.
Figure 19B:
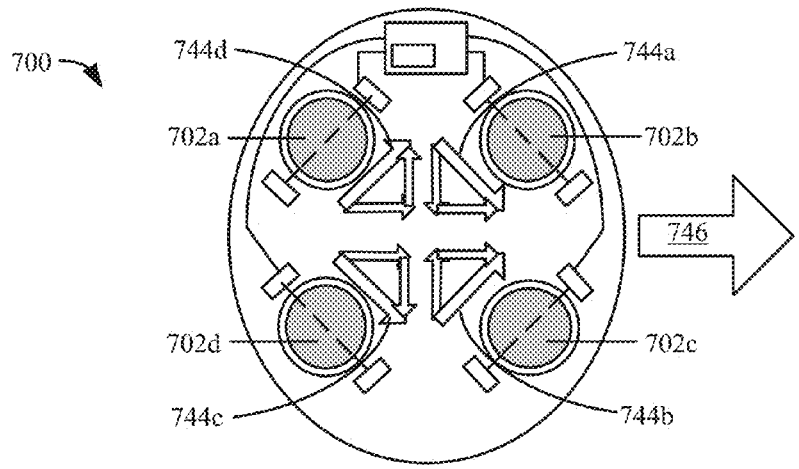
Figure 19C:
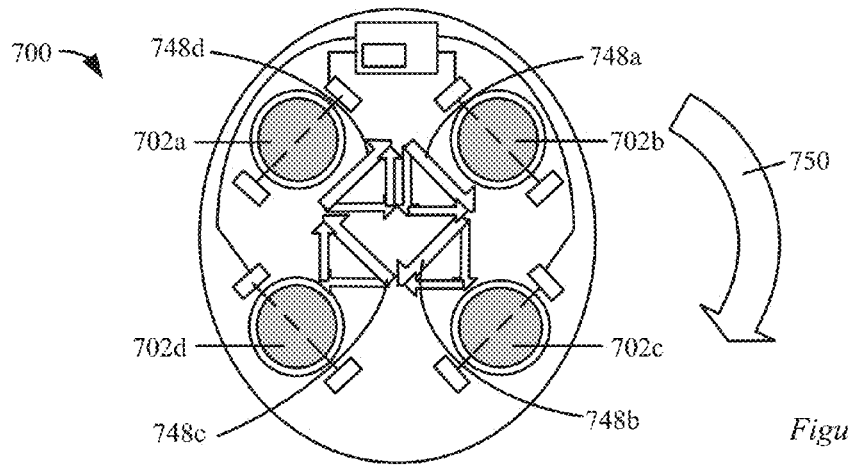

FIGS. 19A, 19B and 19C, show some examples of actuating different combination of hover engines to produce a movement or rotation. In FIG. 19A, two hover engines 702*b* and 702*c*, which are shaded, are actuated to produce a net rightward force 742 which can move the vehicle to the right 742. The direction of the net force generated by each of the two hover engines is shown by the adjacent arrows, 740*a* and 740*b*. Hover engine 702*b* generates a net force 740*a* with a downward and rightward force component. Hover engine 702*c* generates a net force 740*b* which is upwards and to the right.

The upward and downward translational forces cancel when the two hover engines are actuated to generate the same magnitude of force which results from the eddy currents induced in the substrate. The rightward force component are additive and produce a net translational force to the right. When the two hover engines are an equal distance from the center of mass of the vehicle, the moments generated from the two hover engines cancel one another and thus rotational stability can be maintained.

The hover engines, even when identical, may not be actuated the same amount. For example, the vehicle 700 can be tilted such that one of hover engine 702*b* and 702*c* is closer to the substrate. The distance of the hover engine to the substrates affects the force output from the hover engine as a result of its tilt. Hence, different tilt angles may be required to balance the forces output from each hover engine.

Further, when the vehicle 700 is loaded, the center of mass can shift depending on how the weight of the payload is distributed. Thus, the center of mass can shift from the unloaded state to the loaded state and the two hover engines may no longer be an equal distance from the center of mass of the vehicle. In this instance, when a pair of hover engines each generates the same amount of net force, a net moment may be present because the two hover engines are different distances from the center of mass. Thus, the combination of hover engines which are used and the amount of actuation of each hover engine may have to be adjusted to account for the shifting center mass due to payload shifts or the overall orientation of the vehicle 700 relative to the substrate over which it is operating.

The magnitude of the effects resulting from changes in the center of mass will depend on how much the center of mass shifts from the loaded to unloaded state. Further, in some instances, the center of mass can shift during operation if the payload is allowed to move during operation or if the payload is being lessened. For example, if a fuel is consumed during operation of the vehicle, the center of mass of the vehicle may change due to the fuel being consumed. As another example, if one or more persons is riding on a vehicle and can move around, the center of mass may change. Thus, in particular embodiments, the center of mass may be changing dynamically during operation and the GNC system can be configured to account for the shifts in the center of mass of the vehicle when maintaining rotational and translational control.

In FIG. 19B, a net rightward movement is generated using four hover engines. In this example, all four hover engines, 702*a*, 702*b*, 702*c* and 702*d* are actuated to generate a net force 746 in the rightward direction. In general, the hover engines can be actuated to generate a net translational force which is substantially in the rightward direction. In particular, the hover engines are actuated to cancel translational forces in other than rightward directions. Further, hover engines can be actuated such that the net moment acting on the vehicle is zero. As described above, to rotate the vehicle, a net moment can be generated which rotates the vehicle in a clockwise or counter-clockwise direction.

In FIG. 19C, the four hover engines, 702*a*, 702*b*, 702*c* and 702*d*, are shown actuated in a manner which causes a net moment in the clockwise direction. The translational forces associated with the four hover engines cancel one another. Thus, the vehicle can rotate in place.

In the example of FIGS. 19A, 19B and 19C, all four hover engines' tilt axes are orientated about the edges of a rectangle. This configuration allows the vehicle to move upward/downward or left/right on the page with equal ease. In other embodiments, the hover engines tilt axes can be located around the perimeter of a parallelogram. Thus, the hover engine may more easily generate a translational forces in particular directions, such as left/right on the page versus up/down on the page. Further, in some embodiments, as described above, mechanisms can be provided which allow the direction of a tilt axes to be changed on the fly. Thus, it may be possible to change the configuration of the hover engine tilt axes on the fly.

In the example of FIGS. 19A, 19B and 19C, the force vector generated by each hover engine is assumed to be an equal distance from the center of mass of the vehicle. In other embodiments, the hover engines can be different distances from the center of mass of the vehicle. For example, a pair of two hover engines can each be a first distance from the center of mass and a second pair of hover engines can each be a second distance from the center of mass.

Further, even when the hover engines are the same distance from the center of mass the hover engines can be configured to output different levels of propulsive forces. For instance, one hover engine may use a greater volume of magnets than another hover engine to output more force. In another example, the rotational velocities of two identical hover engines can be different, which can cause the hover engines to output different levels of propulsive forces relative to one another. In one embodiment, multiple hover engines used on a vehicle can be identical and operated at a similar rotational velocity so that they each output a similar amount of force.

In general, when a plurality of actuatable hover engines are used, each hover engine can be positioned at a different distance from the center of mass or combinations of hover engines may be positioned at the same distance from the center of mass. Further, the size of each hover engine, the magnet configurations used on each hover engine and the resultant force output by each hover can vary from hover engine to hover engine on a vehicle. Although, combinations of hover engines within the plurality of hover engines can be selected with equal force generating capabilities. A GNC system can be designed which accounts differences in hover engine placement location on a vehicle and force generation capabilities which differ between hover engines. In addition, the GNC system can be configured to account for dynamic loading and dynamic orientation changes of a vehicle, which affect the forces and moments output from each hover engine.

In the examples above, the STARMs which are part the hover engines are configured to generate lift, propulsive and rotational forces. In other embodiments, it may be desirable to specialize the hover engines. For example, a first hover engine can be configured to primarily generate lift and may be not actuatable for generating propulsive forces. Then, additional hover engines can be configured to generate some portion of the lift and can be actuatable to generate propulsive and rotational forces as well which can be used to control and direct a vehicle. Some magnet configurations may be more suitable for generating propulsive forces as compared to lifting forces. Hence, when multiple hover engines are used on a vehicle, the magnet configurations may be varied between the hover engines.

Figure 20:
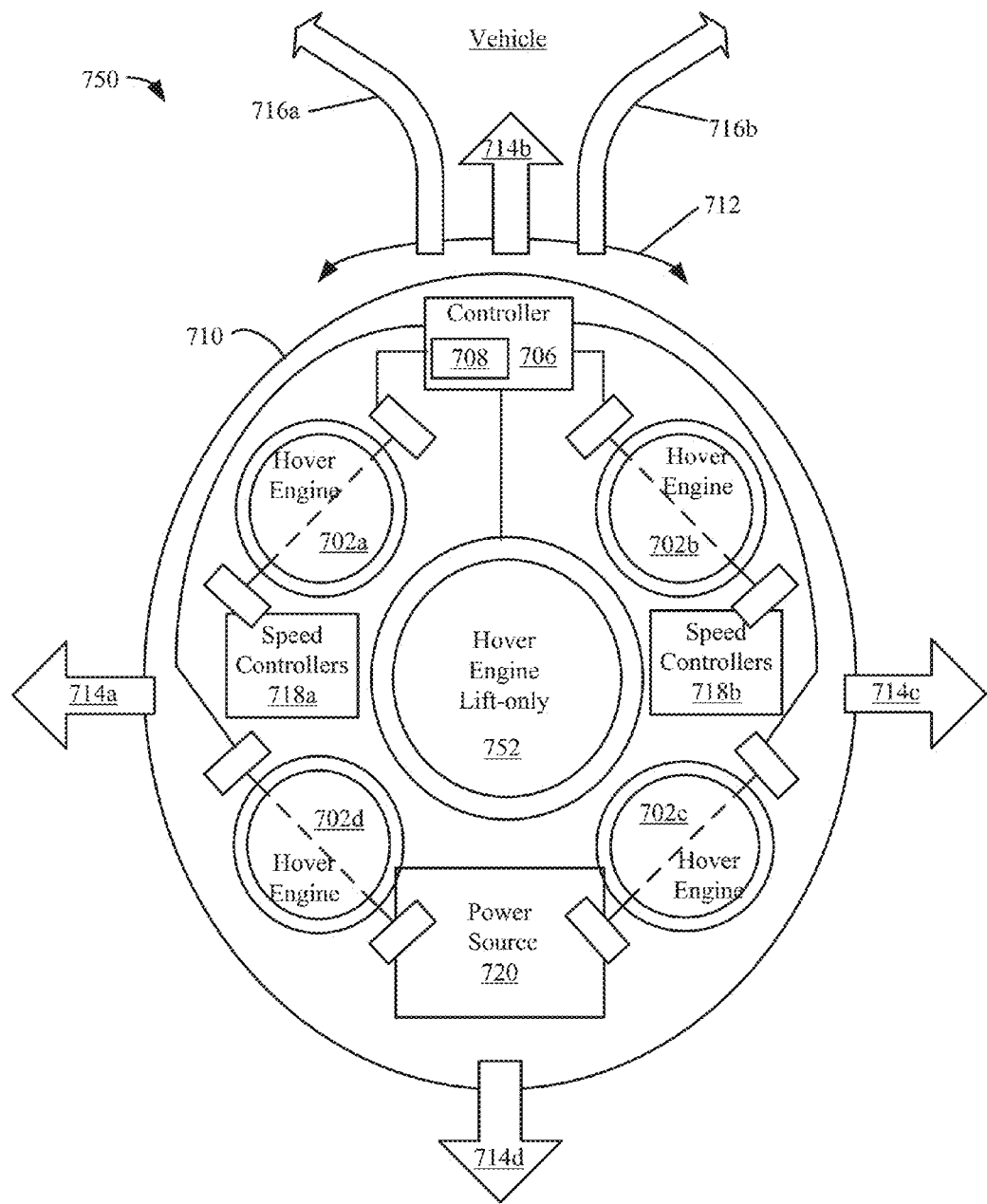
FIG. 20 is an illustration of a magnetically lifted device with four tiltable STARMs and one fixed STARM in accordance with the described embodiments.

FIG. 20 shows an example of vehicle 750 with five hover engines. Four of the hover engines are configured in the manner described above with respect to FIG. 18. However, a fifth hover engine 752 located in the center of the vehicle is configured to generate lift only and is non-actuatable whereas four hover engines, similar to what was previously described, can be actuated to generate the propulsive, rotational and control forces.

In particular embodiments, the four hover engines, 702a, 702b, 702c and 702d, may not be able to hover the vehicle alone. For example, in one embodiment, the four STARMs may not be able to hover an unloaded vehicle and may require some lift to be generated from the lift-only engine. In another embodiment, four STARMs may be able to hover the vehicle while it is unloaded. However, if the vehicle carries some amount of payload, then operating the lift only hover engine may be needed.

In one embodiment, the height above the surface of the bottom of the magnets in the propulsive hover engines and height above the surface of the bottom of the magnets in the lift only hover engine can be offset from one another when the STARMs in the propulsive hover engines and the lift only hover engines are parallel to the surface. For example, the height of the bottom of the magnets in the propulsive STARMs can be positioned at a distance farther away from the surface than the height of the bottom of the magnets in the lifting STARM. The amount of force needed to tilt a STARM in a hover engine relative to the surface can increase as the STARM gets closer to the surface. The amount of force increases because magnetic forces are generated non-linearly and increase the closer the magnets are to the surface. Thus, by keeping the propulsive STARMs farther away from the surface than the lifting STARMs during operation, it may be possible to utilize less force to tilt the propulsive STARMs. STARMs with less magnet volume on the propulsive STARMs as compared to the lifting STARMs can also lessen the force output from the propulsive STARMs and hence require less force to tilt than the lifting STARMs.

In one embodiment, a mechanism can be provided, separate from the tilt mechanism, which can be used to control a distance of a hover engine, such as the propulsive STARM from the surface. For example, the mechanism can be configured to move the hover engine in the vertical direction closer or farther away from the surface. This capability can also be used when the vehicle is first started. For example, while at rest, the bottom of the vehicle can rest on the ground and the hover engines can be pulled up into the vehicle enclosure. Then, the hover engines can be started. After the hover engines reach a certain velocity the hover engines can be moved relative to the vehicle such that the hover engines are closer to a bottom of the vehicle.

Since the propulsive hover engines may not be needed to carry the full lift load, in some embodiments, it may be possible to use smaller propulsive and control STARMs than if the control and propulsive STARMs are also used to carry the entire lift load. One advantage of using this approach is that if the control and propulsive STARM can be made smaller (e.g., a smaller radius and moment of inertia), the amount of force used to actuate the STARMs can be smaller. Thus, it may be possible to use smaller, lighter and less expensive actuators.

Another advantage of using hover engines specialized for lift or control is that the operating conditions of the hover engine used to generate lift most efficiently can be different than the operating conditions used to generate the propulsive and control forces most efficiently. Thus, when some of the hover engines are used primarily for lift only, these hover engines may be operated at different conditions as compared to the hover engines configured to generate control forces. For example, to generate relatively more propulsive forces, a control hover engine can be operated at a rotational velocity which is near peak drag, i.e., a lower lift to drag ratio as compared to a higher rotational velocity. In contrast, a lift-only hover engine may be operated at a higher rotational velocity to minimize drag and maximize lift because, as described above, after peak drag the drag force on a hover engine can decrease and the lift to drag ration can increase as the rotational velocity increases.

Next, the NGC system, which can be used to control a hover engine configuration to move a magnetically lifted vehicle, is described. First, each of the functions of navigation, guidance and control (NGC) are briefly discussed. These functions can be incorporated as logic for an NGC system implemented as circuitry on a magnetically lifted device. For example, the NGC system can be a component of the controller 706 in the previous figures.

First, navigation is figuring out where you are and how you are oriented relative to a defined reference frame. For example, where you are could be in your car in the driveway, and your orientation is trunk of the car towards the curb. In this example, the reference frame is a flat earth.

Second, guidance involves figuring out a path to take. In particular, guidance is figuring out how to get where you want to go based on where you are. Guidance comes after navigation, because if you don't know where you are, it is difficult to figure out which way to go. Guidance has potentially a very large number of solutions. However rules and constraints can be imposed to limit the solution size.

As an example, you know you are in your driveway with your backside towards the curb. How do you get to the store? A rule can be imposed that you have to follow the predefined system of roadways. This limits your guidance options. You might also include rules about obeying speed limits and stop signs. This shrinks the solution space further. You may also have vehicle limitations. For example, a four cylinder Corolla might not have the same acceleration capability as a Ferrari. This notion can be applied to different configurations of hover engines which can have different performance characteristics.

When the rules and limitations are combined, a guidance solution that defines orientation, velocity, and acceleration as functions of time can be obtained. In the guidance space, there can be flexibility to impose or relax the rules to achieve the performance which is desired. For instance, per the example above, when one is trying to reach a destination very quickly for some reason, one may choose to ignore speed limits for some period of time.

Control is getting the vehicle to perform as the guidance solution asks it to perform. This means accelerating, decelerating, maintaining velocity, etc. so that the vehicle follows the guidance solution as closely a desired. In the current example, the driver is the control system. Thus, he or she monitors the speed and acceleration and can make minute adjustments to maintain the desired conditions. In the examples above, the NGC system can make adjustments to the tilt angles of the hover engines to maintain the desired conditions.

Thus, the combination of navigation, guidance, and control allows a magnetically lifted vehicle to be moved in a desired way. As disturbances do enter the system, it may be important to regularly update the navigation, guidance, and control solutions. A system updated in this manner can form a closed loop system. The closed loop system may allow for more accurate motion of the vehicle under GNC.

In alternate embodiments, an open-loop controller, also called a non-feedback controller, can be used. An open-loop controller is a type of controller that computes its input into a system using only the current state and its model of the system. A characteristic of the open-loop controller is that it does not use feedback to determine if its output has achieved the desired goal of the input. Thus, the system does not observe the output of the processes that it is controlling.

For a magnetically lifted vehicle, the GNC can include combinations of 1) velocity control, 2) waypoint management, 3) acceleration/de-acceleration curves (profiles), 4) velocity profiles, 5) free path, which combines acceleration/de-acceleration profiles and velocity en route and 6) navigation. Navigation can include utilizing one or more of a) dead reckoning, b) an indoor positioning system, c) retro-reflectors, d) infrared, e) magnetics, f) RFID, g) Bluetooth, f) ultrasound and g) GPS. An indoor positioning system (IPS) is a solution to locate objects inside a building, such as a magnetically lifted vehicle, using radio waves, magnetic fields, acoustic signals, or other sensory information collected by appropriate sensors. Various types of sensors sensitive to different types of energies can be used in a navigation solution. Thus, these examples are provided for the purpose of description and are not meant to be limiting.

A method of GNC can involve establishing acceleration/de-acceleration profiles (curves, limits, etc.), which may include establishing velocity acceleration/de-acceleration profiles (curves, etc.). Next, a route can be created. The route can be converted into x and y path points on a surface.

In one embodiment, waypoints can be added. Typically, start and end are waypoints by default. What happens at waypoints (null, stop, specific velocity, etc.) can be defined. Path segments can be defined by waypoints.

Next, the orientation for each path segment (relative to velocity direction, relative to fixed point, spinning profile, etc.) can be defined. With the path segments defined, the GNC system can maneuver the vehicle along each path segment according to user defined velocity/acceleration profiles and orientations. Finally, the current position (x, y) of the vehicle can be monitored relative to a preplanned route with regular navigation updates. As the vehicle moves, a current position and desired position can be compared based upon the sensor data. Then, the system can be configured to correct for errors.

In some embodiments, the hover height of a vehicle can be controlled. Thus, the system can be configured to determine a height profile of a vehicle along a path segment. Then, while the vehicle is maneuvered along the path segment, the system can receive sensor data which is used to determine a height of the vehicle. The system can be configured to compare the measured height from the desired height and then correct for errors.

Next, an embodiment of a GNC system used to control the vehicle described with the respect to FIGS. 21, 22 and 23 is discussed. In this example, a wireless controller is used to control the vehicle. The wireless controller can generate input signals in response to user commands.

A proportional-integral-derivative controller (PID controller) is a control loop feedback mechanism (controller) often used in industrial control systems. A PID controller can calculate an error value as the difference between a measured process variable and a desired set point. The controller can attempt to minimize the error by adjusting the process through use of a manipulated variable.

The translational motion control for the vehicle can use a PID control system for lateral acceleration control 800. Two lateral acceleration inputs can be received from the user via the wireless controller. These inputs can be fed into their own individual PID control loops, as in FIG. 21.

Inside the control loop, the input can be differenced with the acceleration output feedback measured by the accelerometer. The resulting difference is the error. The error can be fed into the PID controller, which can have three components, the proportional control, the integral control, and the differential control.

The proportional element multiplies the error by a proportional gain, $K_p$. The integral element computes the sum of the errors over time, and multiplies this by the integral gain, $K_1$. The differential control differences the current input with the previous input, and multiples this difference by the differential gain, $K_D$. The proportional, integral, and differential elements are then summed and sent to the mixing logic as shown in equation 810 of FIG. 22.

The outputs from the mixing logic are sent into the plant, G. The resulting translational acceleration is the output from the plant. The vehicle's translational acceleration is measured by the accelerometers. This measured acceleration is fed back to the beginning of the PID control loop.

The spin control for the vehicle can use a PI (Proportional-Integral) control system 820 for yaw speed control, as shown in the block diagram in FIG. 23. A yaw acceleration input is received from the user via an RC controller. This yaw input can be differenced with the yaw output feedback measured by the gyroscope. The resulting difference is the error. This error can be fed into the PI controller, which has two components, the proportional control and the integral control. The proportional element multiplies the error by a proportional gain, $K_p$.

Magnet Configurations and Performance Comparisons

In this section, various magnet configurations which can be used in STARMs are described with respect to FIGS. 24-41. Prior to describing the magnet configurations some terminology is discussed. Typically, a permanent magnet is created by placing the magnet in an outside magnetic field. The direction of the outside magnetic field is at some orientation relative to the geometry of the permanent magnet which is being magnetized. The direction of the outside magnetic field relative to the geometry of the permanent magnet when it is magnetized determines the poles of the permanent magnet where the north and south poles describe the polarity directions of the magnet.

In the examples below, a STARM will have an axis of rotation. A first group of magnets can be referred to as "poles." Poles can have a polarity direction which is approximately parallel to the axis of rotation of the STARM. Although, in some embodiments, magnets can be secured in the STARM such that there is an angle between the polarity direction of the magnet and the axis of rotation of the STARM. In addition, as described above, mechanisms can be provided which allow an orientation of a permanent magnet to be dynamically changed on a STARM.

A second group of magnets can be referred to as "guides." The guides can be secured in a STARM such that the angle between the polarity direction of the guides and the axis of rotation is approximately ninety degrees. However, the angle between the guide magnets and the axis of rotation can also be offset by some amount from ninety degrees. When pole magnets are secured in a STARM with alternating polarity directions, the magnetic field lines emanating from the north pole of one pole magnet can bend around to enter into the south pole of an adjacent pole magnet and the magnetic field lines emanating from the south pole of one pole magnet can bend around to enter into the north pole of an adjacent magnet. Typically, the guide magnets can be placed between the poles. The "guide" magnets can guide the path of the magnetic fields that travel between the pole magnets.

The combination of pole magnets and guide magnets can be secured in a STARM to form a configuration of polarity regions. On a STARM, this configuration can be referred to a polarity arrangement pattern. In some of the examples below, a polarity arrangement pattern of the STARM can be formed from a first polarity arrangement pattern which is repeated. For example, the polarity arrangement pattern can be formed from a first polarity arrangement pattern which is repeated two, three, four, five times, etc. In other embodiments, the polarity arrangement pattern of a STARM can be formed from a first polarity arrangement pattern and a second polarity arrangement pattern where the first polarity arrangement pattern or the second polarity arrangement pattern is repeated one or more time.

A polarity region in a polarity arrangement pattern can have a common polarity direction. The polarity region can be formed from one or more magnets polarized in the common direction associated with the polarity region. In the examples which follow, single magnets, such as one inch cubic magnets, are described as forming a polarity region. However, multiple magnets of a smaller size can be used to form a polarity region. For example, a one inch cube polarity region can be formed from eight one half inch cubed magnets or sixteen one quarter inch cube magnets all arranged in the same direction. Thus, the examples below are provided for the purposes of illustration only and are not meant to be limiting.

An overall polarity arrangement pattern generated on a STARM using permanent magnets can form a magnetic field with a particular shape and density of magnetic field lines. The magnetic field is three dimensional in nature and can be quite complex. The strength of the field at different locations can depend on the volume distribution of magnets and their associated strength.

Magnetic fields are generated when current is moved through a wire. For example, current passing through a wire coil generates a magnetic field which approximates a bar magnet. A magnet constructed in this manner is often referred to as an "electromagnet." In various embodiments, the magnetic field shapes and density of magnetic field lines from an arrangement of permanent magnets can be approximated by using arrangements of wires and passing current through the wires. Thus, the example of permanent magnets is provided for the purposes of illustration only and is not meant to be limiting.

A STARM can have a top side and a bottom side. When eddy currents are generated, a bottom side can face the conductive substrate where eddy currents are induced by the rotation of the STARM. Often, when permanent magnets are used, the permanent magnets can have at least one flat surface. As examples, cubic shaped magnets have six flat surfaces, whereas, cylindrically shaped magnets have two flat surfaces which are joined by a curved surface. In some embodiments, the at least one flat surface on each of the permanent magnets on a STARM can be secured on a common plane. The common plane can reside close to the bottom side of the STARM.

In alternate embodiments, a STARM can be curved or angled. For example, the STARM can be convex or concaved shape and/or include other curved portions. The bottom of magnets of the STARM can be arranged to follow the bottom surface of the STARM including curved surfaces. The magnets can have flat bottoms, such as cubic magnets. However, in other embodiments, the magnets can be formed in curved shapes to help confirm to the curvature of the STARM.

As an example, a hover engine can be configured to operate within a pipe or a trough where the inner surface of the pipe includes a conductive substrate. The STARM of the hover engine can be bowl shaped and bottom of the magnets on the STARM can be arranged to follow outer surface of the bowl shape. When a STARM is placed next to a curved surface, a larger proportion of the magnets on the STARM can be closer to the inner surface of the pipe as compared to if the magnets were arranged in a common plane, such along the bottom of a flat disk.

Next, some magnet and STARM configurations are described. FIG. 24 shows a STARM 1200. The STARM 1200 has a ten inch outer diameter. Twenty one inch cube magnets are arranged around the circumference of a circle. In particular, one inner radial side of each of the twenty one inch cube magnets is approximately tangent to a 3.75 inch radius circle.

The inner radial distance provides a small gap between each magnet. The gap between magnets increases as the radial distance increases. A minimum inner radial distance allows the magnets to approximately touch one another. The inner radial distance can be increased, which for the same amount of magnets increases the minimum gap between the magnets.

A structure of about 0.25 inches thick is provided between the outer radial edge of the magnets and the outer diameter 1202 of the STARM. In one embodiment, the center of the STARM can include a number of mounting points, such as 1204. The mounting points can be used to secure the STARM 1200 to a rotatable member, such as a rotatable member extending from a motor.

The polarity arrangement pattern of the STARM includes ten pole magnets and ten guide magnets. The polarity arrangement pattern is formed from a first polarity arrangement pattern as exemplified by magnets 1206, 1208, 1210 and 1212. In this example, the first polarity arrangement pattern is repeated four times. In other embodiments, the first polarity arrangement pattern can be used once on a STARM or can be repeated two, three four times, etc. Further, more than one ring of magnets can be provided, which utilize the first polarity pattern. For example, the first polarity pattern can be repeated twice in an inner ring and then four times in an outer ring as shown in FIG. 24.

In the example above, the volume of each pole and guide magnet is the same. In other embodiments, the volume of the pole magnets and the guide magnets can vary from magnet to magnet while still maintaining the overall polarity arrangement pattern. For example, the volume of the pole magnets can be half the volume of the guide magnets. In another example, the volume of the pole magnets can be double the volume of the guide magnets.

The shape of pole and guide magnets is cubic with a one cubic inch volume for each magnet. In other embodiments, the volume of each polarity region can be maintained but a different shape can be used. In yet other embodiments, the polarity arrangement pattern can be maintained but different volume size can be used for each polarity region. For example, a single cubic magnet, with a 0.125 inch, 0.25 inch, 0.5 inch, 0.75 inch, 1 inch, 2 inch, 3 inch, 4 inch, 5 inch or more side can be used to provide each polarity region.

When twenty smaller cubic magnets are used, it is possible to arrange them around a smaller radius circle. When twenty larger cubic magnets are used, a larger radius circle is required. When the first polarity arrangement pattern is repeated more times and the magnet size is the same as in FIG. 24, a larger radius STARM is required. When the first polarity arrangement pattern is repeated less times and the magnet size is the same, a smaller radius STARM can be used. However, the magnets can also be arranged around the same radius but with a larger gap between magnets.

In FIG. 24, the pole and guide magnets which form the polarity arrangement pattern are arranged around a circle. In other embodiments, the magnets can be arranged around other shapes, such as a square or an oval. Some examples of using the first polarity arrangement pattern but arranging the magnets around a different shape are described with respect to the Figures which follow.

In the FIG. 24, the bottoms of the twenty magnets are arranged in a plane which is near the bottom of the STARM 1200. The area of the bottom of the magnets is approximately twenty cubic inches and the volume of the magnets is approximately twenty cubic inches. In various embodiments, the area of the bottom the magnets closest to the bottom of STARM 1200 divided by the Volume$^{2/3}$ is greater than or equal to one, i.e., Area/Volume$^{2/3}$≥1.

For STARM 1200, the Area/Volume$^{2/3}$ equals about 2.71. In other embodiments, this ratio can be greater than or equal to two. In yet other embodiments, the ratio can be greater or equal to three. In further embodiments, this ratio can be greater than or equal to four. In yet other embodiments, this ratio can be greater than or equal to five.

Figure 25:
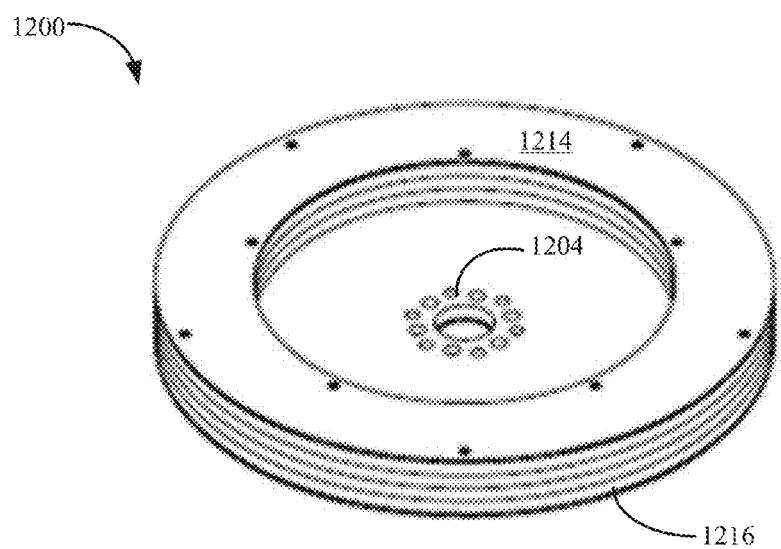

In FIG. 25, STARM 1200 is shown secured in an enclosure with top piece 1214 and a bottom piece 1216. The enclosure is formed from a number of the layers. In this example, layers of aluminum and polycarbonate plastic are used where layers 1214 and 1216 are formed from aluminum. Other materials are possible and these are provided for the purposes of illustration only.

In one embodiment, the center region of the STARM 1200 can provide a large enough space such that a motor can fit in this region. In other embodiments, a motor can be mounted above the top side 1214, such that a top side of the magnets is beneath the motor. In yet other embodiments, a motor can be mounted to the side of the STARM 1200 and a transmission mechanism can be provided, such as a mechanism including belts and gears, to transfer a torque used to turn STARM 1200. If the STARM 1200 is bowl shaped, then the motor might fit partially or entirely below a top lip of the bowl.

Figure 32:
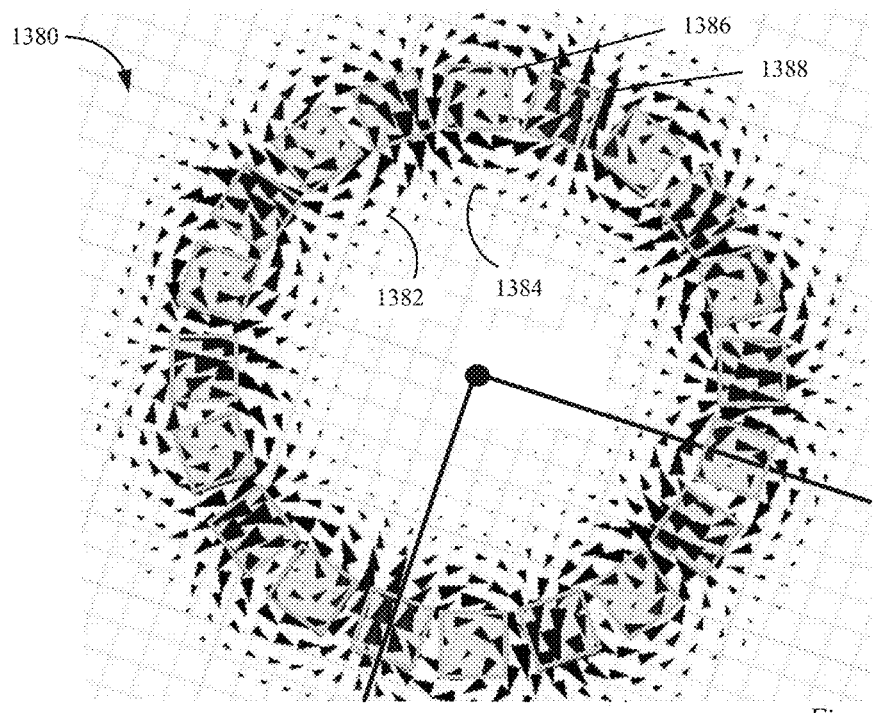
FIG. 32 illustrates predicted eddy current patterns for the magnet configuration shown in FIG. 24.
Figure 33:
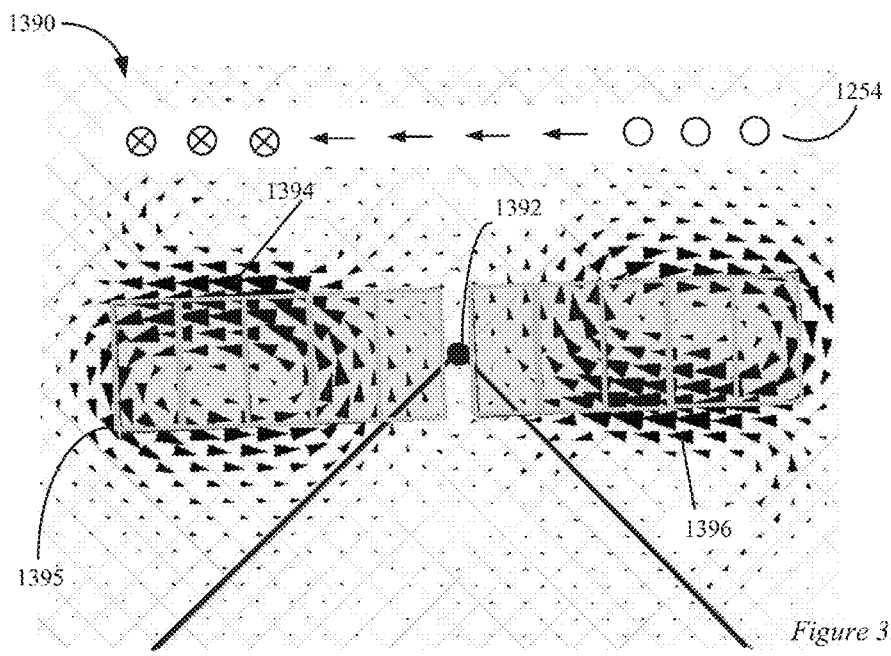
FIG. 33 illustrates predicted eddy current patterns and a polarity alignment patterns for a magnet configuration including magnets arranged in linear arrays which extend across an axis of rotation of a STARM.
Figure 34:
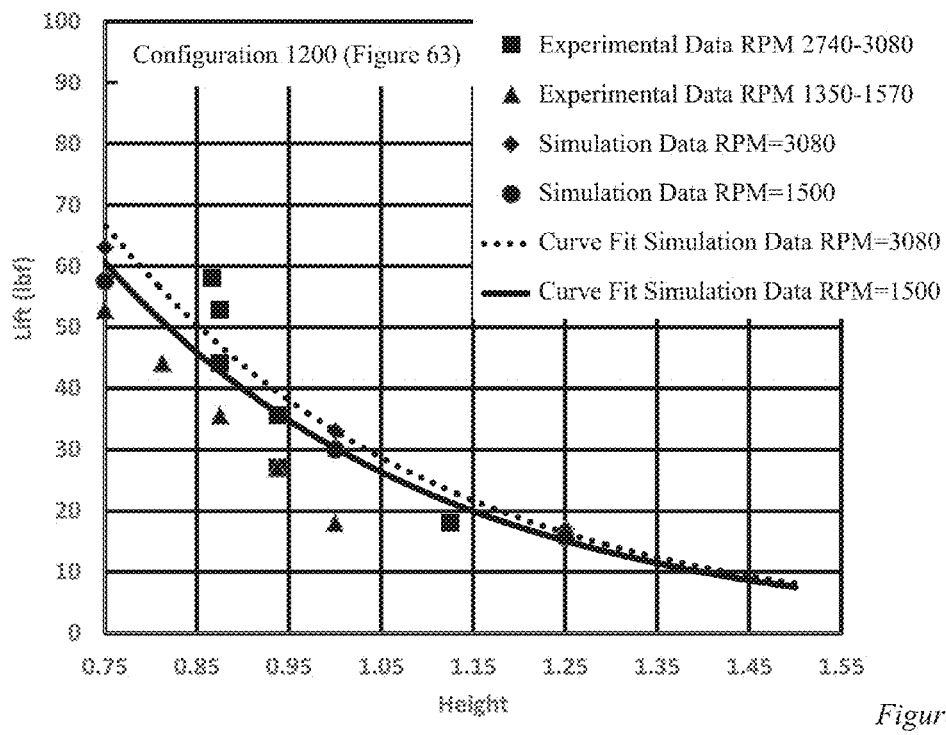
FIGS. 34 and 35 are plots of lift versus height which compare numerically predicted data and experimental data.
Figure 35:
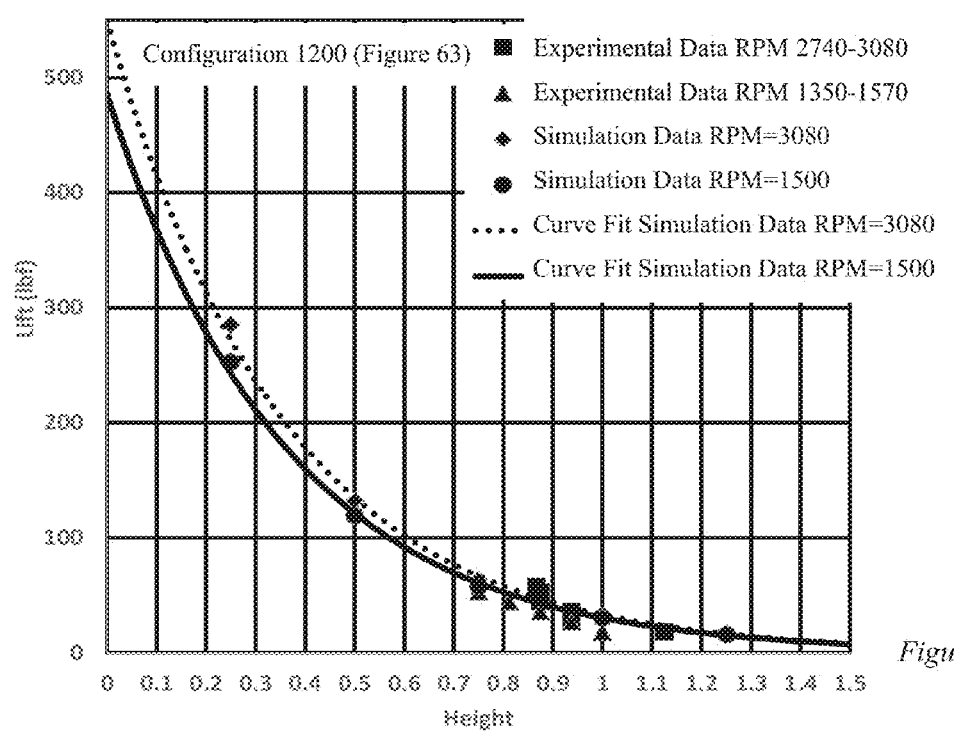

In FIG. 25, a model was built and tested experimentally. In addition, the results were simulated using Ansys Maxwell. A comparison of the experimental and numerical results is shown in FIGS. 34 and 35. A number of other designs were also simulated. These designs are described with respect to FIG. 26-31. In addition, numerical results are compared to one another in FIGS. 36 to 38. Finally, the numerical results predict eddy current patterns which are induced from the rotating the STARM. Some examples of these eddy current patterns for a number of different designs are illustrated in FIGS. 32 and 33.

Figure 26:
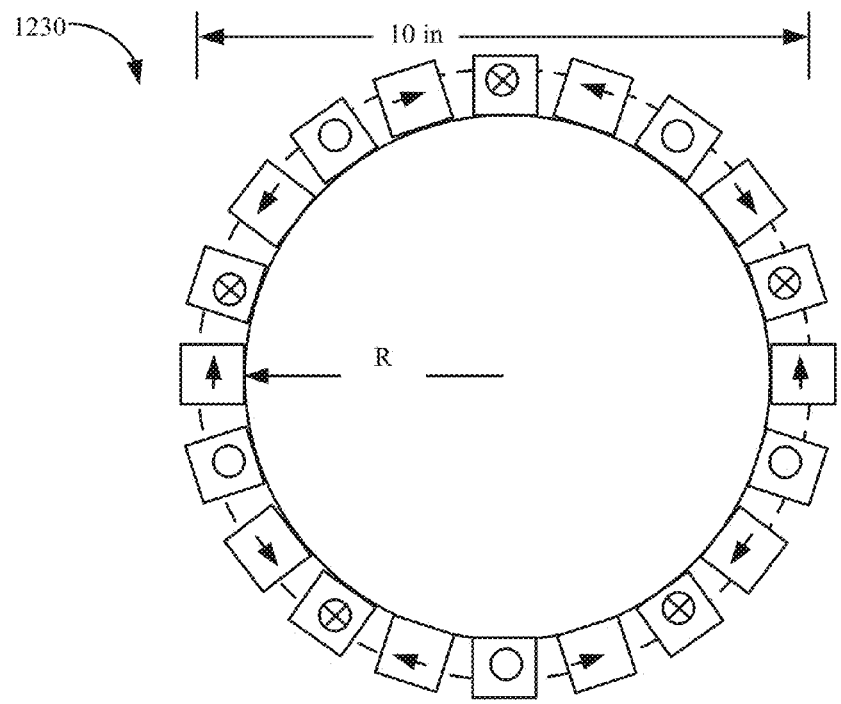
FIGS. 26 and 27 are top views of magnet configurations and polarity alignment patterns of magnets arranged in a circular pattern in accordance with the described embodiments.
Figure 37:
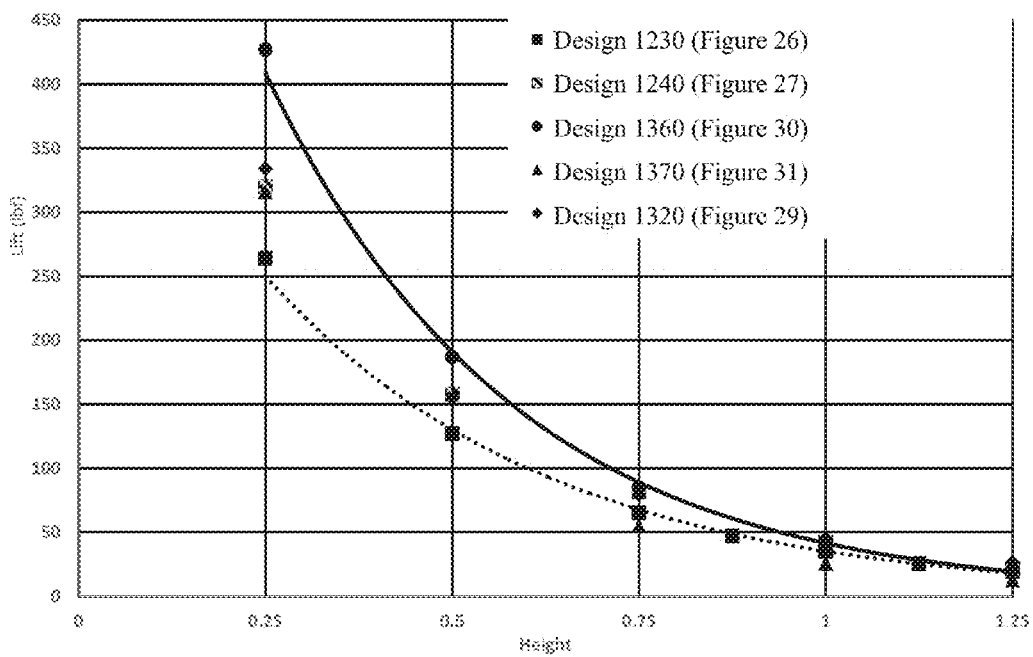
Figure 38:
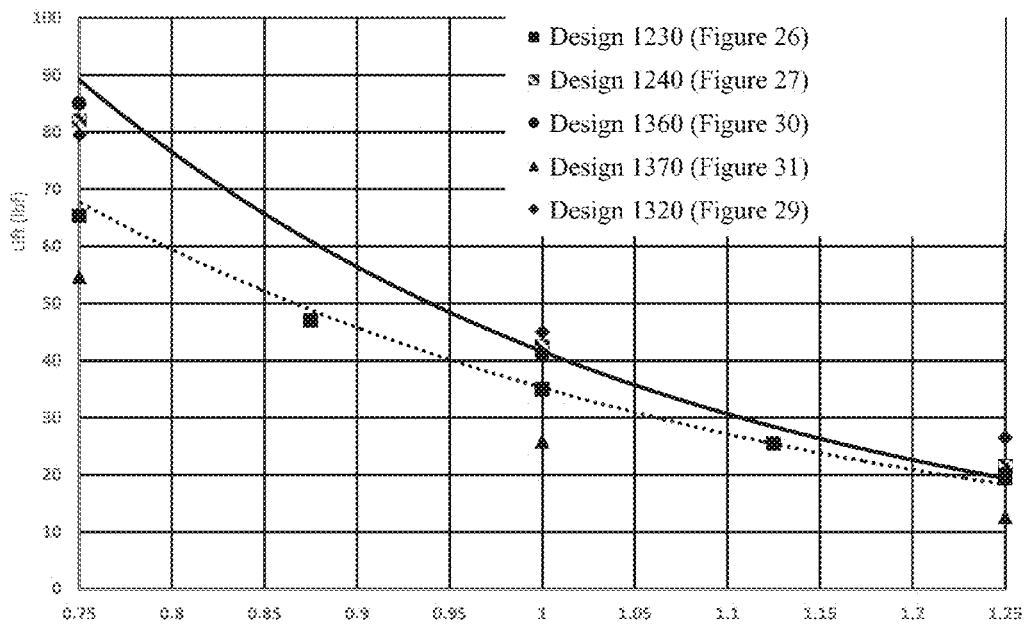

In FIG. 26, a variation 1230 of the design 1200 in FIG. 24. In 1230, the number of magnets is twenty and the magnet volume is twenty cubic inches. The number of magnets is arranged around a larger circle as compared to design 1200. In particular, the radius of the circle is 4.25 inches instead of 3.75 inches. The increased circle radius results in a larger spacing between adjacent magnets. In one embodiment, design 1230 is configured in a STARM with an outer diameter of eleven inches. A numerical prediction of lift for this design is shown in FIGS. 37 and 38.

Figure 27:
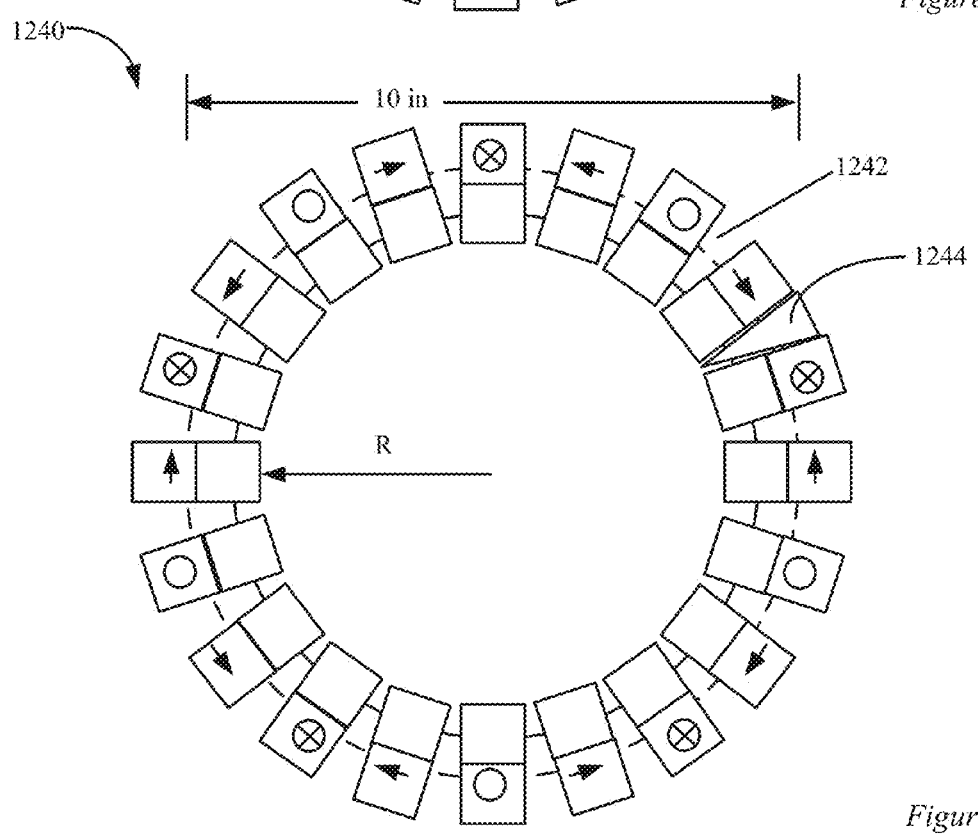

A second variation 1240 of design 1200 is shown in FIG. 27. In 1240, the number of magnets is twenty and the magnet volume is twenty cubic inches. However, magnets with half the height are used. The magnets are two inches by 1 inch by ½ inch (L×W×H). The magnets are arranged with the same starting position as shown in FIG. 24. However, each of the magnets extend radially outward an extra inch. To accommodate the additional radial length of the magnets, the radial distance of a STARM can be increased. A numerical prediction of lift for this design is shown in FIGS. 37 and 38.

The bottom area of the magnets is forty cubic inches. The area divided by the total volume$^{2/3}$ is about 5.43. In alternate embodiments, while maintaining a constant volume, this ratio can be increased by lowering the height of the magnets and extending their radially length. For example, in FIG. 27, the height of the magnets can be lowered to ⅓ inches and the length can be extended to three inches radially. For this design, the bottom area of the magnets is sixty square inches and the area divided by total volume$^{2/3}$ is about 8.14.

In 1240, a gap 1242 is shown between each magnet. In one embodiment, a magnet, such as triangle shaped magnet 1244 can be inserted in the gap. In one embodiment, the polarity of the gap magnet can be selected to match the polarity of the adjacent guide magnet or pole magnet. For example, the polarity of the adjacent guide magnet can be selected for all of the gap magnets or the polarity of the adjacent pole magnet can be selected for all the gap magnets. In another embodiment, two triangular shaped magnets can be placed in the gaps where one of the magnets' polarities matches the adjacent pole magnet and the other matches the adjacent guide magnet. In yet another embodiment, the twenty magnets can be custom shaped such that the magnets fit together with minimal gaps.

Figure 28:
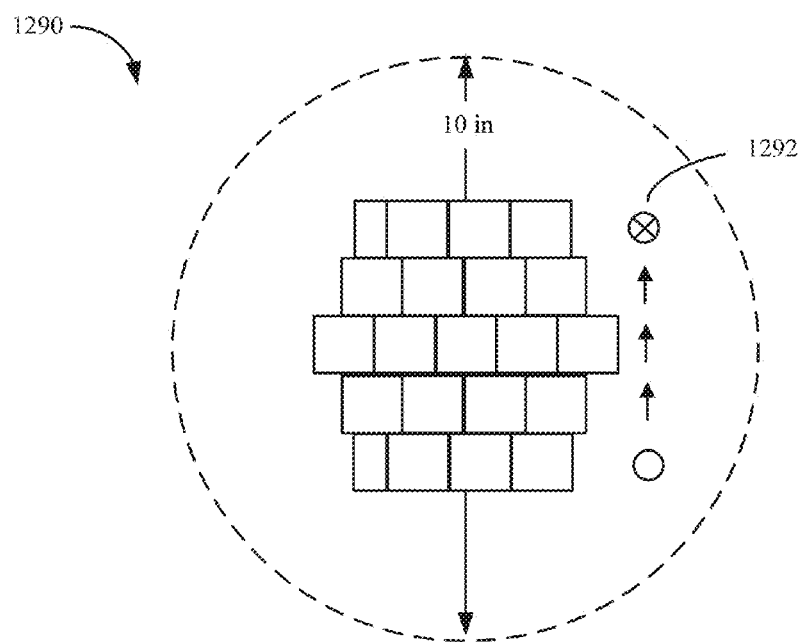
FIG. 28 is a top view of a magnet configuration and associated polarity alignment patterns which include magnets that span across the axis of rotation of a STARM in accordance with the described embodiments.

Yet another designs is shown in FIG. 28, the number of rows is five. In particular, two rows of 3.5 in by 1 in by 1 in magnets, two rows of 4 in by 1 in by 1 in and one row of 5 in by 1 in by 1 in magnets are provided for a total volume of 20 cubic inches of magnets. Five rows enable the magnets to fit in approximately a three inch radius circle. A circle with a twenty inch area has a radius of 2.52 inches, which is the smallest radius which can be used. Thus, design 1290 is approaching this limit while employing rectangular shaped magnets.

Figure 36:
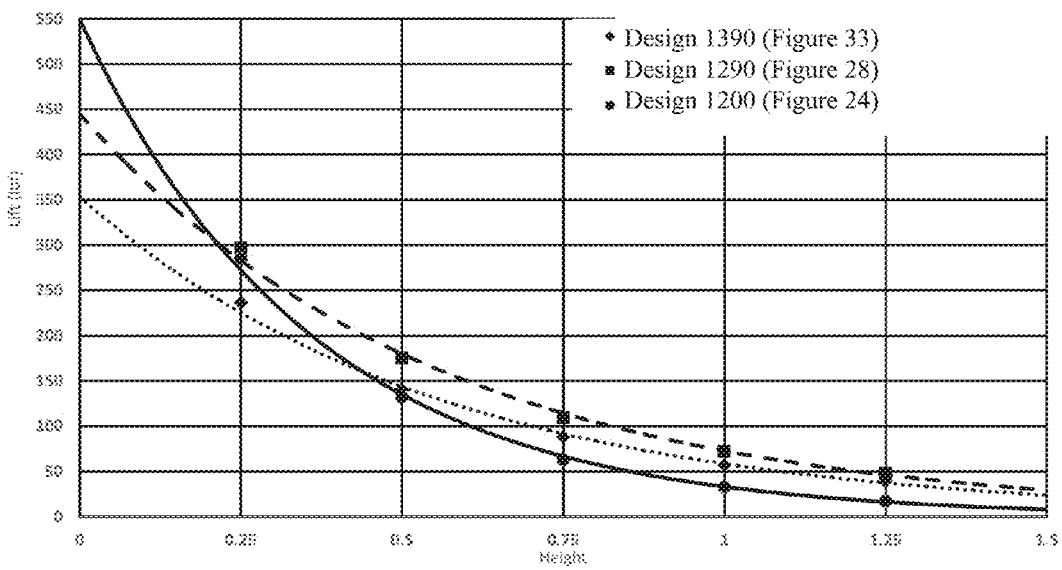
FIGS. 36, 37 and 38 are plots of numerical predictions of lift versus height for eight different magnet configurations.

The polarity arrangement pattern 1292 is used for design 1290. Two poles and a single guide magnet polarity are used. The ratio of guide magnet volume to pole magnet volume is 1.86. A prediction of the lift is shown in FIG. 36.

The polarity arrangement pattern 1292 employs three polarities regions. Many different designs alternatives are possible where the total volume of magnets in the design and the percentage of the total volume allocated to each of the three polarities vary from design. Further, the shape of magnets forming each of the three polarity regions can be varied from design to design. For example, design 1390 in FIG. 33 uses the same volume of magnets as design 1290. However, the percentage of the total volume allocated to each of the three polarity regions is different and the shape of each of the three polarity regions is different.

In FIG. 28, in one embodiment, a small space in the magnet configurations can be provided near the axis of rotation to allow a rotation member to extend through the space and attach to the structure of the STARM. In another embodiment, a structure can be provided which extends over the top and sides of the magnets and a rotational member can be secured to this structure.

Figure 29:
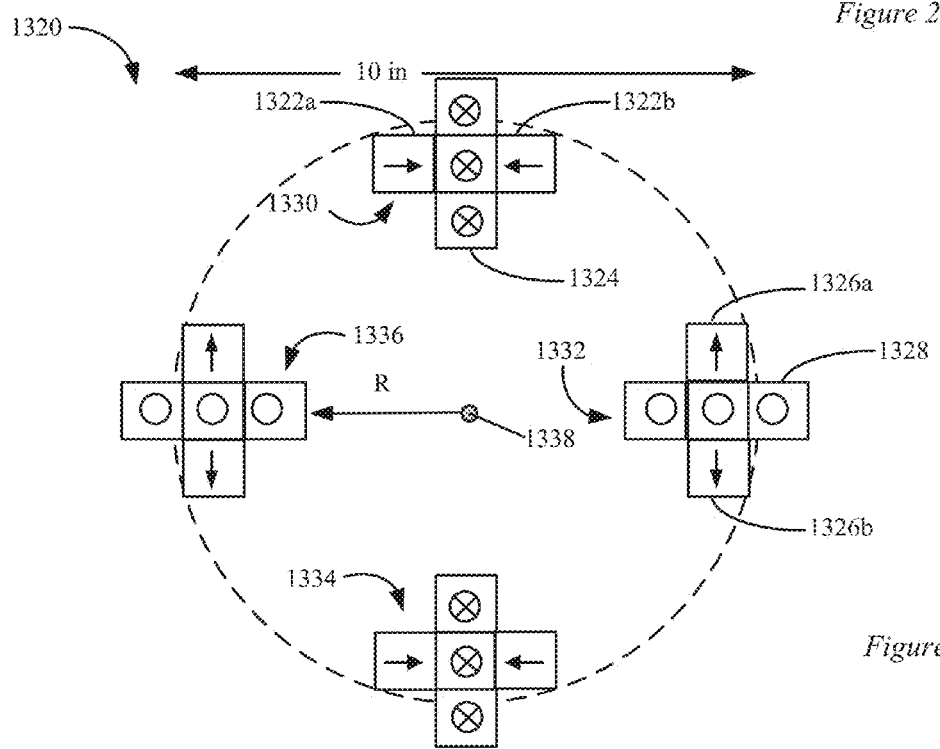
FIG. 29 is a top view of a magnet configuration and associated polarity alignment patterns which include magnets arranged in a cluster in accordance with the described embodiments.

Another magnet configuration 1320 is shown in FIG. 29. Again, twenty one inch cube magnets are shown. The magnets are arranged in four clusters, 1330, 1332, 1334 and 1336, each with five cubic inches of magnets. Each cluster includes pole and guide magnets.

As an example, cluster 1330 includes a pole section 1324 with three cubic inch magnets. The magnets in the pole section are arranged in along a radial line. The pole section 1324 is orientated to point into the page. Two guide magnets 1322a and 1322b point towards the center of the pole. The ratio of the guide magnet volume to pole magnet volume is ⅔.

Cluster 1332 includes pole section 1328. The pole section includes three one inch cube magnets aligned along a radial line from the axis of rotation 1338. The polarity of the magnets in the pole section 1328 is out of the page, i.e., the open circles represent a north poles and the circles with "X" inside represent a south pole. Two guide magnets 1326a and 1326b are provided. The polarity of the guide magnets is away from the pole section 1328.

The clusters 1330 and 1332 provide a polarity arrangement pattern. This pattern is repeated with clusters 1334 and 1336. In various embodiments, a STARM can be formed with only clusters 1330 and 1332 or the polarity arrangement pattern can be repeated once, twice, three, four times, etc.

In various embodiments, the ratio of the guide magnet volume to pole magnet volume can be varied. Further, each individual cluster can be rotated by some angle. For example, the pole section can be aligned perpendicularly to a radial line from the axis of rotation 1338. In addition, the volume of magnets in each cluster can be varied. Also, the radial distance of the magnets from the center axis of rotation 1338 can be varied.

Yet further, the shape of the pole sections, such as 1324 and 1328, can be varied. For example, the pole sections 1324 and 1328 can be formed as a single cylindrically shaped magnet with a volume of three cubic inches, such as a one inch high cylinder with a radius of about a 0.98 inches or a ½ inch high cylinder with about a 1.38 inch radius. In the example of design 1320, the guide magnets in each cluster are arranged along a line. In other embodiments, the guide magnets don't have to be arranged along a line. The shape of the guide magnets can also be varied.

Figure 30:
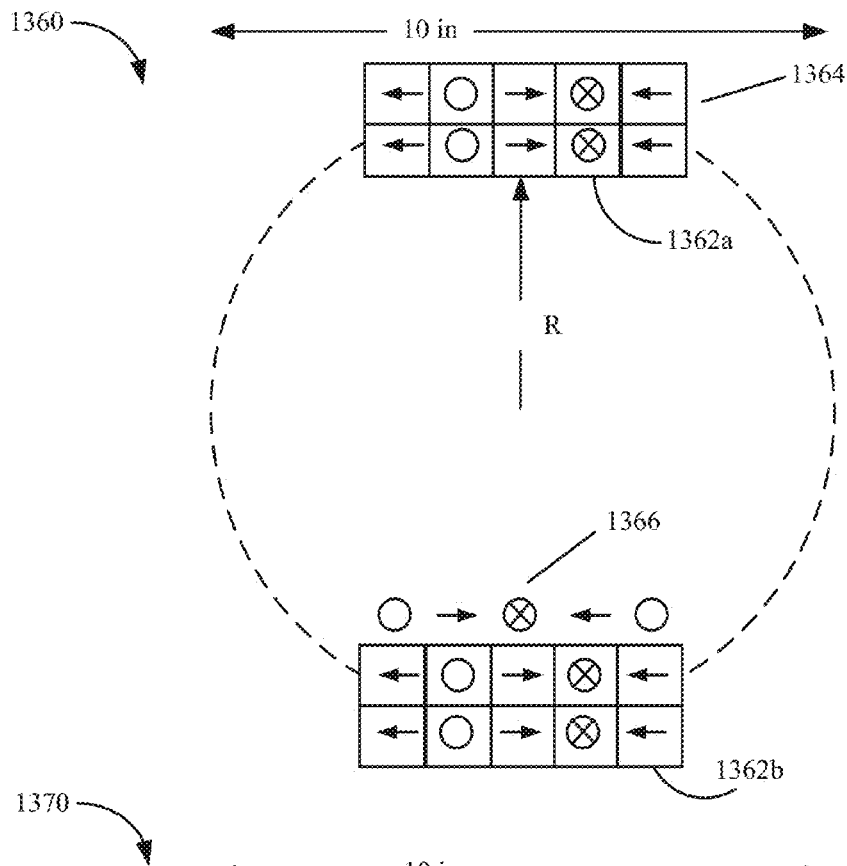
FIGS. 30 and 31 are top views of magnet configurations and associated polarity alignment patterns which include magnets arranged in linear arrays in accordance with the described embodiments.
Figure 31:
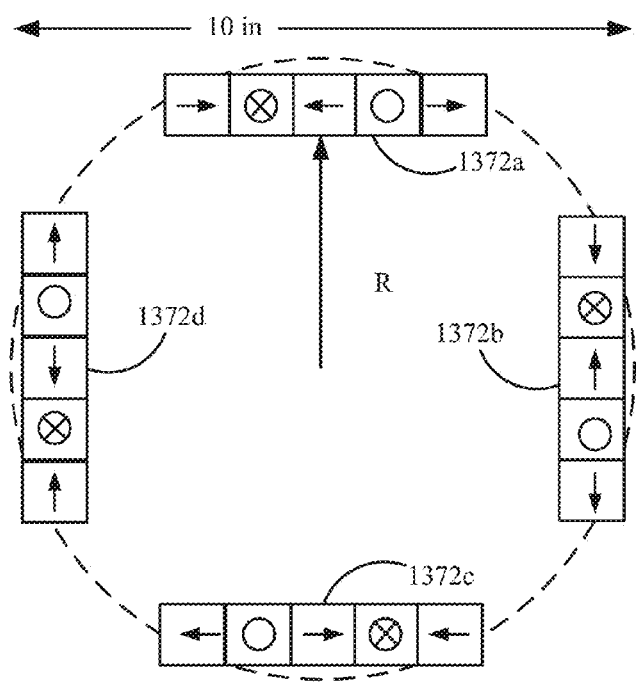

Yet another magnet configuration is described with respect to FIGS. 30 and 31. In these configurations, the magnets are clustered and arranged in a line where the amount of clusters can be varied. The designs 1360 and 1370 in FIGS. 30 and 31 each include twenty cubic inches of magnets. In design 1360, the magnet volume is divided into two rectangular clusters of ten cubic inches each, 1362a and 1362b. In design 1370, the magnet volume is divided into four clusters, 1372a, 1372b, 1372c and 1372d, each with five cubic inches of magnets in each cluster.

A single cluster of twenty cubic inches of magnets can be provided. This design might be incorporated on a STARM with a single arm or a circular STARM with a counter weight to balance the weight of the magnets. In general, one, two, three, four or more clusters can be distributed over a STARM.

Two polarity arrangement patterns 1364 and 1366 are shown. These arrangements can be repeated on each cluster. Pattern 1364 includes two pole regions. Pattern 1366 includes three pole regions. In pattern 1364, the ratio of guide magnet volume to pole magnet volume is 1.5. In pattern 1366, the ratio of guide magnet volume to pole magnet volume is about ⅔. The ratio of the bottom area of the magnets (20 square inches) relative to the Volume$^{2/3}$ of the magnets is about 2.71. Again, like the other designs, this ratio can be varied.

In various embodiments, the ratio of guide magnet volume to pole magnet volume can be varied for patterns 1364 and 1366. In addition, the radial distance from the center axis of rotation can be varied. The radial distance affects the moment of inertia. Further, the relative velocity of the magnets relative to the substrate varies with RPM of the STARM and the radial distance. Thus, the radial distance can be selected to obtain a desired relative velocity which is compatible with the RPM output capabilities of the motor and is compatible with packaging constraints.

In FIGS. 30 and 31, the magnets in each cluster are arranged in rectangles and are configured to touch one another. In various embodiments, the aspect ratio of the length relative to the width of the rectangular clusters can be varied as is shown in FIGS. 30 and 31. Further, spacing can be provided between the magnets in a polarity region or between different polarity region in the polarity arrangement patterns 1364 and 1366. The spacing might be used to allow structure which secures the magnets. Further, the magnets don't have to be arranged to form a rectangle. For example, the magnets can be arranged in arc by shifting the magnets relative to one another while allowing a portion of each adjacent magnet to touch. In general, many different types of cluster shapes can be used an example of a rectangle is provided for the purposes of illustration only.

Next some eddy current patterns for some of the different magnet configurations are illustrated in FIGS. 32 to 33. In the Figures, the arrows indicate a direction of current on the surface of a conductive substrate. The relative magnitude of the current is indicated by a size of the arrows. The eddy current patterns were generated using a finite element analysis to solve Maxwell's equations. The materials and their physical properties are modeled in the simulation.

The simulations were performed using Ansys Maxwell. The simulations used a ½ inch copper plate. The distance from the surface was 0.25 inches. The eddy current patterns remained similar when height was varied. However, the strength of the eddy currents increased as the height above the surface decreased. Peak currents observed for the simulations varied between about three to eight thousand amps per cm$^2$ at a 0.25 in height above the surface. The current decreased with depth into the copper. The RPM value used for the simulations was 3080 RPM In FIG. 32, the magnet configuration and polarity arrangement pattern described with respect to FIG. 24 is employed. The polarity arrangement pattern includes ten poles and ten guide magnets. Ten eddy currents, such as 1382 and 1384, are generated to form eddy current pattern 1380.

An eddy currents each form around a pole and guide magnet pair, such as 1386 (pole) and 1388 (guide). The eddy currents spin in alternating directions. The current strength varies around the circumference of the eddy current where the strongest currents occur where the eddy currents meet and interact with one another. For each pair, the strongest current sets up under a guide magnet, such as 1388.

The simulations indicated in this configuration that the poles generate negative lift and the guide magnets provide lift. When lift from the guide magnets is greater than the pull from the pole magnet, a net lift is generated. Without being bound to a particular theory, it is believed the enhanced current strength due to the eddy current interacting, which passes under the guide magnets, enhances the lift which is generated.

Pattern 1380 is a snap shot at a particular time. In the simulation, the STARM and the magnets rotate according to the proscribed RPM value. Thus, the eddy currents such as 1382 and 1384 don't remain stationary but follow the magnets around as the magnets rotate according to the RPM rate.

In FIG. 33, an eddy current pattern for a design 1390, which is a variation of design 1290 in FIG. 28, is shown. The design 1390 includes a small gap near the axis of rotation 1392. As described above, the gap can be used to mount a rotational member to a STARM. In this design the STARM structure doesn't have to be cylindrical. For example, a box shaped design may be used to carry and secure the magnets. Thus, the structure used for the STARM may be reduced for this configuration as compared to a circular magnet configuration.

The polarity arrangement pattern 1254 is used, which is similar to pattern 1292 in FIG. 28. The polarity arrangement pattern includes two pole sections. The two pole sections generate two large eddy currents 1394 and 1396. The simulations predicted that positive lift was generated from the guide magnets in the polarity arrangement pattern and negative lift was generated from the pole magnets. The lift predictions for the configuration as a function of height are shown in FIG. 36.

Next, with respect to FIGS. 34 and 25, lift predictions derived from simulation of the design in FIG. 24 are compared to experimentally measured data. Next, the lift predictions derived from simulations are compared for the designs shown in FIGS. 24 and 25-33.

To obtain the experimental data, the STARM shown in FIGS. 24 and 25 is coupled to a QSL-150 DC brushless motor from Hacker Motor (Ergolding, Germany). The motor was powered by batteries. The batteries used were VENOM 50C 4S 5000 MAH 14.8 Volt lithium polymer battery packs (Atomik RC, Rathdrum, Id.). A structure was built around the motor and batteries. A vehicle including the batteries, motor, STARM and structure weighed 18 lbs. A Jeti Spin Pro Opto brushless electronic speed controller (Jeti USA, Palm Bay, Fla.) was used to control the current supplied to the motor and hence its RPM rate.

The vehicle was started in a hovering position. The height, RPM and other measurements were taken. Then, additional weight, in various increments, was added. The additional weight lowered the hover height of the test vehicle. Height measurements were made at each weight increment. In a first test, the initial RPM rate was 3080 with the test vehicle unloaded and then decreased as weight was added. In a second test, the RPM rate was initially 1570 with the test vehicle unloaded. Table 1 below shows the experimentally measured data for test #1 and test #2. The table includes the total vehicle weight including the payload. The RPM of the motor. The amps drawn and voltage. These quantities were used to generate power consumption. Finally, the hover height of the vehicle was measured by hand. The height is shown to remain constant at a number of different height increments. The constant height was attributed to inaccuracies in the hand measurements.

TABLE 3

Experimentally Measured Data using Design 1200 in FIG. 24

| Weight including Payload (lbs) | RPM | Amps | Volts | Power (W) | Height (in) |
|---|---|---|---|---|---|
| Test#1 | | | | | |
| 18 | 3080 | 12.1 | 61.6 | 745 | 1.125 |
| 27 | 3000 | 15.4 | 60.8 | 936 | .9375 |
| 35.6 | 2915 | 19.5 | 60 | 1170 | .9375 |
| 44.2 | 2855 | 22.7 | 59.4 | 1348 | .875 |
| 52.8 | 2780 | 26.8 | 58.6 | 1570 | .875 |
| 58 | 2740 | 29.4 | 58.1 | 1708 | .8667 |
| Test#2 | | | | | |
| 18 | 1570 | 10.3 | 49.4 | 509 | 1 |
| 27 | 1480 | 13.9 | 49.3 | 685 | .9475 |
| 35.6 | 1420 | 17.4 | 49.3 | 858 | .875 |
| 44.2 | 1390 | 20.8 | 49.2 | 1023 | .8125 |
| 52.8 | 1350 | 24.4 | 49.1 | 1198 | .75 |

To access the accuracy of the simulations of the STARM design in FIG. 24, a constant RPM value was selected and then the distance from the bottom of the magnets to a ½ inch copper plate is varied. FIG. 34 shows a comparison of the numerical simulations with the experimental data from tests number one and two between a height of three quarters of an inch and one and one quarter of an inch. The numerical simulations are curve fit with an exponential. The curve fits are represented by the dashed and solid lines.

The simulations were generated at heights of 0.25 inches, 0.5 inches, 0.75 inches, 1 inch and 1.25 inches. The curve fits were extrapolated to heights of zero inches and to 1.5 inches. In FIG. 34, the experimental data and simulated data is shown from a height range of zero to one and one half inches.

Next with respect to FIGS. 36, 37 and 38, the designs in FIGS. 24 and 26-33 are described. To compare designs, an average velocity of the bottom of the magnets relative to the top surface of the conductive substrate is considered. In some of the designs, this value was held constant. The average velocity of the magnets relative to the surface can be estimated as an average distance of the bottom of the magnets to the axis of rotation times the RPM rate converted into radians.

The average velocity was calculated because at higher velocities, the lift tends to increase and the drag tends to decrease as a function of the velocity of the magnets relative to the surface. In FIG. 36, the average distance from axis of rotation to the bottom of the magnets was about 2.81 inches for design 1395, 1.56 inches for design 1290 and 4.25 inches for design 1200.

All of the simulations were run at 3080 RPM except for design 1290, which was run at 6000 RPM. The RPM value was increased because the average distance was so much lower for this design and hence the average velocity was much lower than other designs when an RPM of 3080 was selected. Based upon these RPM values, the average velocity of design 1395 is 75.2 feet/s, the average velocity of design 1290 is 81.7 feet/s and the average velocity of design 1200 is 114.2 feet/sec.

For the designs in FIGS. 37 and 38, the average distance from the axis of rotation is 4.75 inches and the RPM value is 3080. Thus, the average velocity relative to the surface for the five designs is the same and is 127.6 feet/s. FIGS. 37 and 38 show the same designs. However, in FIGS. 37 and 38, the height range and lift ranges are narrowed so that the differences between the designs can be discerned.

The numerical results were generated at 0.25, 0.5, 0.75, 1 and 1.25 inches. Some of the numerical results were curve fit using an exponential equation. In FIG. 36, design 1290 is predicted to generate the most lift above 0.75 inches. Below 0.25 inches, the curve fits predict design 1200 will generate more lift. Design 1290 generates more lift at the greater height values than the other designs even with a lower average velocity of the bottom of the magnets relative to the surface as compared to the other designs.

In FIGS. 37 and 38, the predicted lift as a function of height is presented for five designs. The curve fit with the solid line is an exponential fit of the data for design 1360 in FIG. 30 which includes two linearly arranged clusters of magnets with ten cubic inches of magnets per cluster. The curve fit with the dotted line is an exponential fit of the circularly arranged magnets for design 1230 in FIG. 26.

The five designs in FIGS. 37 and 38 each use the same volume of magnets of the same strength (N50, neodymium). The magnets are arranged such that the average velocity of the magnets relative to the surface is the same. The lift predictions for the different magnet arrangements vary from arrangement to arrangement. The performance between designs varies between heights. For example, the predicted lift for design 1360 is largest of the five designs at 0.25 and 0.5 inches. However, at 1 inch and 1.25 inches, designs 1320 and 1240 are predicted to generate more lift.

Next, with respect to FIGS. 39 to 41, lift predictions and thrust predictions are made as a function of tilt angle of the STARM. In FIG. 39, predictions of total lift and thrust force as a function of tilt angle are shown for design 1200 shown in FIG. 24. In FIG. 40, the predicted total lift as a function of tilt angle is shown for design 1290 in FIG. 28.

In FIG. 41, the predicted thrust force as a function of tilt angle for design 1290 in FIG. 28 is shown. For design 1290, the thrust force varies as the magnet configuration rotates relative to the surface. It oscillates between a minimum and maximum value. The maximum and minimum values for each tilt angle are shown in the Figure.

In FIG. 39, the tilt angle is varied between zero and seven degrees. A one inch height above the surface of the tilt axis is simulated where the STARM is rotated at 3080 RPM. Thus, the distance of part of the STARM to the surface of the substrate is greater than one and the distance of part of the STARM is less than one. However, the average distance from the bottom of the STARM to the substrate is one inch. In FIGS. 40 and 41, the tilt angle is varied between zero and seven degrees. A one inch height above the surface of the axis of rotation is again simulated where the STARM is rotated at 6000 RPM.

In FIGS. 39 and 40, the total lift is predicted to increase with tilt angle. The effect is greater for design 1200 as compared to design 1290. In some embodiments, a STARM can be fixed at angle greater than zero to take advantage of the greater lift which is generated. At the tilt angles considered, the total lift appears to increase linearly with angle.

In FIGS. 39 and 41, the thrust force increases with tilt angle. At the tilt angles considered, the thrust force increases linearly with angle. A greater thrust force is predicted design 1200 in FIG. 39 as compared to design 1290 in FIG. 41 even though a larger total lift is predicted for 1290 as compared to design 1200. Thus, in some embodiments, design 1200 might be selected for generating thrust whereas design 1290 might be selected for generating lift. STARMs can be specialized to generate lift or thrust forces. Based upon these simulations, some designs may be more suitable for generating lift forces and other designs may be more suitable for generating thrust forces. Additional magnet configurations which can be utilized with the hover engines and hover vehicles described herein are described in previously incorporated by reference application Ser. Nos. 14/737,442 and 14/737,444.

Embodiments of the present invention further relate to computer readable media that include executable program instructions for controlling a magnetic lift system. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:
1. A vehicle comprising:
  a first hover engine, a second hover engine, a third hover engine and a fourth hover engine, each of the first hover engine, the second hover, the third hover engine and the fourth hover engine having,
    an electric motor including a winding, a first set of permanent magnets and a first structure which holds the first permanent magnets wherein an electric current is applied to the winding to cause one of the winding or the first set of permanent magnets to rotate;

a second structure, configured to receive a rotational torque from the electric motor to rotate the second structure, the second structure holding a second set of permanent magnets wherein the second set of permanent magnets are rotated to induce eddy currents in a substrate such that the induced eddy currents and the second set of permanent magnets interact to generate forces which cause the vehicle to hover above and/or translate from location to location along the substrate;

one or more speed controllers coupled to the first hover engine, the second hover engine, the third hover engine and the fourth hover engine;

an on-board electric power source that supplies the electric current to the first hover engine, the second hover engine, the third hover engine and the fourth hover engine via the one or more speed controllers;

a rider platform including a front end, a back end and an upper surface;

a first hinge mechanism, near the front end and beneath the rider platform, which is coupled to the rider platform, the first hover engine and the second hover engine, wherein the first hinge mechanism is configured to rotate the first hover engine and the second hover engine in a first direction, during flight, when a force is applied on a first portion of the upper surface, and in a second direction, opposite the first direction, when the force is applied on a second portion of the upper surface;

a second hinge mechanism, near the back end and beneath the rider platform and coupled to the rider platform, the third hover engine and the fourth hover engine, wherein the second hinge mechanism is configured to rotate the third hover engine and the fourth hover engine in the first direction, during flight, when the force is applied on a third portion of the upper surface, and in the second direction, when the force is applied on a fourth portion of the upper surface;

where in the first hover engine, the second hover engine, the third hover engine and the fourth hover engine are each secured to the vehicle at a fixed angle such that each of the first hover engine, the second hover engine, the third hover engine and the fourth hover engine output a translational force, when the vehicle is in a first orientation during flight, and wherein the translational forces from each of first hover engine, second hover engine, the third hover engine and the fourth hover engine approximately cancel one another to provide a net translational force which is approximately zero.

2. The vehicle of claim 1, wherein the rider platform is a skateboard deck.

3. The vehicle of claim 1, wherein the first hinge mechanism and the second hinge mechanism are each mechanically secured to a bottom of an interface plate and the rider platform is mechanically secured to a top of the interface plate.

4. The vehicle of claim 1, wherein the first hinge mechanism and the second hinge mechanism are each mechanically coupled directly to the rider platform.

5. The vehicle of claim 1, wherein the first hinge mechanism or the second hinge mechanism are adjustable to increase or decrease a magnitude of the force needed to instantiate a particular amount of rotation in the first hinge mechanism or the second hinge mechanism.

6. The vehicle of claim 1, wherein the on-board electric power source is secured in an enclosure beneath the rider platform between the first hinge mechanism and the second hinge mechanism.

7. The vehicle of claim 1, wherein the on-board electric power source includes a plurality of battery pouch cells.

8. The vehicle of claim 1, further comprising a wireless transceiver configured to communicate with a remote device and the one or more speed controllers.

9. The vehicle of claim 8, wherein one or more electronic speed controllers are configured to receive, via the wireless transceiver, a command from the remote device to shut down the first hover engine, the second hover engine, the third hover engine and the fourth hover engine and in response to the command, shutdown each of the hover engines.

10. The vehicle of claim 1, further comprising four electronic speed controllers, each of the electronic speed controllers configured to be coupled to one of the first hover engine, the second hover engine, the third hover engine and the fourth engine.

11. The vehicle of claim 10, wherein each of the electronic speed controllers is mounted above one of the hover engines.

12. The vehicle of claim 1, further comprising a mounting plate including a first portion and a second portion wherein a first electric motor associated with the first hover engine is mechanically coupled to the first portion such that it is suspended beneath the first portion and such that the first portion forms a top part of an enclosure which surrounds the first electric motor and wherein the second portion is secured to the first hinge mechanism such that the mounting plate and the first hover engine are secured beneath the first hinge mechanism.

13. The vehicle of claim 1, wherein the rider platform includes a first side and a second side along a length of the rider platform between the front end and the back end and wherein, when the force is applied in a fifth portion on the upper surface near the first side, both the first hinge mechanism and the second hinge mechanism rotate in opposite directions to cause the vehicle to translate sideways in a direction from the second side to the first side.

14. The vehicle of claim 1, wherein, the vehicle is configured such that when the force is applied near the back end of the upper surface, the front end rises and the vehicle translates forwards and when the force is applied near the front end of the upper surface, the back end rises and the vehicle translates backwards.

15. The vehicle of claim 1, wherein the rider platform has a form factor like a skateboard deck.

16. The vehicle of claim 1, wherein the fixed angle is between zero and fifteen degrees.

17. The vehicle of claim 1, wherein, only the first hinge mechanism rotates, when the force is applied on the first portion of the upper surface or on the second portion of the upper surface.

18. The vehicle of claim 17, wherein the vehicle translates and turns when the force is applied on the first portion of the upper surface or on the second portion of the upper surface.

19. The vehicle of claim 1, wherein the rider platform is between 7 and 10.5 inches wide.

20. The vehicle of claim 1, wherein the rider platform is between 28 and 33 inches long.

21. The vehicle of claim 1, wherein the rider platform is sloped upwards near the front end and the back end.

* * * * *